(12) United States Patent
Kapoor et al.

(10) Patent No.: US 9,053,146 B1
(45) Date of Patent: Jun. 9, 2015

(54) APPARATUSES, METHODS AND SYSTEMS FOR A WEB ACCESS MANAGER

(75) Inventors: Vikas Kapoor, New York, NY (US); Abhilash Madhavarapu, Nutley, NJ (US)

(73) Assignee: Iqor U.S. Inc., New York, NY (US)

( * ) Notice: Subject to any disclaimer, the term of this patent is extended or adjusted under 35 U.S.C. 154(b) by 102 days.

(21) Appl. No.: 12/903,839

(22) Filed: Oct. 13, 2010

Related U.S. Application Data

(63) Continuation-in-part of application No. 12/763,320, filed on Apr. 20, 2010, now Pat. No. 8,812,537, and a continuation-in-part of application No. 12/760,948, filed on Apr. 15, 2010, and a continuation-in-part of application No. 12/762,570, filed on Apr. 19, 2010, and a continuation-in-part of application No. 12/763,331, filed on Apr. 20, 2010, and a (Continued)

(51) Int. Cl.
  *G06F 17/30* (2006.01)
(52) U.S. Cl.
  CPC ................ *G06F 17/30389* (2013.01)
(58) Field of Classification Search
  USPC .......................................................... 707/769
  See application file for complete search history.

(56) References Cited

U.S. PATENT DOCUMENTS

| | | | |
|---|---|---|---|
| 5,442,780 A | 8/1995 | Takanashi et al. |
| 5,802,157 A | 9/1998 | Clarke et al. |
| 5,848,415 A | 12/1998 | Guck |
| 5,864,613 A | 1/1999 | Flood |
| 5,911,776 A | 6/1999 | Guck |
| 5,946,375 A | 8/1999 | Pattison et al. |
| 6,058,163 A | 5/2000 | Pattison et al. |
| 6,094,684 A | 7/2000 | Pallmann |
| 6,233,584 B1 | 5/2001 | Purcell |
| 6,246,756 B1 | 6/2001 | Borland et al. |
| 6,263,049 B1 | 7/2001 | Kuhn |
| 6,381,599 B1 | 4/2002 | Jones et al. |
| 6,542,602 B1 | 4/2003 | Elazar |
| 6,600,821 B1 | 7/2003 | Chan et al. |
| 6,643,635 B2 | 11/2003 | Nwabueze |

(Continued)

OTHER PUBLICATIONS

Sah et al., "An Introduction to the Rush Language", May 1994, University of California, pp. 1-12.*

(Continued)

*Primary Examiner* — Rehana Perveen
*Assistant Examiner* — Hung Havan
(74) *Attorney, Agent, or Firm* — Daniel Basov, Esq.; Jacob P. Martinez, Esq.

(57) ABSTRACT

The APPARATUSES, METHODS AND SYSTEMS FOR A WEB ACCESS MANAGER implement efficient and scalable monitoring, regulation, and allocation of communications resources within an enterprise. In one embodiment, a web access management processor-implemented method is disclosed, comprising: obtaining a request for network resource access; extracting from the network resource access request a request attribute; querying a database using the extracted request attribute; obtaining a network access rule to apply to the network resource access request, based on querying the database; applying the network access rule to the network resource access request; and determining via a processor whether the network resource access is permitted based on applying the network access rule to the network resource access request; determining that the network resource access is permitted, based on applying the network access rule to the network resource access request; and forwarding the request for processing the network resource access request.

24 Claims, 58 Drawing Sheets

Related U.S. Application Data continuation-in-part of application No. 12/762,577, filed on Apr. 19, 2010, now Pat. No. 8,489,872, said application No. 12/763,320 is a continuation of application No. 12/650,542, filed on Dec. 31, 2009, now abandoned, said application No. 12/760,948 is a continuation of application No. 12/650,493, filed on Dec. 30, 2009, now abandoned, said application No. 12/762,570 is a continuation of application No. 12/650,442, filed on Dec. 30, 2009, now abandoned, said application No. 12/763,331 is a continuation of application No. 12/650,530, filed on Dec. 30, 2009, now abandoned, said application No. 12/762,577 is a continuation of application No. 12/650,548, filed on Dec. 31, 2009, now abandoned.

(60) Provisional application No. 61/252,611, filed on Oct. 16, 2009.

(56) References Cited

U.S. PATENT DOCUMENTS

| | | | | |
|---|---|---|---|---|
| 6,654,806 | B2 | 11/2003 | Wall et al. | |
| 6,760,420 | B2 | 7/2004 | Heilmann et al. | |
| 6,820,082 | B1 * | 11/2004 | Cook et al. | 707/754 |
| 6,952,714 | B2 | 10/2005 | Peart | |
| 6,959,079 | B2 | 10/2005 | Elazar | |
| 7,082,191 | B1 | 7/2006 | Dickens | |
| 7,155,433 | B2 | 12/2006 | Lasken et al. | |
| 7,240,118 | B2 | 7/2007 | Yokokura | |
| 7,284,005 | B1 | 10/2007 | Wiryawan et al. | |
| 7,336,779 | B2 | 2/2008 | Boyer et al. | |
| 7,379,934 | B1 | 5/2008 | Forman et al. | |
| 7,487,094 | B1 | 2/2009 | Konig et al. | |
| 7,593,919 | B2 | 9/2009 | Lewis | |
| 7,596,573 | B2 | 9/2009 | O'Neil et al. | |
| 7,603,378 | B2 | 10/2009 | Ivanova | |
| 7,805,513 | B2 | 9/2010 | Graveline et al. | |
| 8,023,479 | B2 | 9/2011 | Silver et al. | |
| 2002/0021791 | A1 | 2/2002 | Heilmann et al. | |
| 2004/0083199 | A1 * | 4/2004 | Govindugari et al. | 707/1 |
| 2004/0093342 | A1 * | 5/2004 | Arbo et al. | 707/102 |
| 2004/0218748 | A1 | 11/2004 | Fisher | |
| 2005/0144297 | A1 | 6/2005 | Dahlstrom et al. | |
| 2005/0183143 | A1 | 8/2005 | Anderholm et al. | |
| 2006/0031547 | A1 | 2/2006 | Tsui et al. | |
| 2006/0070131 | A1 | 3/2006 | Braddy et al. | |
| 2007/0091800 | A1 | 4/2007 | Corcoran | |
| 2007/0192184 | A1 | 8/2007 | Cai et al. | |
| 2007/0230679 | A1 | 10/2007 | Altberg et al. | |
| 2008/0005197 | A1 | 1/2008 | Chang et al. | |
| 2008/0244689 | A1 | 10/2008 | Dalton | |
| 2009/0043840 | A1 | 2/2009 | Cherukuri et al. | |
| 2009/0172000 | A1 * | 7/2009 | Lavdas et al. | 707/101 |
| 2009/0254971 | A1 * | 10/2009 | Herz et al. | 726/1 |

OTHER PUBLICATIONS

"Recruiting Management", 2009 NuView Systems Inc., http://www.nuvuewinc.com/recruiting_mgmt.html.

* cited by examiner

FIGURE 2B

| CLIENT | APPLICATION | TITLE | FUNCTION | SUB FUNCTION | DEPARTMENT | PROGRAM | NAME |
|---|---|---|---|---|---|---|---|
| ALL | | | | | | | |
| Client1 | NUASION | SVP | FINANCE | | IO,REC,COL,FIN | | |
| Client2 | CALL BAR | AVP | OPERATIONS | | | | |
| Client3 | QORUS | AVP | OPERATIONS | | | | |
| Client4 | QORUS | VP | OPERATIONS | | | | |
| Client5 | PRODOR | EVP | Talent | | | | |
| Client6 | PRODOR | Agent | | Center Management | | | |
| Client7 | ASPECT | Sr Agent | | | | | |
| | PARS | VP | TECHNOLOGY | | | | |
| | SOFT PHONE | VP | | | | | |

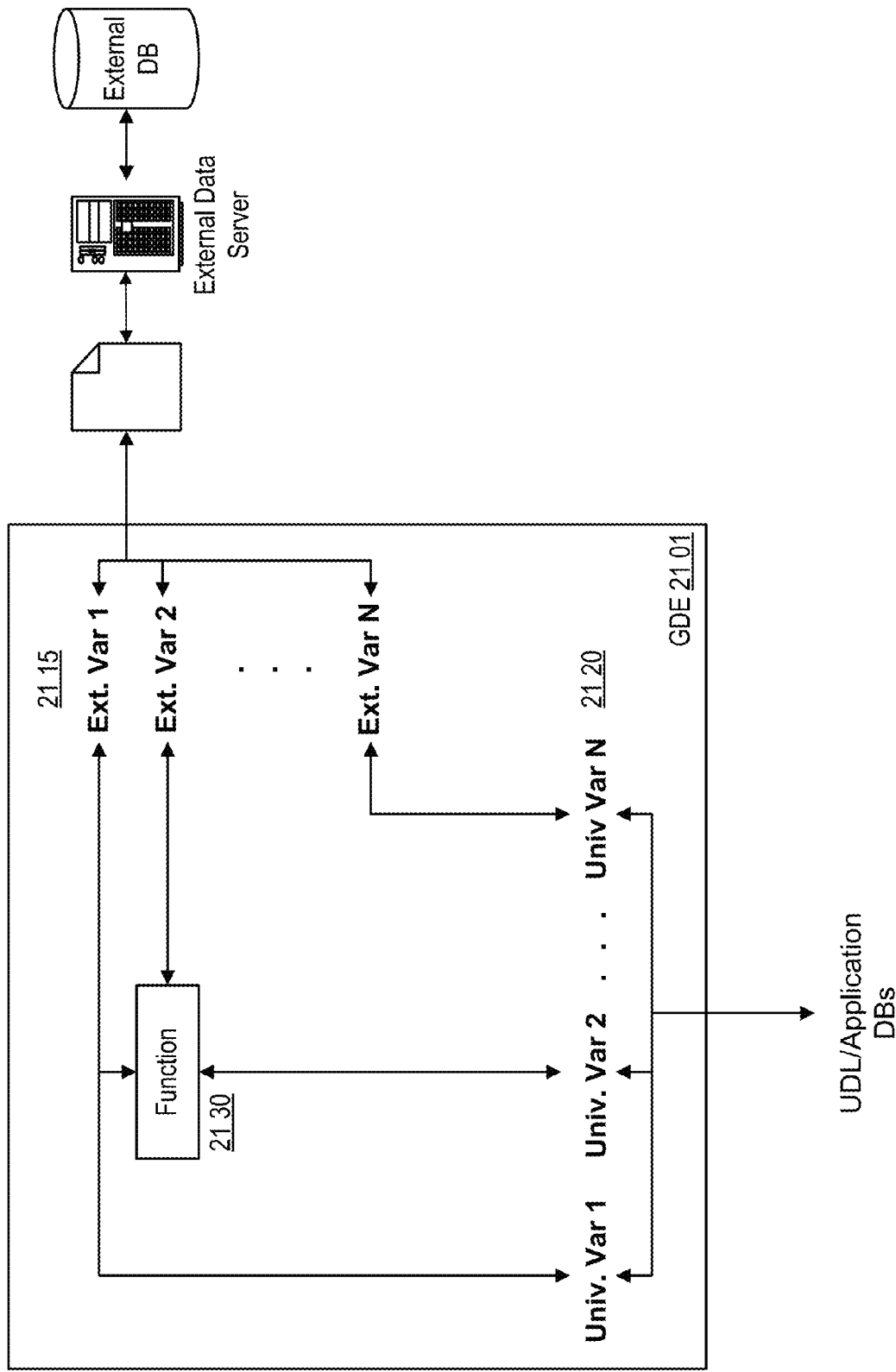

| ID | FROM | TO | FREQUENCY | L | LIMITER OPERATION | FUNCTION | CHOOSER OPERATION KEY | CLARIFIER OPERATION | FUNCTION |
|---|---|---|---|---|---|---|---|---|---|
| CLIENT1 PRICING | CORUS | NEJASON | Monthly | | | | | | |
| CLIENT2 PRICING | CORUS | NEJASHER | | | | | | | |
| DEBTOR INFO | PROD REPORTING | CORUS | | | | | | | |
| CLIENT3 SHORT | DB1 | NEJASON | | | | | | | |
| CLIENT3 LONG | DB1 | NEJASON | | | | | | | |
| 26.01 | 26.05 | 26.10 | 26.15 | | 26.20 | | 26.25 | 26.30 | |

FIGURE 27A

| AUTHOR | NAME | DISTRIBUTION | FREQUENCY | L.B. | LIMITER | VALUE | FUNCTION | CHOOSER | APPLICATION | CLASSIFIER | VALUE |
|---|---|---|---|---|---|---|---|---|---|---|---|
| JOHN DOE | CLIENT PRICING | | WEEKLY | | PROGRAMCODE PLACEMENTMONTH = RJC008 | = CL USBK,FP,HK AND | GROUP BY | PERCENTLIQUIDATION | | DIALEDDATE >= PLACEMENTD DIALEDDATE <= PLACEMENTD CALLRESULT = PROMISE | |
| JOHN DOE | | | | | | | | NUMBEROFACCOUNTS | BORUS | | |
| JERRY SMITH | | | | | | | | NUMBEROFPLACEMENTS | BORUS | | |
| | | | | | | | | PERCENTLIQUIDATION | BORUS | | |
| | | | | | | | | NUMBEROFACCOUNTS | BORUS | | |
| | | | | | | | | NUMBEROFPLACEMENTS | BORUS | | |
| | | | | | | | | PERCENTLIQUIDATION | BORUS | | |
| | | | | | | | | NUMBEROFACCOUNTS | BORUS | | |
| | | | | | | | | NUMBEROFPLACEMENTS | BORUS | | |
| | | | | | | | | RECALLDATE | BORUS | | |
| | | | | | | | | PENETRATIONRATE | BORUS | | |
| | | | | | | | | NUMBEROFDIALATEMPTS | BORUS | | |
| | | | | | | | | NUMBEROFPLACEMENTS | BORUS | | |
| | | | | | | | | CONNECTRATE | BORUS | | |
| | | | | | | | | NUMBEROFACCOUNTS | BORUS | | |
| | | | | | | | | CONTACTRATE | BORUS | | |
| | | | | | | | | NUMBEROFACCOUNTS | BORUS | | |
| | | | | | | | | NUMBEROFPLACEMENTS | BORUS | | |
| | | | | | | | | PROMISERATE | BORUS | | |
| | | | | | | | | NUMBEROFACCOUNTS | BORUS | | |
| | | | | | | | | NUMBEROFACCOUNTS | BORUS | | |
| | | | | | | | | KEPTRATE | BORUS | | |
| | | | | | | | | NUMBEROFACCOUNTS | BORUS | | |
| | | | | | | | | NUMBEROFACCOUNTS | BORUS | | |
| | | | | | | | | TOTALOFPAYMENTS | BORUS | | |
| | | | | | | | | NUMBEROFPAYMENTS | BORUS | | |
| | | | | | | | | NUMBEROFACCOUNTS | BORUS | | |

| | A | B | C | D | E | F | G |
|---|---|---|---|---|---|---|---|
| | 27.40 | 27.45 | 27.50 | 27.55 | 27.60 | 27.65 | |
| 1 | CALLACCOUNTNUMBER | CALLUSERNAME | CALLPHONENUMBER | CALLRESULT | EXTENDED RESULT | CALLDATE | |
| 2 | 3089068 | | 2505552734 | BUSY | | 12/29/2009 13:00 | |
| 3 | 732578 | | 6045550198 | BUSY | | 12/29/2009 13:06 | |
| 4 | 1048685 | | 5065559441 | NO ANSWER | | 12/29/2009 8:06 | |
| 5 | 1797521 | | 9025558514 | NO ANSWER | | 12/29/2009 8:06 | |
| 6 | 2357994 | | 7095559354 | NO ANSWER | | 12/29/2009 8:08 | |
| 7 | 2548593 | | 9025557864 | NO ANSWER | | 12/29/2009 8:08 | |
| 8 | 873844 | | 2225552222 | NO ANSWER | | 12/29/2009 8:08 | |
| 9 | 2977502 | | 5065553891 | NO ANSWER | | 12/29/2009 8:08 | |
| 10 | 998893 | | 5065559087 | NO ANSWER | | 12/29/2009 8:10 | |
| 11 | 667345 | | 9025554605 | ABANDON | | 12/29/2009 8:10 | |
| 12 | 1452804 | | 5065555725 | RIGHT PARTY | RIGHT PARTY PROMISE | 12/29/2009 8:10 | |
| 13 | 1252063 | | 9025553366 | RIGHT PARTY | RIGHT PARTY ALREADY PAID | 12/29/2009 8:10 | |
| 14 | 426601 | | 9025553101 | RIGHT PARTY | RIGHT PARTY | 12/29/2009 8:10 | |
| 15 | 2975928 | | 5065558975 | RIGHT PARTY | RIGHT PARTY PROMISE | 12/29/2009 8:12 | |
| 16 | 1751999 | | 7095553802 | RIGHT PARTY | RIGHT PARTY ALREADY PAID | 12/29/2009 8:12 | |
| 17 | 2682201 | | 9025555825 | RIGHT PARTY | RIGHT PARTY PROMISE | 12/29/2009 8:12 | |
| 18 | 2994622 | | 5065554719 | NO ANSWER | | 12/29/2009 8:12 | |
| 19 | 1523794 | | 5195556713 | NO ANSWER | | 12/29/2009 8:12 | |
| 20 | 3065609 | | 5065550443 | NO ANSWER | | 12/29/2009 8:12 | |
| 21 | 2458941 | | 9025553360 | NO ANSWER | | 12/29/2009 8:14 | |
| 22 | 1242466 | | 5065559400 | NO ANSWER | | 12/29/2009 8:14 | |
| 23 | 1908813 | | 5065559242 | NO ANSWER | | 12/29/2009 8:14 | |
| 24 | 1190669 | | 9025553459 | NO ANSWER | | 12/29/2009 8:16 | |
| 25 | 2953636 | | 7095553645 | NO ANSWER | | 12/29/2009 8:16 | |
| 26 | 3659688 | | 9025550808 | NO ANSWER | | 12/29/2009 8:16 | |
| 27 | 1685619 | | 5065552830 | NO ANSWER | | 12/29/2009 8:16 | |
| 28 | 1511278 | | | | | | |

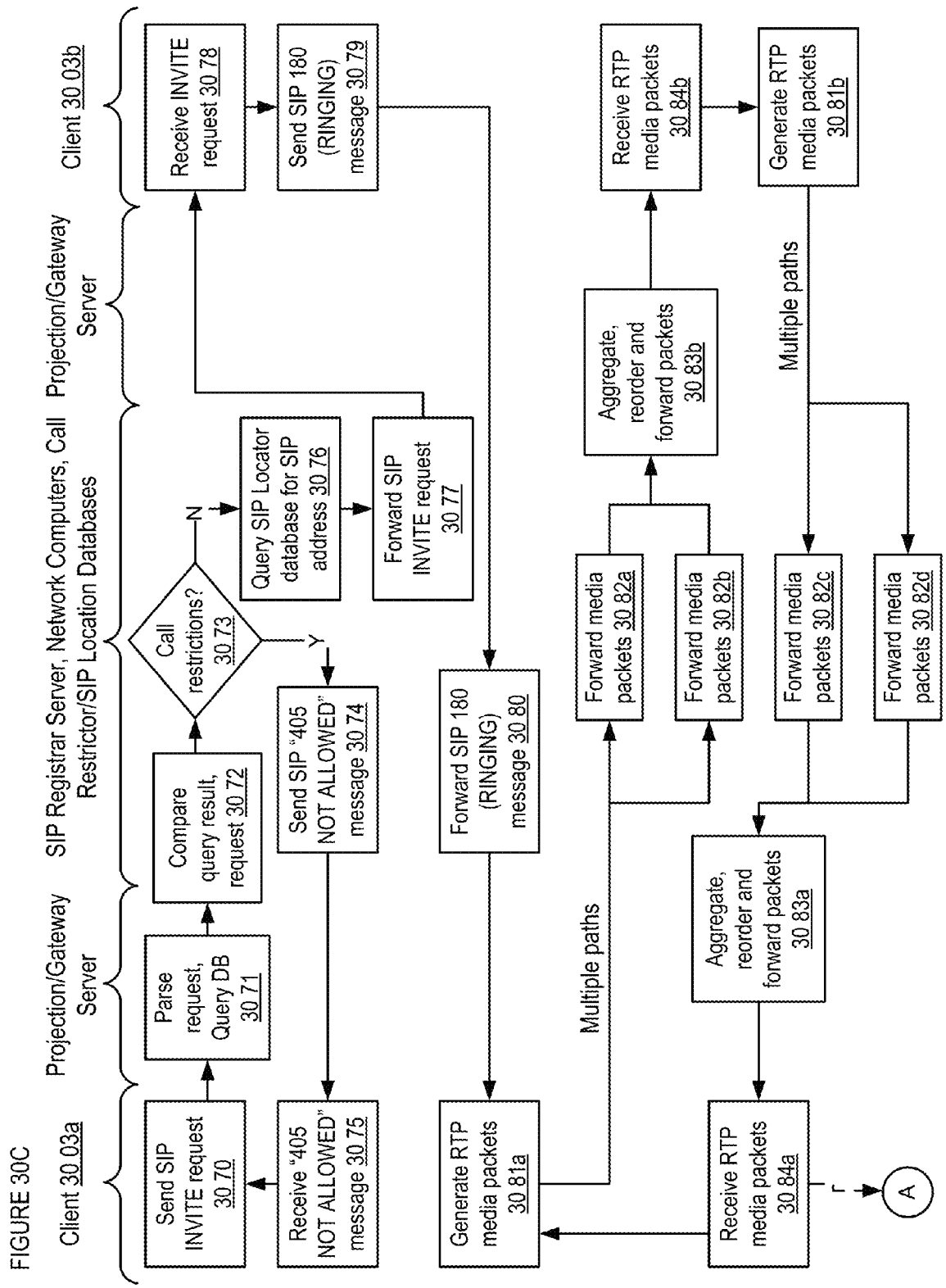

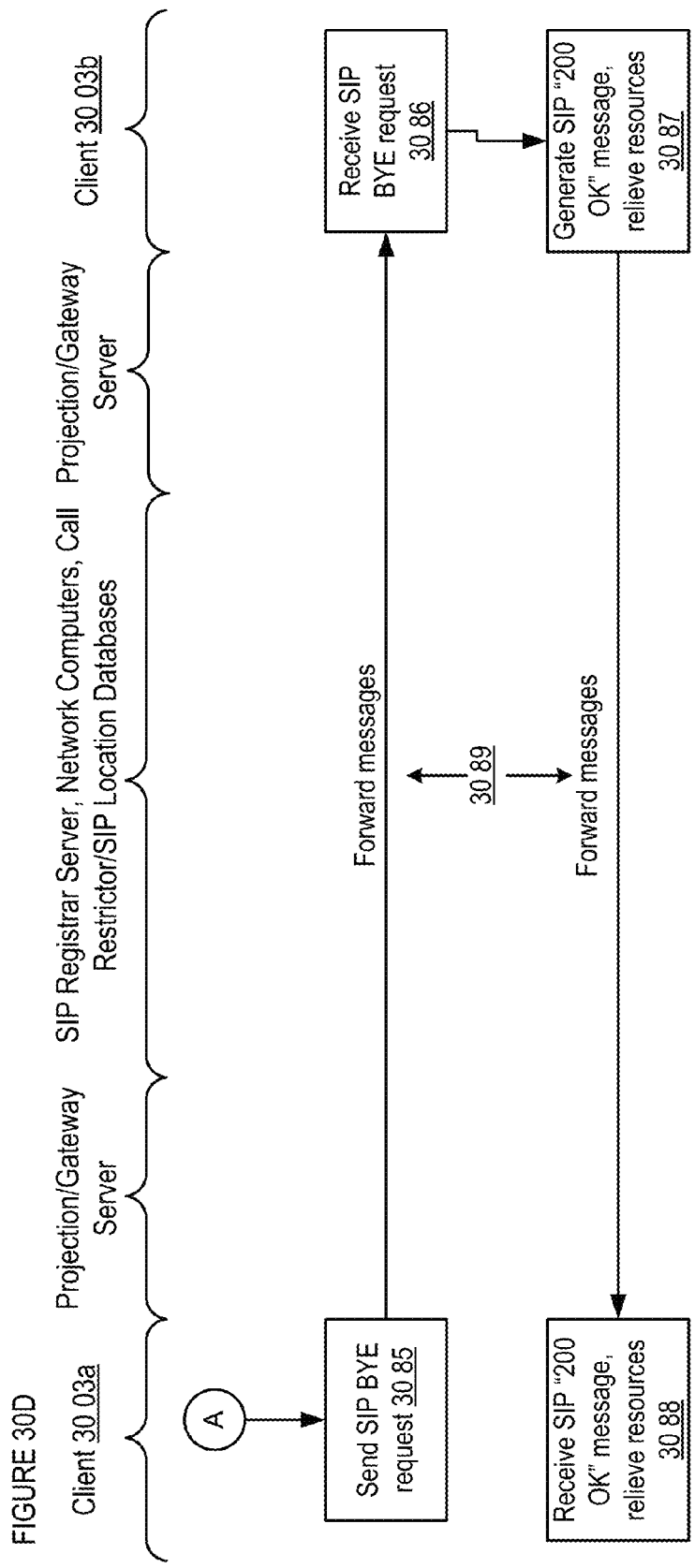

FIGURE 31A

- Program Filter:
  - A program may be made up of following entities
    - Client – 3 characters
    - Country – 2 characters
    - Vertical – 2 characters
    - Business Type – 2 characters
    - Description – 1 to 7 characters
  - A compliance rule may be defined for any combination of the above entities.

For example – the program filter below will apply to any US clients of Business Type starting with 'F'.

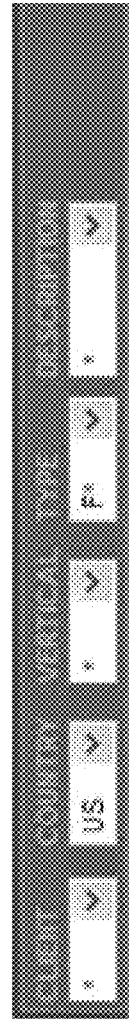

31 01

However, the rule defined below will apply only to one specific client

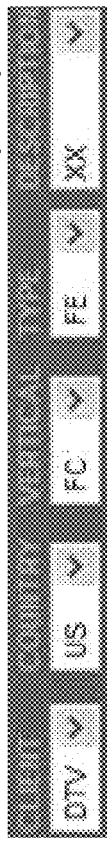

- Rule Structure:
  - Conditions (e.g., account properties)
  - Results (e.g., allowed/disallowed actions)

- Rule Levels:
  - "Regulation" (e.g., legal/regulatory/corporate compliance)
  - "Client" (e.g., instructions)
  - "Internal" (e.g., best practices)

- Rule Conflict Resolution:
  - Priority: Regulation rule > Client rule > Internal rule.
  - A rule may be defined by selecting conditions, which are generally the account properties, and results which are generally the actions that can be performed on the accounts.

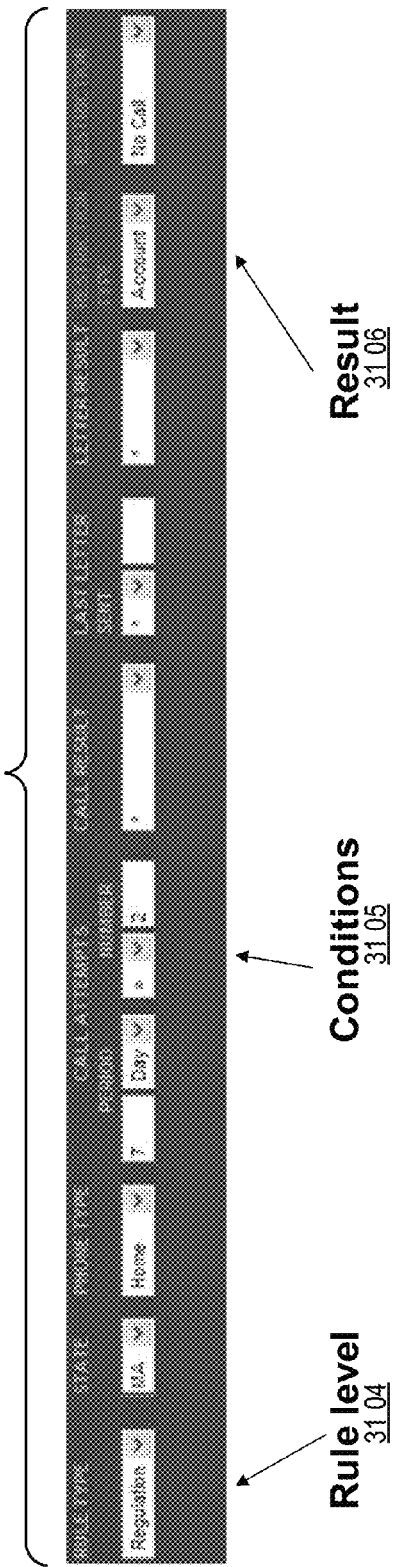

Rule level
31 04

Conditions
31 05

Result
31 06

31 03

APPARATUSES, METHODS AND SYSTEMS FOR A WEB ACCESS MANAGER

PRIORITY CLAIM AND RELATED APPLICATIONS

This application is a Non-Provisional of and claims priority under 35 U.S.C. §119 to prior U.S. Provisional Patent Ser. No. 61/252,611 entitled, "Apparatuses, Methods and Systems for Tailored and Customizable Management of Enterprise and Human Resources," filed Oct. 16, 2009.

This application is also a Continuation-In-Part of and claims priority under 35 U.S.C. §120 to prior U.S. Non-Provisional patent application Ser. No. 12/763,320 entitled, "Apparatuses, Methods and Systems for a Descriptive Business Grammar Syntax Querier," filed Apr. 20, 2010, which in turn claims priority to prior U.S. Non-Provisional patent application Ser. No. 12/650,542 entitled, "Apparatuses, Methods and Systems for a Descriptive Business Grammar Syntax Querier," filed Dec. 31, 2009.

This application is also a Continuation-In-Part of and claims priority under 35 U.S.C. §120 to prior U.S. Non-Provisional patent application Ser. No. 12/760,948 entitled, "Apparatuses, Methods and Systems for a Universal Data Librarian," filed Apr. 15, 2010, which in turn claims priority to prior U.S. Non-Provisional patent application Ser. No. 12/650,493 entitled, "Apparatuses, Methods and Systems for a Universal Data Librarian," filed Dec. 30, 2009.

This application is also a Continuation-In-Part of and claims priority under 35 U.S.C. §120 to prior U.S. Non-Provisional patent application Ser. No. 12/762,570 entitled, "Apparatuses, Methods and Systems for a Global Data Exchange," filed Apr. 19, 2010, which in turn claims priority to prior U.S. Non-Provisional patent application Ser. No. 12/650,442 entitled, "Apparatuses, Methods and Systems for a Global Data Exchange," filed Dec. 30, 2009.

This application is also a Continuation-In-Part of and claims priority under 35 U.S.C. §120 to prior U.S. Non-Provisional patent application Ser. No. 12/763,331 entitled, "Apparatuses, Methods and Systems for an Automated Data Extractor," filed Apr. 20, 2010, which in turn claims priority to prior U.S. Non-Provisional patent application Ser. No. 12/650,530 entitled, "Apparatuses, Methods and Systems for an Automated Data Extractor," filed Dec. 30, 2009.

This application is also a Continuation-In-Part of and claims priority under 35 U.S.C. §120 to prior U.S. Non-Provisional patent application Ser. No. 12/762,577 entitled, "Apparatuses, Methods and Systems for a Real-Time Desktop Configurer," filed Apr. 19, 2010, which in turn claims priority to prior U.S. Non-Provisional patent application Ser. No. 12/650,548 entitled, "Apparatuses, Methods and Systems for a Real-Time Desktop Configurer," filed Dec. 31, 2009.

This application is also related to co-pending U.S. Non-Provisional patent application Ser. No. 12/903,796 filed Oct. 13, 2010, entitled "Apparatuses, Methods and Systems for a Call Restrictor"; and U.S. Non-Provisional patent application Ser. No. 12/903,765 filed Oct. 13, 2010, entitled "Apparatuses, Methods and Systems for a Call Searcher".

The entire contents of the aforementioned applications are herein expressly incorporated by reference.

FIELD

The present invention is directed generally to apparatuses, methods, and systems of communications management, and more particularly, to APPARATUSES, METHODS AND SYSTEMS FOR A WEB ACCESS MANAGER.

BACKGROUND

The advent of ubiquitous computing technologies has yielded a proliferation of electronic resources and related data, which is often stored in databases. Databases and the content stored therein may be stored and/or organized in a variety of different schemes and arrangements, such as flat model databases, hierarchical databases, and relational databases. Database management systems have come about, facilitating the creation, control, and management of databases and database content. Some database management systems use database computer languages, such as the structured query language ("SQL"), to facilitate database queries, transactions, and other manipulations. Organizations have employed databases in managing their information and electronic resources.

SUMMARY

The APPARATUSES, METHODS AND SYSTEMS FOR AN AUTOMATED DATA EXTRACTOR-BASED WEB ACCESS MANAGER (hereinafter "ADE-WAM") implement efficient and scalable monitoring, regulation, and allocation of computational processing, data, labor, and/or the like resources within an enterprise. In some embodiments, the ADE-WAM may access data via a plurality of universal variables linked to tables and/or fields across multiple, otherwise disparate database systems, providing economical access to data in those tables and/or fields. In some implementations, the universal variables may be selectively chosen for broad applicability to a vast swath of enterprise data types and organizations, and may themselves be organized in accordance with a hierarchical schema facilitating business understanding and decision making. The ADE-WAM may further facilitate, in various implementations, report generation, data accessibility, scheduled and/or triggered distribution of data updates, and/or the like through the use of universal variables and economical interface features.

In various implementations and embodiments, ADE-WAM systems may facilitate: generation and maintenance of a universal business data library; a descriptive business grammar linked to and substantially tracking tables within the universal business data library and search methodologies based thereon; a global data exchange and universal data mapping tool; an automated data extractor; accounting journal entry automation and a chart/report clarifier; elimination of cash reconciliation requirements; invoice generation; a global payroll engine; cost center automation and graphical management; a universal payment integrator; transactional tagging; thin-client virtualization, tailored application provision, and device configuration; softphone configuration and personalization; storage configuration; user interface configuration and personalization; rules-based world wide web restriction; call recording and searching; payclock virtualization; call restriction and regulation; disclosure and/or disclaimer automation; rules-based referral bonus generation and payment tracking; emotional aptitude evaluation; streamlined labor resource allocation; purse-based global benefits planning; universal form resources; an integrated employee training platform; automatic reimbursement facilitation; graphical interactive voice response system programming; hardware asset utilization tracking and reporting; target contact estimation tools; strategic auto-dialing; estimation tools for payment collection efficacy; action sequence tools for collection strategy implementations; and/or the like and use of the ADE-WAM.

In one embodiment, an automated data extracting processor-implemented method is disclosed, comprising: receiving a data report specification including at least a limiter and a chooser; generating a database query statement based on the chooser; querying tables in a database associated with the limiter using the database query statement; retrieving at least one data value corresponding to the chooser based on the querying; and generating a report comprising the at least one data value.

In another embodiment, an automated data extracting processor-implemented method is disclosed, comprising: receiving an output specification comprising a plurality of universal variables, wherein the plurality of universal variables are linked to a plurality of table fields in at least one database; receiving an output target identifier; receiving an output trigger condition; retrieving a plurality of data values associated with the plurality of table fields; providing the plurality of data values to the output target after occurrence of the output trigger condition.

In one embodiment, a call restricting processor-implemented method is disclosed, comprising: obtaining a transmission related to a call request, the transmission including a value for a call attribute; extracting from the transmission the value for the call attribute; querying a database using the extracted value for the call attribute; obtaining a call rule to apply to the call request, based on querying the database; applying the call rule to the call request; and determining via a processor whether the call is permitted based on applying the call rule to the call request; wherein the transmission is one of: a media packet transmitted during an ongoing communication; and an invitation to initiate a communication session.

In one embodiment, a call searcher processor-implemented method is disclosed, comprising: obtaining an indication to perform call analytics on a communications session; recording the communications session upon obtaining the indication; analyzing via a processor the recording to determine call ratings; obtaining a call tagging rule; associating a call tag with the communications session based on the call ratings and the call tagging rule; obtaining a review request for the communications session; providing a notification of the call tag and the recording of the communications session for review upon obtaining the review request; obtaining an indication to modify the communications session in response to providing the notification; and modifying the communications session according to the obtained indication.

In one embodiment, a web access management processor-implemented method is disclosed, comprising: obtaining a request for network resource access; extracting from the network resource access request a request attribute; querying a database using the extracted request attribute; obtaining a network access rule to apply to the network resource access request, based on querying the database; applying the network access rule to the network resource access request; and determining via a processor whether the network resource access is permitted based on applying the network access rule to the network resource access request; determining that the network resource access is permitted, based on applying the network access rule to the network resource access request; and forwarding the request for processing the network resource access request.

BRIEF DESCRIPTION OF THE DRAWINGS

The accompanying appendices and/or drawings illustrate various non-limiting, example, inventive aspects in accordance with the present disclosure:

FIG. 2B shows an implementation of a user interface for specifying user application privileges in one embodiment of ADE-WAM operation;

FIG. 16 shows an implementation of a user interface for universal variable allocation in one embodiment of ADE-WAM operation;

FIG. 17 shows another implementation of a user interface for universal variable allocation in one embodiment of ADE-WAM operation;

FIGS. 20 and 21 show implementations of data flow for interfacing universal variables to external database fields in one embodiment of ADE-WAM operation;

FIGS. 22A-C show implementations of a user interface for data exchange specification in one embodiment of ADE-WAM operation;

FIG. 26 shows an implementation of a user interface for database integration in one embodiment of ADE-WAM operation;

FIGS. 27A-C show implementations of a user interface for report generation and generated reports in one embodiment of ADE-WAM operation;

FIGS. 30A-E illustrate an implementation of data and logic flow among and between ADE-WAM components and/or affiliated entities for managing a telecommunications session between client terminal users and/or telephone users in an exemplary embodiment of ADE-WAM operation;

FIGS. 31A-E illustrate implementations of a user interface system for 14 entry of call restriction rules into the Call Restrictor database in one embodiment of 15 ADE-WAM operation;

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Application Tailoring and Device Virtualization/Configuration

Figure 1:
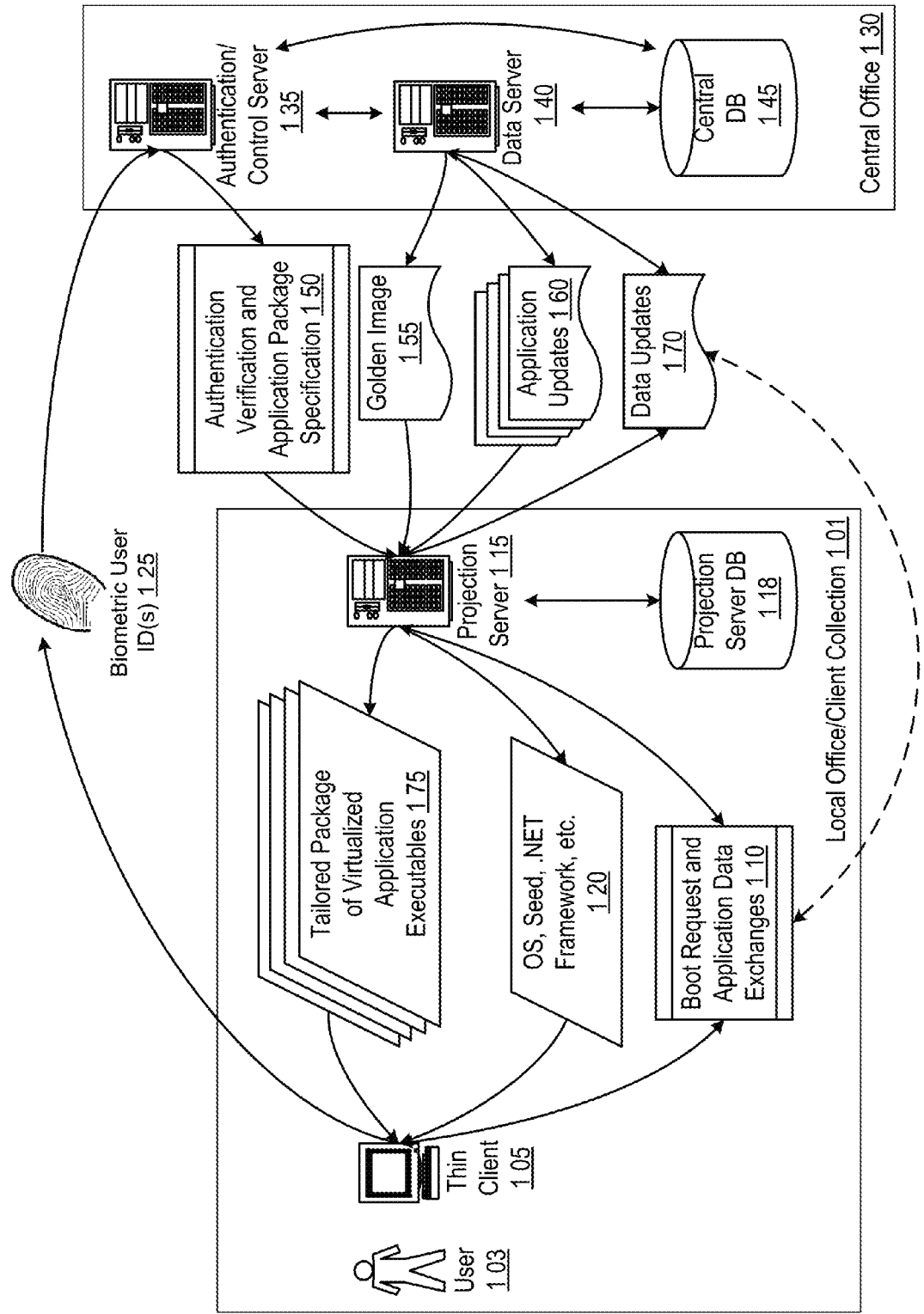
FIG. 1 illustrates an implementation of data flow among and between ADE-WAM components and/or affiliated entities for user authentication and application resource allocation in one embodiment of ADE-WAM operation.

FIG. 1 illustrates a dataflow of an example embodiment of ADE-WAM operation among and between ADE-WAM components and/or affiliated entities for user authentication and application resource allocation. A variety of other compositions and arrangements of ADE-WAM components and affiliated entities may be used in alternative embodiments of ADE-WAM operation. For example, in one embodiment, a ADE-WAM, requesting system, and database may all be localized within a single computing terminal. In another embodiment, the ADE-WAM may receive input strings over a network from one or more mobile devices and provide access to data from one or more databases in response to such received strings. The data flow shown in FIG. 1 is intended for illustrative purposes only, and to describe aspects of a particular embodiment.

In one embodiment, the ADE-WAM includes facilities for thin client virtualization and application tailoring based on user identities and/or profiles. In one implementation, a ADE-WAM computing environment may include a local office and/or collection of client terminals 101, wherein each client terminal 105 operated by a user 103 may comprise a thin client. In one implementation, the thin client may have no operating system initially installed. The computing environment may further include a projection server 115 communicatively coupled to the plurality of client terminals 105 in the local office. In one implementation, the projection server 115 may be situated locally with respect to the plurality of client terminals 105. In one implementation, the projection server may comprise a plurality of servers configured as a cloud computing facility. The computing environment may further include a central office facility 130 comprising one or more data 140 and/or authentication servers 135. A data server 140 in the central office may maintain and/or provide access to a central database 145, which may include master copies of one or more operating systems, applications, data files and/or database tables and/or the like. In one implementation, the data server may supply a so-called Golden Master or Golden Image 155 to the projection server 115, such as on a periodic basis, whenever requested by the projection server, whenever updates are made, and/or the like. The Golden Image 155 may, in one implementation, include an operating system destined for installation on one or more client terminals. The Golden Master may include additional files as well in various implementations, such as an authentication application, seed and/or compressed files for other applications including softphone calling applications, .NET framework files, and/or the like. The data server 140 may further provide a plurality of application files, application file updates 160, data values and/or updates 170, and/or the like to the projection server, which may be destined for installation and/or use on one or more of the client terminals. The projection server 115 may store received application files, data, and/or the like in a projection server database 118. In one implementation, the data server 140 may directly exchange data with one or more client terminals 105, including updated data values, records stored in the central database 145, and/or the like. In one implementation, application files may be "virtualized" prior to installation on the client terminals. In one implementation, application virtualization may be achieved using VMWare Thinapp. In one implementation, application virtualization occurs after application files are received at the projection server. In an alternative implementation, application files are virtualized at the central office, and virtualized application files are then provided to the projection server.

At power on, a client terminal 105 may be configured to boot from a communications network instead of from any local disk. In one implementation, a Preboot Execution Environment (PXE) boot may be engaged to boot the client terminal from the network, wherein the client polls for, contains, and/or is provided an address on the network to obtain boot information and/or to send a boot request. The client terminal's boot request 110 may be relayed to the projection server 115 which, in turn, may provide elements of the Golden Image, such as operating system files, application and/or authentication seed files, .NET framework files, and/or the like 120 for installation at the client terminal. Authentication seed files may then allow a user to submit authentication information in order to identify the user and/or initiate provision of further files and/or application use authorizations. In one implementation, the client terminal may be equipped with one or more biometric login devices (e.g., fingerprint and/or palmprint scanner, retina scanner, facial recognition scanner, earshape recognition scanner, voice recorder, typing rhythm analyzer, and/or the like) configured to admit biometric data associated with a user 125. In one example embodiment, a Digital Persona U.are.U. Fingerprint Reader is employed, which captures an image of the users fingerprint, converts it to a binary format and provides it via a Digital Persona service to the Authentication Control Server 135 server for authentication. In one implementation, software used to engage the one or more biometric login devices is provided from the Golden Image by the projection server to the client terminal after a boot request is made. In one implementation, other authentication measures may be used in place of and/or in addition to biometric authentication, such as use of a password, key device, secret question, and/or the like.

The user may engage the biometric login device and/or any other authentication measures to submit user identification information 125 to an authentication server 135, such as may be located at a central office 130. The authentication server may then verify and/or authenticate the user identification information, such as by comparing it against stored user identification information, e.g., as may be stored in a central database 145, ensuring a match beyond a specified threshold, and/or the like. If a match is detected, the authentication server 135 may query a database (e.g., the central database 145) for a matching user's profile to determine user access authorizations contained therein, such as a package of applications that should be provided to the user. In one implementation, the ADE-WAM may employ Microsoft Active Directory for administration of user access and authorizations, which may run on the Data Server. Based on the user identifier (ID) and/or information in an associated user profile, the ADE-WAM may determine one or more applications that the user is permitted to access. In one implementation, the applications a user may access may be correlated with one or more of a user's company, a user's department, a user's employment position, a user's location, a user's assignment, and/or the like. The authentication server 135 may provide an instruction 150 to the projection server 115 to provide authorized application files to the client terminal 105 at which the user 103 is logged in. In turn, the projection server may provide application files 175, such as in the form of executable virtualized application files, to the client terminal at which the user is logged in. In one implementation, the user my be required to periodically re-enter login and/or authentication information to ensure that they are still the user of that client terminal, and that another user has not taken their place.

Figure 2A:
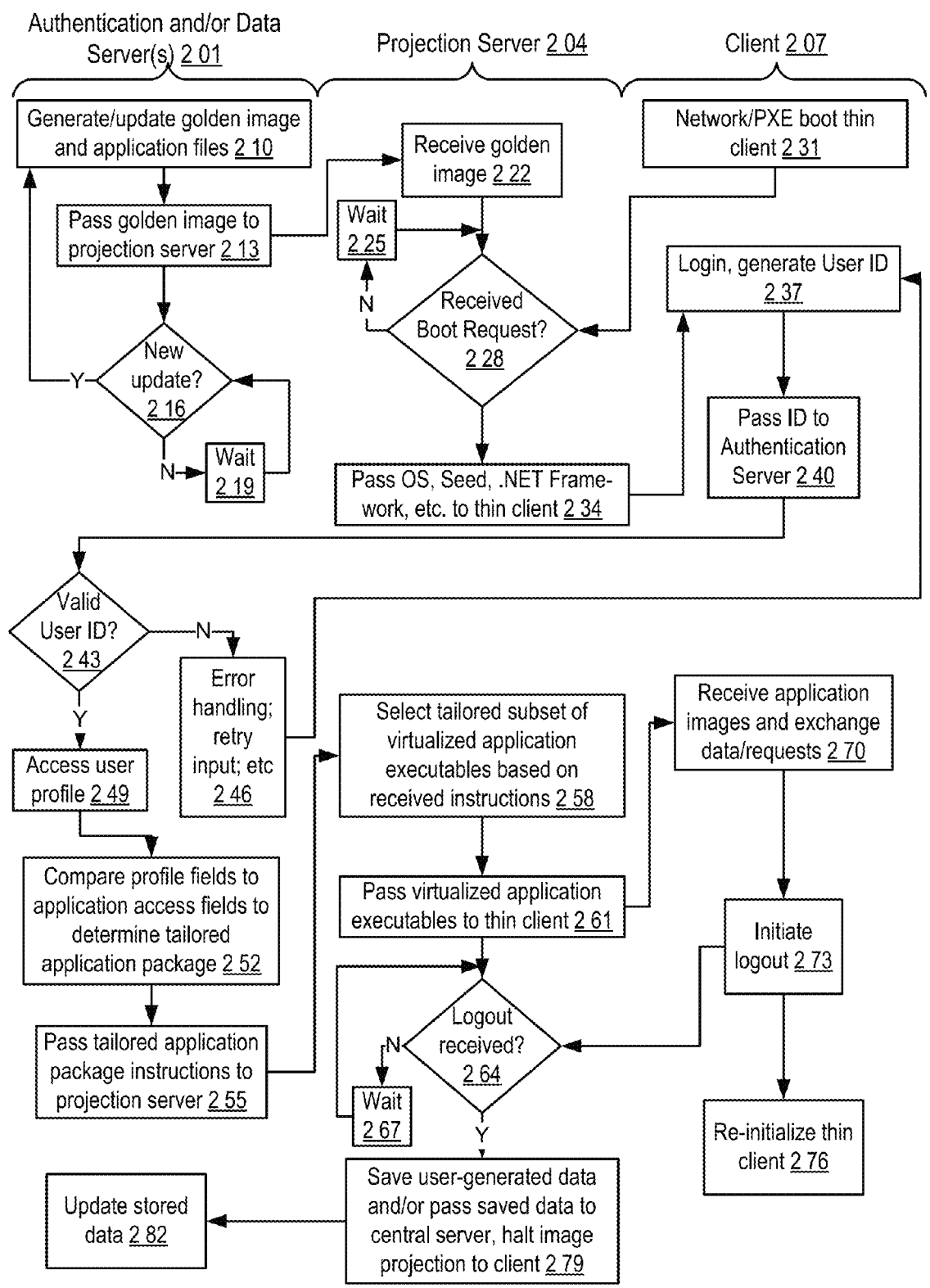
FIG. 2A shows an implementation of logic flow for user authentication and application resource allocation in one embodiment of ADE-WAM operation.

FIG. 2A shows an implementation of logic flow for user authentication and application resource allocation in one embodiment of ADE-WAM operation. The implementation in FIG. 2A indicates entities that may perform aspects of the method shown in some implementations, including authentication and/or data server(s) 201, a projection server 204, and a client terminal 207. The authentication and/or data server(s) 201 may generate and/or update a golden image, application files, data tables and/or records, and/or the like 210 and may pass the golden image and/or other updates to the projection server 213, which receives them at 222. The authentication and/or data server(s) may subsequently determine whether new updates are available for a new golden image 216 and, if not, then wait for a period of time before checking again 219. The projection server, in one implementation, may store the received golden image, application files, data files, and/or the like, such as in a database and/or in temporary storage.

A client terminal may be booted, such as on machine startup, to initiate a network (e.g., PXE) boot 231, passing a boot request over the network, such as to the projection server 204. The projection server 204, in turn, may monitor and/or determine whether a boot request has been received 228. If not, the projection server may wait for a period of time before checking again for a boot request 225. In one embodiment, the boot request may be configured in accordance with the Preboot Execution Environment (PXE) Specification v. 2.1 standard.

Once the request is received, the projection server may pass files and/or data to the client terminal 234, such as by employing HP Image Manager. In one implementation, the projection server may provide all or aspects of the Golden Image to the client terminal, such as: operating system files; .NET framework files, Java files, and/or the like; application seed files; authentication and/or login input (e.g., biometric) files; and/or the like. The client starts the boot process and begins to copy and unpackage the materials provided from the projection server. Using files received from the projection server which have now been executed/instantiated, a user at the client terminal may login and/or otherwise generate a user ID 237. In one implementation, the user ID generated at 237 comprises a biometric user ID, such as but not limited to a thumbprint or scan; a print or scan of any other finger, combination of fingers, part of the palm, and/or the like; an iris or retina scan; facial image scan; earshape image scan; voice audio data; and/or the like. For example, one of the packages received at the thin client may be DigitalPersona Pro and/or other thumbprint device drivers and capture programs. The generated user ID may then be passed to the authentication and/or data server(s) 240 (e.g., by sending it via FTP, HTTP Post, SSH, FTPS, SFTP, HTTPS, another Digital Persona service, and/or the like), which may then determine whether the received ID is valid 243. For example, the send message may include an image converted to binary format and may be sent to a server-side component of DigitalPersona Pro fingerprint authentication application, which will perform the recognition/identification of the biometric identifier. In one implementation, this determination may be made based on a comparison of the received ID with stored IDs, stored ID formatting information, and/or the like. If the user ID is determined to be invalid at 243, an error handling procedure may be undertaken, a request may be transmitted for reentry and/or retransmission of the user ID information, and/or the like 246.

For valid user IDs, the authentication and/or data server(s) may access user information and/or a user profile associated with the user ID 249. Accessed user information may then be used to determine which applications to include in a tailored application package for that user 252. For example, in one implementation, a user profile may have fields identifying authorized applications for that user. In another implementation, profile fields may be compared with application access fields defined separately for the applications, and those applications having appropriately matching fields with the user profile may be selected for that user. For example, a user profile and/or other user information may, in one implementation, identify a department code, program code, and/or the like structured syntax string associated with the user (e.g., as may be see in FIGS. 6-7), and various applications may also have associations with various department codes, program codes, and/or the like. The authentication and/or data server(s) may then, in this implementation, instruct provision applications sharing one or more department codes, program codes, and/or the like with those of the user to the user's client terminal. In one implementation, some or all of the determination of which applications to provide to the user may take place at the projection server, and the authentication and/or data server(s) may provide sufficient information to the projection server to allow it to complete the identification of user-appropriate applications. In some implementations, the user-appropriate applications may include one or more softphone applications facilitating the placement and reception of telephone calls via the user's client terminal.

Once the appropriate package of applications is determined for the user, the authentication and/or data server(s) may pass an instruction message to the projection server 255, the message comprising, in one implementation, specification of applications to be provided to the user. The projection server may receive the instruction and select a package of tailored application files to provide to the client terminal 258. In one implementation, the projection server may select and provide to the client terminal a plurality of virtualized application executable files corresponding to selected applications. For example, FIG. 2B shows an implementation of a user interface for specifying user application privileges in one embodiment of ADE-WAM operation. The user interface provides a system administrator with facilities to specify a policy, rule, and/or the like delineating which employees, groups of employees, third parties, and/or the like should receive which applications and/or application packages. In the illustrated implementation, a user may specify at 285 a client and/or group of clients to which a particular specified application distribution and/or access rule and/or policy should be applied. The application may be specified at 286, and characteristics of users, employees, groups, departments, and/or the like who should receive and/or be allowed to use that application may be specified at 287-292. For example, access characteristics may include an employee title 287, an employee function 288, an employee subfunction 289, a department (as may be specified by a department code, which is discussed in further detail below and with reference to FIG. 7) 290, a program (as may be specified by a program code, which is discussed in further detail below and with reference to FIG. 6) 291, an employee name 292, and/or the like. The interface therefore provides both for specification of application privileges for wide classes of users, as well as for user-friendly exception handling whereby a single user or highly specific class of users may be given special access privileges as needed.

In some implementations, application files received from the authentication and/or data server(s) at 222 may be virtualized at the projection server, such as via application of VMWare's Thinapp to the application files to yield virtualized application executables, such as in .EXE format. In another implementation, application files may be virtualized at the authentication and/or data server(s), and the virtualized application executables provided to the projection server for temporary storage until they are to be provided to the client terminals.

In one implementation, virtualized application executables may be pushed to the thin client using a secure file transfer protocol, secure shell (SSH), and/or the like.

The projection server passes the virtualized application executables to the client terminal 261, which receives, unpackages, and/or runs the files to engage the applications at the client terminal, including exchanges of data related to operation of those applications 270. The projection server may then monitor whether a logout request has been received from the client terminal 264 and, if not, may wait until such a request is received 267. The user at the client terminal may then initiate a logout when he or she is finished with the application session 273, precipitating a re-initialization of the client terminal, whereby data updates are passed over the network to one or more targets, and the client terminal is returned to its pre-login and/or pre-boot state 276. In one embodiment, the terminal may erase (e.g., securely) the contents of its memory to ensure a pre-boot state and enhance security, for example, by issuing root/admin level format command on the storage mechanism, e.g., hard drive. In one implementation, user generated data and/or other saved data may be persisted and/or passed to the authentication and/or data server(s) by the projection server, and projection of application images to the client terminal ceased 279. In an alternative implementation, the client terminal may itself communicate directly with the authentication and/or data server(s) to provide data update information. Data updates received by the authentication and/or data server(s) may be stored and/or persisted, such as in a central database 282.

Figure 3:
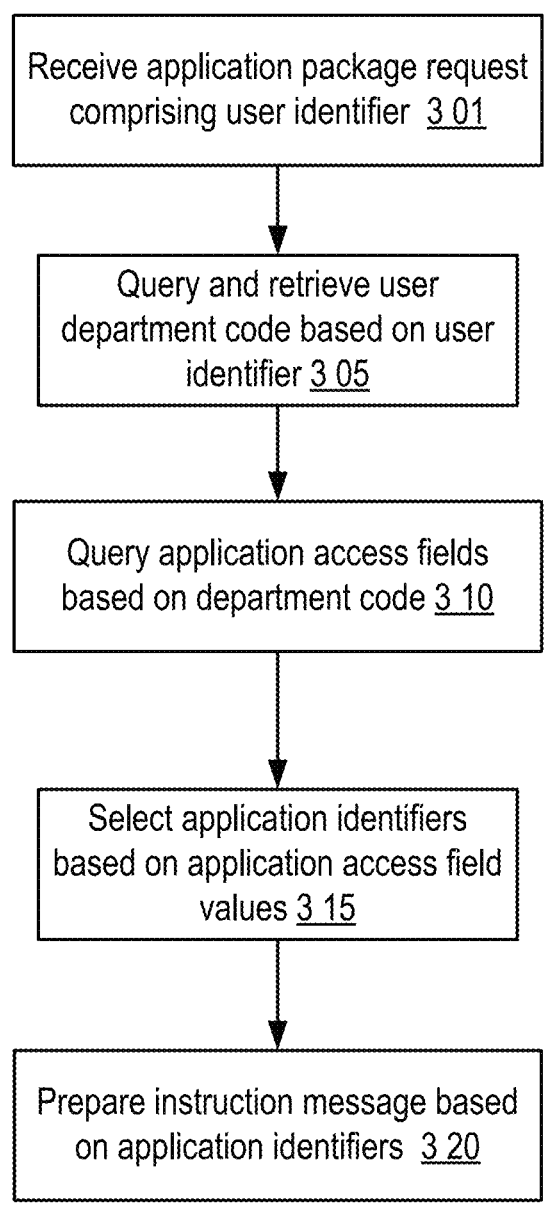
FIG. 3 shows an implementation of logic flow for application tailoring based on department codes in one embodiment of ADE-WAM operation.

FIG. 3 shows an implementation of logic flow for application tailoring based on department codes in one embodiment of ADE-WAM operation. In one implementation, the method illustrated in FIG. 3 may be operable on an authentication and/or data server. An application package request is received, the request comprising at least a user identifier 301. In another implementation, the request may further comprise a client terminal identifier and/or other information to assist in selecting an application package and/or providing requested applications to a client terminal device. A user department code may be queried based on the user identifier 305, such as, in one implementation, by accessing a user profile containing a department code (e.g., see FIG. 7 for more detail on department codes) associated with the user. A query may then be submitted for application access fields based on the department code 310. In one implementation, application access fields may specify applications accessible to users associated with the particular department code. Application identifiers may be selected based on the application access fields 315, and an instruction message may be prepared including the application identifiers 320. In an alternative implementation, application identifiers may be directly selected based on a department code and/or other user information, and/or a rules-based system may specify correspondences between application identifiers and department codes and/or other user information. An example of user information for obtaining application access may take a form similar to the following XML example:

<user_info>
<name> John.Smith </name>
<title> Agent </title>
<function> Operations </function>
<subfunction> "blank" </subfunction>
<department_code> CORP1.OPS.US.CS.TEAM1 </department_code>
</user_info>

In one implementation, one or more fields of user information (e.g., name and department code) may be mandatory, with remaining fields optional. An example of a instruction message response to user information for application access may comprise a list of application identifiers and may, in one implementation, take a form similar to the following XML example:

<response>
<application1> Qallbar </ application1>
<application2> Qorus </ application2>

```
<application3> CRM </application3>
</response>
```

In one implementation, the instruction message may further include a client terminal device identifier to direct the application files to the appropriate target.

Data Construct and Tracking Syntax

Figure 4:
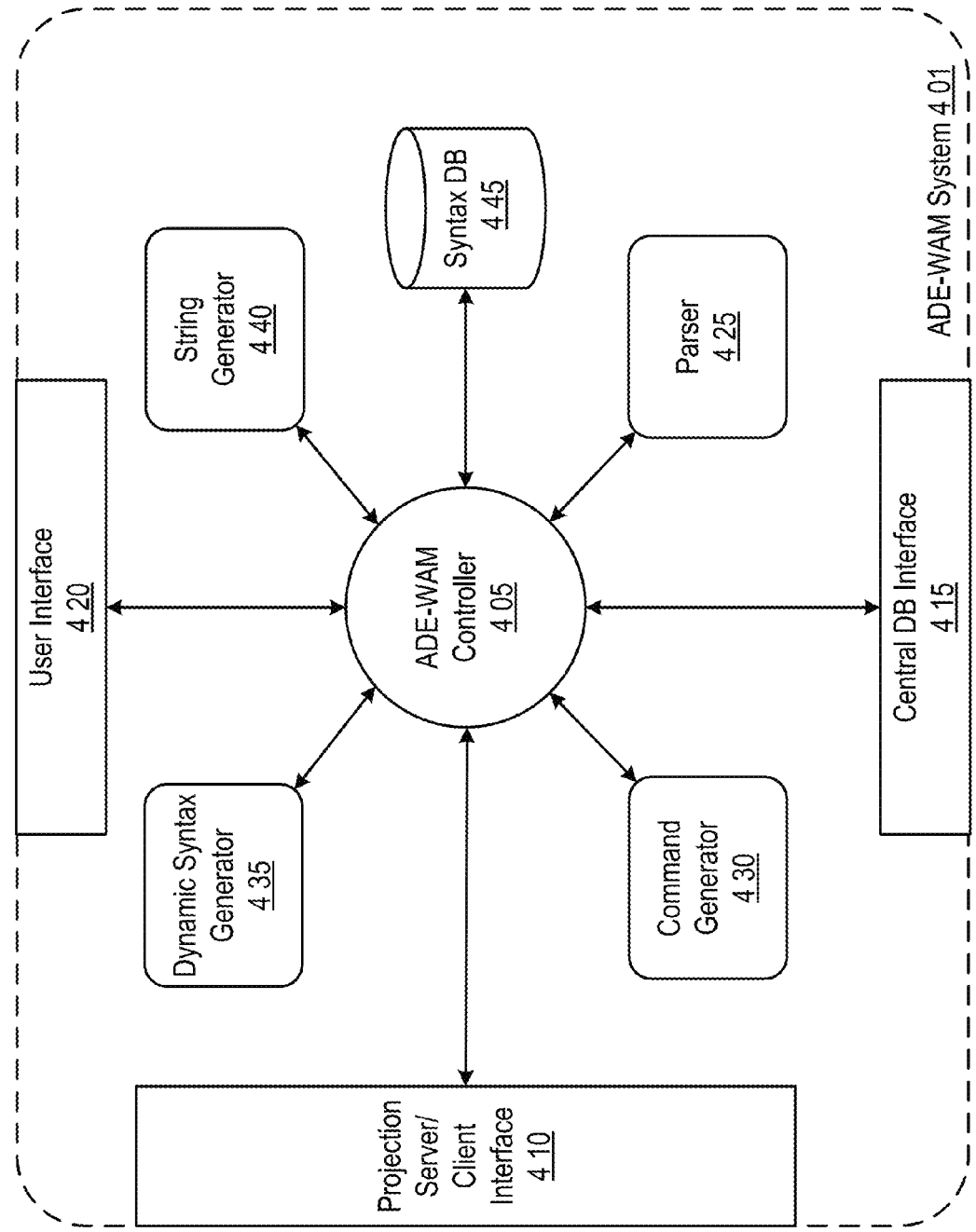
FIG. 4 shows an implementation of data flow between and among ADE-WAM system components in one embodiment of ADE-WAM operation.

FIG. 4 shows an implementation of data flow between and among ADE-WAM system components in one embodiment of ADE-WAM operation. The embodiments illustrated in FIG. 4 are directed to a ADE-WAM system residing at the Authentication/Control Server 135 and/or Data Server 140 shown in FIG. 1. It is to be understood that aspects of the illustrated embodiment directed to integration with the framework shown in FIG. 1 are for illustrative purposes only, and the ADE-WAM system may be deployed in a wide variety of other contexts, including those independent of and apart from the framework illustrated in FIG. 1.

The ADE-WAM system 401 may contain a number of operational components and/or data stores. A ADE-WAM controller 405 may serve a central role in some embodiments of ADE-WAM operation, serving to orchestrate the reception, generation, modification, and distribution of data and/or instructions to, from, and between ADE-WAM components and/or mediate communications with external entities and systems.

In one embodiment, the ADE-WAM controller 405 may be housed separately from other controllers, modules, components and/or databases within or external to the ADE-WAM system, while in another embodiment, some or all of the other modules, components, controllers and/or databases within and/or external to the ADE-WAM system may be housed within and/or configured as part of the ADE-WAM controller. Further detail regarding implementations of ADE-WAM controller operations, modules, components and databases is provided below.

In the implementation illustrated in FIG. 4, the ADE-WAM system may be integrated as part of an authentication/control and/or data server, and the ADE-WAM controller 405 may be configured to couple to external entities and/or systems via one or more interface components. For example. the ADE-WAM controller 405 may be coupled to a projection server/client interface 410. In one implementation, the projection server/client interface 410 may mediate communications to and from a remote projection server and/or one or more client terminals, such as to receive data requests, data inputs, table-tracking syntax configured strings, rule specifications, organizational structure specification and/or inputs, instructions, and/or the like and to return data, rules, instructions, parsed string tokens, generated table-tracking syntax configured strings, and/or the like. The ADE-WAM controller 405 may further be coupled to a central database interface 415. In one implementation, the central database interface 415 may mediate communications to and from a remote central database to send parsed string tokens, data updates, rules, data requests, and/or the like and to receive requested data, rules, table identifiers, field identifiers, column identifiers, and/or the like. The ADE-WAM controller 405 may further be coupled to a user interface 420. In one implementation, the user interface 420 may mediate communications to and from a user to receive administrator inputs, settings, configuration inputs and/or files, table-tracking syntax configured strings, data requests, data inputs, updates, and/or the like and to send graphical user interface screens, requested data, generated strings, and/or the like. In various implementations, one or more of the interface components described above may serve to configure data into application, transport, network, media access control, and/or physical layer formats in accordance with a network transmission protocol, such as, but not limited to FTP, TCP/IP, SMTP, Short Message Peer-to-Peer (SMPP), and/or the like. For example, the interfaces may be configured for receipt and/or transmission of data to an external and/or network database. The interfaces may further be configurable to implement and/or translate Wireless Application Protocol, VOIP, and/or the like data formats and/or protocols. The interfaces may further house one or more ports, jacks, antennas, and/or the like to facilitate wired and/or wireless communications with and/or within the ADE-WAM system.

In one implementation, the ADE-WAM controller 405 may further be coupled to a plurality of components configured to implement ADE-WAM functionality and/or services. For example, the ADE-WAM controller 405 may be coupled to a Parser component 425 which may, in one implementation, be configured to parse received input strings into constituent string tokens and/or otherwise implement interpretation of inputs in accordance with one or more table-tracking syntaxes and/or descriptive business grammars. The Parser component 425 may further be configured to parse inputs into a table-tracking syntax configured input string and attendant data, instructions, requests, and/or the like (e.g., a search query, data input, rule request, and/or the like accompanying a table-specifying input string). The ADE-WAM controller 405 may further be coupled to a Command Generator component 430 which may, in one implementation, be configured to generate database manipulation commands, queries, data input and/or storage commands, and/or the like, such as based on tokens extracted from received input strings. For example, in one implementation, the Command Generator component 430 may be configured to receive parsed string tokens, such as from the Parser component 425, and generate a SQL Select command to query data from a ADE-WAM database and/or generate a SQL Insert Into command to enter attendant data into a ADE-WAM database. Implementations such as these are illustrated in further detail below. The ADE-WAM controller 405 may further be coupled to a Dynamic Syntax Generator component 435, which may, in one implementation, be configured to dynamically generate a syntax and/or strings configured with a dynamic syntax in response to user action. For example, in one implementation, the Dynamic Syntax Generator may engage a graphical user interface, such as may be provided to a client terminal via the Projection Server/Client Interface 410 and/or the User Interface 420, that is accessible by a user and that admits inputs indicative of an organizational structure, said inputs instructing the formation and/or organization of the dynamic syntax. The ADE-WAM controller 405 may further be coupled to a String Generator component 440, which may, in one implementation, be configured to generate strings in association with various inputs and/or stored data. For example, in one implementation, the String Generator 440 may be configured to generate strings based on organizational hierarchies generated by and/or with the Dynamic Syntax Generator 435. In another implementation, the String Generator 440 may be configured to generate strings matching data queries, such as may be submitted by a user, to see any and/or all syntax-configured strings that match the data query.

In one implementation, the ADE-WAM controller 405 may further be coupled to one or more databases configured to store and/or maintain ADE-WAM data. A Syntax database 445 may contain information pertaining to string token types and/or sequences, delimiters, string token lengths, syntax identifiers, dynamic syntax parameters, and/or the like. In some implementations, the ADE-WAM may compare received input strings with fields and/or records in the Syntax database 445 in order to verify formatting of the input string, assist in parsing the string, and/or the like.

Figure 5A:
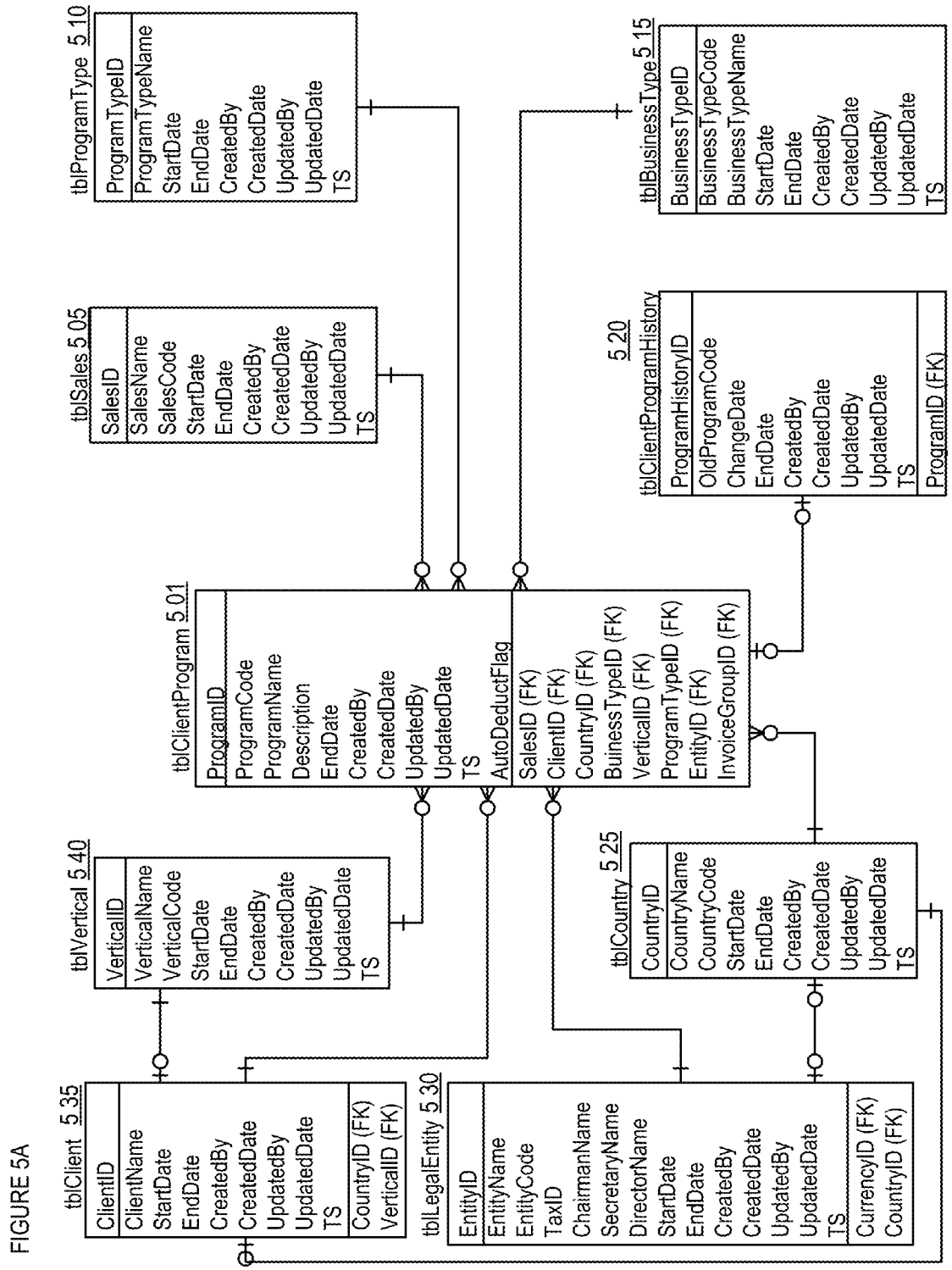
FIGS. 5A-5C show aspects of implementations of data models in one embodiment of ADE-WAM operation.
Figure 5B:
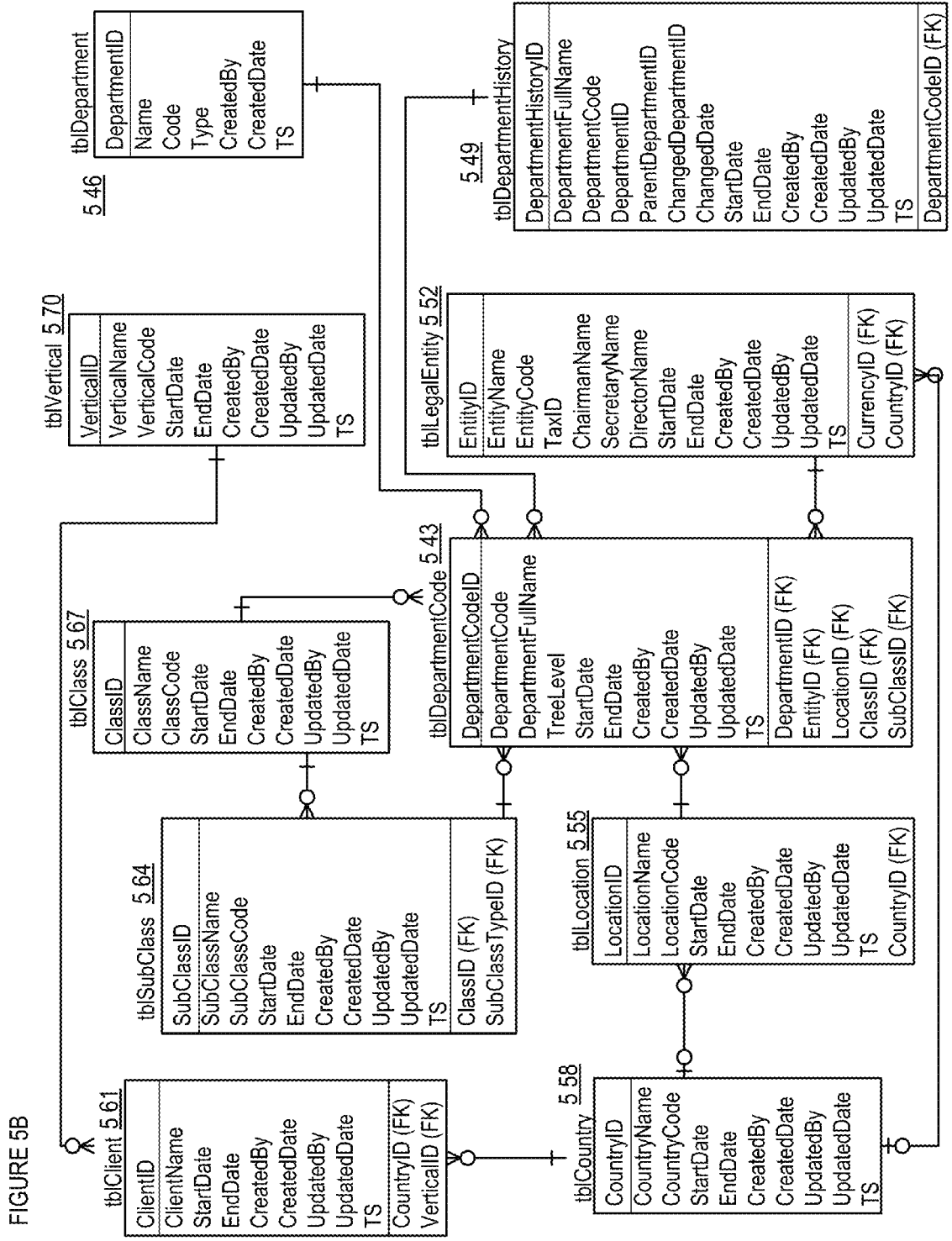
Figure 5C:
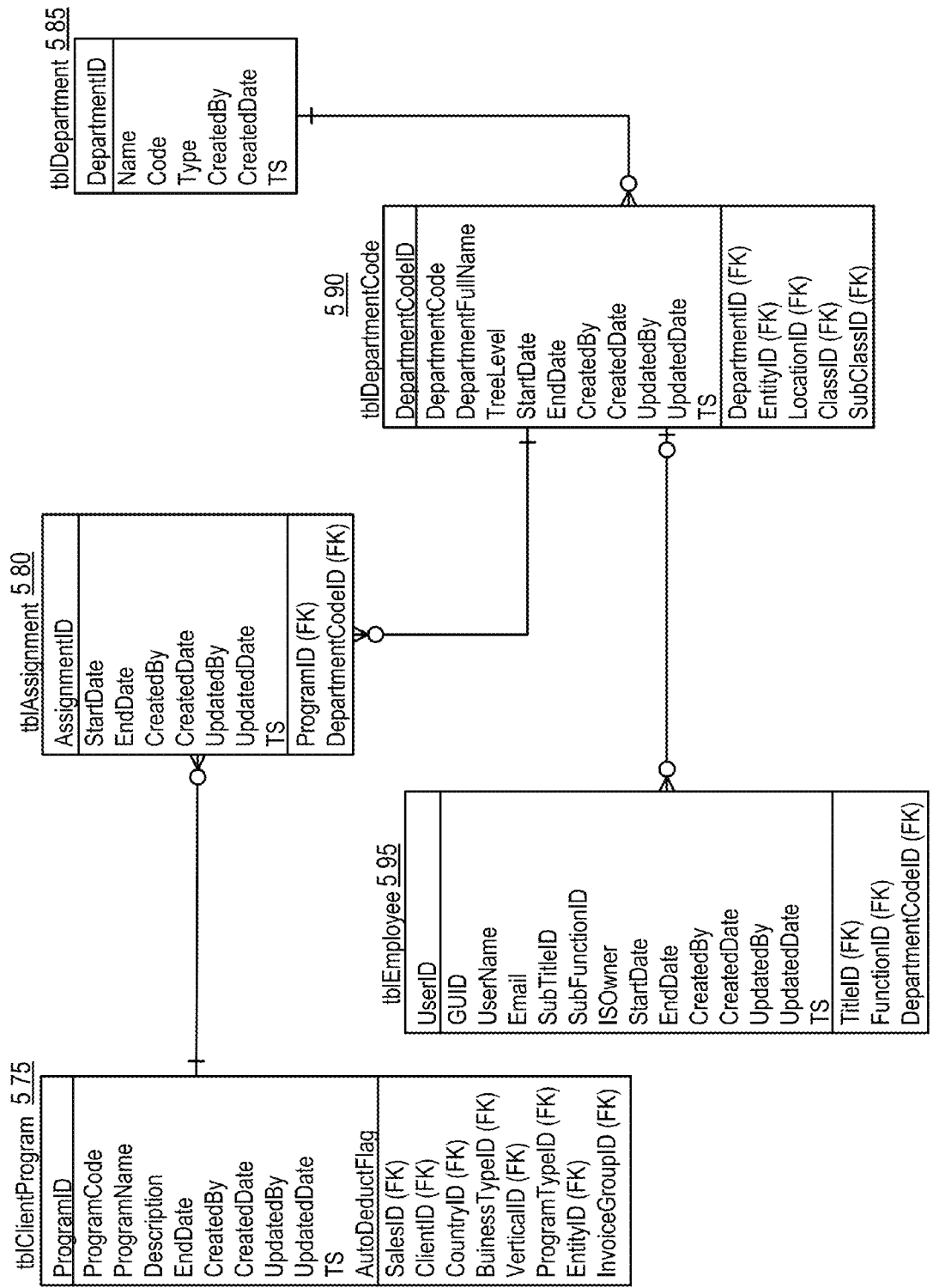

FIGS. 5A-5C show aspects of implementations of data models in one embodiment of ADE-WAM operation. The tables shown in FIGS. 5A-5C may, in one implementation, be stored in a central database such as that shown at 145 in FIG. 1 and accessible to the ADE-WAM via the central database interface 415 in FIG. 4.

FIG. 5A shows an implementation of a data model illustrating relationships among a group of database tables pertaining to Programs. A ClientProgram table 501 may include fields allowing specification of records pertaining to the organization of an enterprise's clients, the type(s) of work performed for them, and/or the like. In one implementation, a ClientProgram table 501 may include fields such as, but not limited to: ProgramID, ProgramCode, ProgramName, Description, EndDate, CreatedBy, CreatedDate, UpdatedBy, UpdatedDate, Timestamp (TS), AutoDeductFlag, SalesID foreign key (FK), ClientID (FK), CountryID (FK), BusinessTypeID (FK), VerticalID (FK), ProgramTypeID (FK), EntityID (FK), InvoiceGroupID (FK), and/or the like. The ClientProgram table 501 may be linked to a variety of other tables, including so-called atomic-level tables, via the foreign keys specified therein. For example, the ClientProgram table 501 may be linked to a Sales table 505, which may include fields allowing specification of records pertaining to sales made in association with a particular client, type of work performed for them, and/or the like. In one implementation, a Sales table 505 may include fields such as, but not limited to: SalesID, SalesName, SalesCode, StartDate, EndDate, CreatedBy, CreatedDate, UpdatedBy, UpdatedDate, TS, and/or the like. The ClientProgram table 501 may further be linked to a ProgramType table 510, which may include fields allowing specification of records pertaining to the types of work performed for clients. In one implementation, a ProgramType table 510 may include fields such as, but not limited to: ProgramTypeID, ProgramTypeName, StartDate, EndDate, CreatedBy, CreatedDate, UpdatedBy, UpdatedDate, TS, and/or the like. The ClientProgram table 501 may further be linked to a BusinessType table 515, which may include fields allowing specification of records pertaining to the types of businesses associated with clients, the types of business between an enterprise and a client, and/or the like. In one implementation, a BusinessType table 515 may include fields such as, but not limited to: BusinessTypeID, BusinessTypeCode, BusinessTypeName, StartDate, EndDate, CreatedBy, CreatedDate, UpdatedBy, UpdatedDate, TS, and/or the like. The ClientProgram table 501 may further be linked to a ClientProgramHistory table 520, which may include fields allowing specification of records pertaining to historical and/or time-resolved client programs. In one implementation, a ClientProgramHistory table 520 may include fields such as, but not limited to: ProgramHistoryID, OldProgramCode, ChangeDate, EndDate, CreatedBy, CreatedDate, UpdatedBy, UpdatedDate, TS, ProgramID (FK), and/or the like. The ClientProgram table 501 may further be linked to a Country table 525, which may include fields allowing specification of records pertaining to countries. In one implementation, a Country table 525 may include fields such as, but not limited to: CountryID, CountryName, CountryCode, StartDate, EndDate, CreatedBy, CreatedDate, UpdatedBy, UpdatedDate, TS, and/or the like. The ClientProgram table 501 may further be linked to a LegalEntity table 530, which may include fields allowing specification of records pertaining to legal entity status, tax status, personnel and/or the like of enterprises, clients, and/or the like. In one implementation, a LegalEntity table 530 may include fields such as, but not limited to: EntityID, EntityName, EntityCode, TaxID, ChairmanName, SecretaryName, DirectorName, StartDate, EndDate, CreatedBy, CreatedDate, UpdatedBy, UpdatedDate, TS, CurrencyID (FK), CountryID (FK), and/or the like. The ClientProgram table 501 may further be linked to a Client table 535, which may include fields allowing specification of records pertaining to clients and/or client information. In one implementation, a Client table 535 may include fields such as, but not limited to: ClientID, ClientName, StartDate, EndDate, CreatedBy, CreatedDate, UpdatedBy, UpdatedDate, TS, CountryID (FK), VerticalID (FK) and/or the like. The ClientProgram table 501 may further be linked to a Vertical table 540, which may include fields allowing specification of records pertaining to market and/or industry categories, and/or the like. In one implementation, a Vertical table 540 may include fields such as, but not limited to: VerticalID, VerticalName, VerticalCode, StartDate, EndDate, CreatedBy, CreatedDate, UpdatedBy, UpdatedDate, TS, and/or the like.

In some implementations, links may exist between lower-level and/or atomic-level tables as well. For example, in the illustrated implementation, the Client table 535 is linked to the Country table 525 and to the Vertical table 540; and the LegalEntity table 530 is linked to the Country table 525. Some tables linked by foreign keys to tables shown in FIG. 5A have been omitted from illustration for the sake of clarity.

FIG. 5B shows an implementation of a data model illustrating relationships among a group of database tables pertaining to Departments. A DepartmentCode table 543 may include fields allowing specification of records pertaining to departments within an enterprise, the organization of the enterprise's departments, and/or the like. In one implementation, a DepartmentCode table 543 may include fields such as, but not limited to: DepartmentCodeID, DepartmentCode, DepartmentFullName, TreeLevel, StartDate, EndDate, CreatedBy, CreatedDate, UpdatedBy, UpdatedDate, TS, DepartmentID (FK), EntityID (FK), LocationID (FK), ClassID (FK), SubClassID (FK), and/or the like. The DepartmentCode table 543 may be linked to a variety of other tables, including so-called atomic-level tables, via the foreign keys specified therein. For example, the DepartmentCode table 501 may be linked to a Department table 546, which may include fields allowing specification of records pertaining to departments within an enterprise, and/or the like. In one implementation, a Department table 546 may include fields such as, but not limited to: DepartmentID, Name, Code, Type, CreatedBy, CreatedDate, TS, and/or the like. The DepartmentCode table 543 may further be linked to a DepartmentHistory table 549, which may include fields allowing specification of records pertaining to the history of department assignments and/or characteristics, and/or the like. In one implementation, a DepartmentHistory table 549 may include fields such as, but not limited to: DepartmentHistoryID, DepartmentFullName, DepartmentCode, DepartmentID, ParentDepartmentID, ChangedDepartmentID, ChangedDate, StartDate, EndDate, CreatedBy, CreatedDate, UpdatedBy, UpdatedDate, TS, and/or the like. The DepartmentCode table 543 may further be linked to a LegalEntity table 552, which may include fields allowing specification of records pertaining to legal entity status, tax status, personnel and/or the like of enterprises, clients, and/or the like. In one implementation, a LegalEntity table 552 may include fields such as, but not limited to: EntityID, EntityName, EntityCode, TaxID, ChairmanName, SecretaryName, DirectorName, StartDate, EndDate, CreatedBy, CreatedDate, UpdatedBy, UpdatedDate, TS, CurrencyID (FK), CountryID (FK), and/or the like. The LegalEntity table 552 may, in turn, be linked to a Country table 558, which may include fields allowing specification of records pertaining to countries. In one implementation, a Country table 558 may include fields such as, but not limited to: CountryID, CountryName, CountryCode, StartDate, EndDate, CreatedBy, CreatedDate, UpdatedBy, UpdatedDate, TS, and/or the like. In the illustrated implementation, the country code may further be linked to a Client table 561, which may include fields allowing specification of records pertaining to clients and/or client information. In one implementation, a Client table 561 may include fields such as, but not limited to: ClientID, ClientName, StartDate, EndDate, CreatedBy, CreatedDate, UpdatedBy, UpdatedDate, TS, CountryID (FK), VerticalID (FK) and/or the like. The Client table 561, in turn, may be linked to a Vertical table 570, which may include fields allowing specification of records pertaining to market and/or industry categories, and/or the like. In one implementation, a Vertical table 570 may include fields such as, but not limited to: VerticalID, VerticalName, VerticalCode, StartDate, EndDate, CreatedBy, CreatedDate, UpdatedBy, UpdatedDate, TS, and/or the like. The DepartmentCode table 543 may further be linked to a Location table 555, which may include fields allowing specification of enterprise locations, and/or the like. In one implementation, a Location table 555 may include fields such as, but not limited to: LocationID, LocationName, LocationCode, StartDate, EndDate, CreatedBy, CreatedDate, UpdatedBy, UpdatedDate, TS, CountryID (FK), and/or the like. The Location table 555 may, in turn, be linked to the Country table 558. The DepartmentCode table 543 may further be linked to a Class table 567, which may include fields allowing specification of records pertaining to classes, such as accounting classes, associated with enterprises, departments, and/or the like. In one implementation, a Class table 567 may include fields such as, but not limited to: ClassID, ClassName, ClassCode, StartDate, EndDate, CreatedBy, CreatedDate, UpdatedBy, UpdatedDate, TS, and/or the like. The DepartmentCode table 543 may further be linked to a SubClass table 564, which may include fields allowing specification of records pertaining to subclasses, such as accounting subclasses, associated with enterprises, departments, and/or the like. In one implementation, a SubClass table 564 may include fields such as, but not limited to: SubClassID, SubClassName, SubClassCode, StartDate, EndDate, CreatedBy, CreatedDate, UpdatedBy, UpdatedDate, TS, ClassID (FK), SubClassTypeID (FK), and/or the like.

In some implementations, links may exist between lower-level and/or atomic-level tables as well. For example, in the illustrated implementation, the Class table 567 is linked to the SubClass table 564. Some tables linked by foreign keys to tables shown in FIG. 5B have been omitted from illustration for the sake of clarity.

FIG. 5C shows an implementation of a data model illustrating relationships among a group of database tables pertaining to Assignments and Employees/Users. An Assignment table 580 may include fields allowing specification of records pertaining to assignments, such as within an enterprise, performed for or on behalf of a client, by a department, and/or the like. In one implementation, an Assignment table 580 may include fields such as, but not limited to: AssignmentID, StartDate, EndDate, CreatedBy, CreatedDate, UpdatedBy, UpdatedDate, TS, ProgramID (FK), DepartmentCodeID (FK), and/or the like. The Assignment table 580 may be linked to a variety of other tables, including so-called atomic-level tables, via the foreign keys specified therein. For example, the Assignment table 580 may be linked to a ClientProgram table 575, which may include fields allowing specification of records pertaining to the organization of an enterprise's clients, the type(s) of work performed for them, and/or the like. In one implementation, a ClientProgram table 575 may include fields such as, but not limited to: ProgramID, ProgramCode, ProgramName, Description, EndDate, CreatedBy, CreatedDate, UpdatedBy, UpdatedDate, Timestamp (TS), AutoDeductFlag, SalesID foreign key (FK), ClientID (FK), CountryID (FK), BusinessTypeID (FK), VerticalID (FK), ProgramTypeID (FK), EntityID (FK), InvoiceGroupID (FK), and/or the like. The Assignment Table 580 may further be linked to a Department Code table 590, which may include fields allowing specification of records pertaining to departments within an enterprise, the organization of the enterprise's departments, and/or the like. In one implementation, a DepartmentCode table 590 may include fields such as, but not limited to: DepartmentCodeID, DepartmentCode, DepartmentFullName, TreeLevel, StartDate, EndDate, CreatedBy, CreatedDate, UpdatedBy, UpdatedDate, TS, DepartmentID (FK), EntityID (FK), LocationID (FK), ClassID (FK), SubClassID (FK), and/or the like. In the illustrated implementation, the DepartmentCode table 590 is further linked to a Department table 585, which may include fields allowing specification of records pertaining to departments within an enterprise, and/or the like. In one implementation, a Department table 585 may include fields such as, but not limited to: DepartmentID, Name, Code, Type, CreatedBy, CreatedDate, TS, and/or the like.

An Employee table 595 may include fields allowing specification of records pertaining to user and/or employee attributes and/or characteristics, and/or the like. In one implementation, an Employee table 595 may include fields such as, but not limited to: UserID, GUID, UserName, Email, SubTitleID, SubFunctionID, ISOwner, StartDate, EndDate, CreatedBy, CreatedDate, UpdatedBy, UpdatedDate, TS, TitleID (FK), FunctionID (FK), DepartmentCodeID, and/or the like. Some tables linked by foreign keys to tables shown in FIG. 5C have been omitted from illustration for the sake of clarity.

Figure 6:
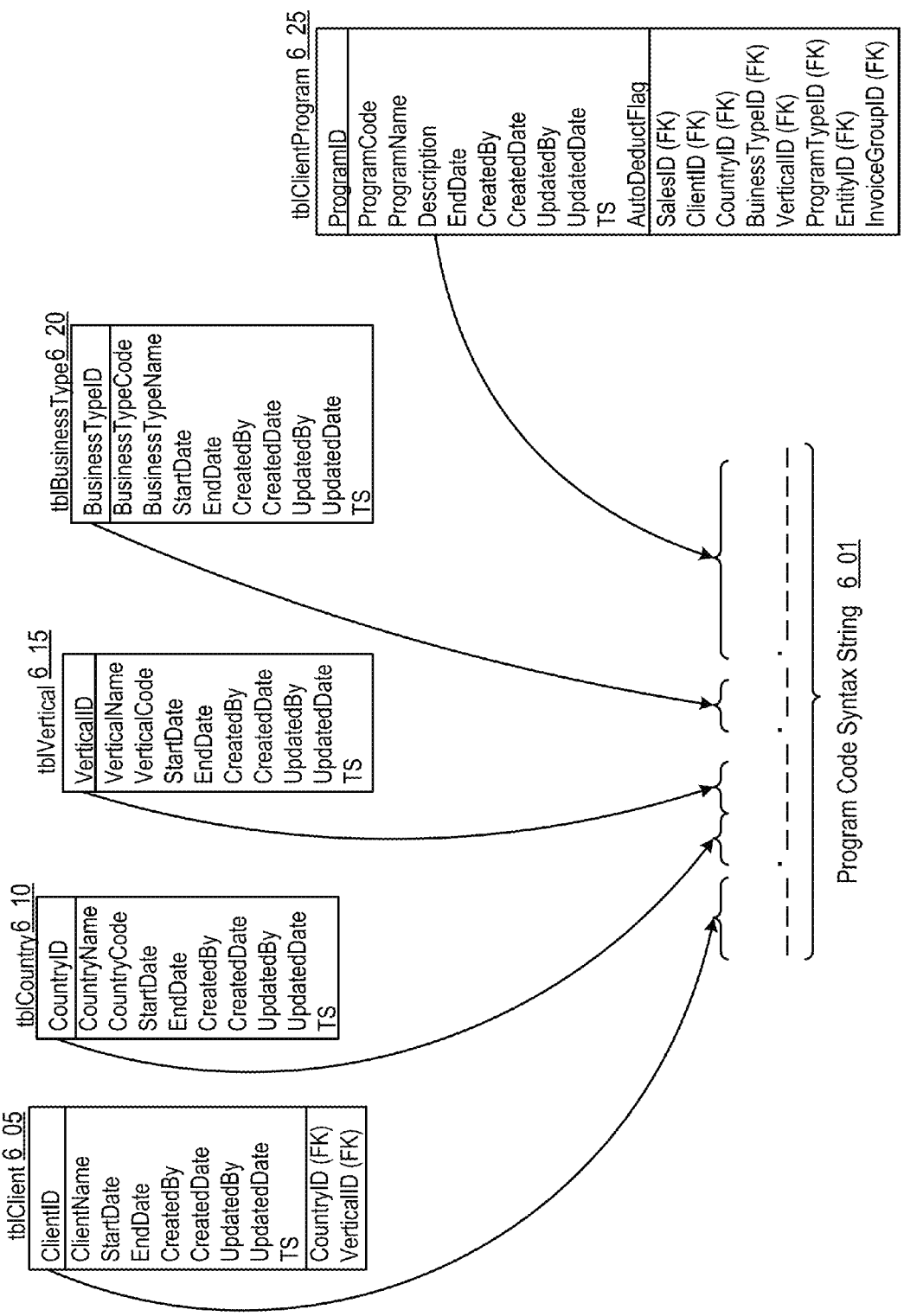
FIG. 6 shows an implementation of a table-tracking string syntax in one embodiment of ADE-WAM operation.

FIG. 6 shows an implementation of a table-tracking string syntax in one embodiment of ADE-WAM operation. In one embodiment, each token in a business grammar syntax 601 tracks to an individual table, e.g., FIG. 5A-C, 605-625. As such, any token used between grammar eliminators may be parsed and supplied as targets as part of an SQL (e.g., Select) command to a ADE-WAM database.

A string is shown at 601 that is configured in accordance with a table-tracking grammar syntax whereby delimited string tokens correlate with and/or correspond to tables in the database. For example, in the illustrated implementation, the string comprises a series of tokes delimited by periods, wherein each token admits a table identifier value corresponding to one of the indicated tables. The first token of the string at 601 corresponds to a Client table 605 and may, in one implementation, admit values for the ClientID field. The second token of the string at 601 corresponds to a Country table bio and may, in one implementation, admit values for the CountryID field. The third token of the string at 601 corresponds to a Vertical table 615 and may, in one implementation, admit values for the VerticalID field. The fourth token of the string at 601 corresponds to a BusinessType table 620 and may, in one implementation, admit values for the BusinessTypeID field. In some implementations, the table-tracking string syntax may also include table fields other than table identifier fields. For example, while the fifth token of the string at 601 may be said to correspond to or correlate with a ClientProgram table 625, the token itself admits values for the Description field of that table.

In various implementations of a table-tracking string syntax, various punctuation marks, character, and/or the like (e.g., periods, commas, dashes, blank spaces, hash marks, dollar signs, asterisks, and/or the like and/or any combination or sequence thereof) may be used in different combinations and arrangements to delimit string tokens. For example, in one implementation, periods may be placed between pairs of string tokens (e.g., the period between the client and country tokens in the string at 601). In one implementation, every pair of string tokens is separated by delimiting punctuation, such as a period. In another implementation, one or more pairs of tokens may have alternative punctuation and/or characters delimiting them than other token pairs, and/or may have no delimiting punctuation and/or characters whatsoever. For example, the country token 610 and vertical token 615 in the string at 601 are not delimited by any additional characters or punctuation. In one implementation, a string interpreting component may have a pre-set token length stored for a given table-tracking syntax and may parse the string based, for example, on the number of characters at a certain point in the string, following a particular delimiter, and/or the like.

In some implementations, the table-tracking syntax may comprise a descriptive business grammar having string tokens that correspond to table fields determined and/or expected to have strong descriptive correlation with business properties and/or behaviors. For example, the implementation of a program code string syntax shown in FIG. 6 has string tokens corresponding to a client name, country, vertical (e.g., industry, company position in a supply chain, and/or the like), business type (e.g., nature of services provided to a client), and a client program description. Any of a wide variety of other tables and/or table fields may be correlated with string tokens in other implementations of descriptive business grammars. In one implementation, tables and/or table fields comprising a string syntax in a descriptive business grammar may be selected by a ADE-WAM administrator. In an alternative implementation, tables and/or table fields having strong descriptive correlation with business properties and/or behaviors may be determined systematically by selecting one or more business properties and/or behaviors of interest (e.g., size, revenue, common business rules, and/or the like) and performing a discriminant analysis, classification and/or regression tree analysis, and/or the like statistical analysis to select a subset of tables and/or table fields from a larger set, the subset having maximal correlation with the business properties and/or behaviors of interest.

In one implementation, a table-tracking string syntax may take a form that is static and pre-set, such that the number, arrangement, selection, and/or the like of string tokens is fixed and/or substantially the same for each instance of a string formed in accordance with the syntax. In another implementation, a table-tracking string syntax may be formed dynamically, such as based on user inputs, and different strings formed in accordance with the syntax may appear different, have a different number, selection, arrangement, and/or the like of tokens and/or the like. For example, hierarchical properties of a system (e.g., departments of an organization) may be indexed with a dynamic table-tracking string syntax having a selection and/or number of tokens representing a position of a given property within the hierarchy. FIG. 7 shows a schematic illustration of correlations between positions within an organizational hierarchy and corresponding strings configured with a dynamic, hierarchical table-tracking syntax in one embodiment of ADE-WAM operation. The organizational hierarchy 701 is configured as a tree depicting departments within an organization, with each node of the tree representing a descriptor or characteristic of a corresponding department, division, and/or the like. In turn, each displayed characteristic may correspond to a table, table identifier, table field, and/or the like in a database. The root node 710 corresponds to the organization depicted (XYZ Corp.) and may represent a table field and/or table identifier for, for example, a EntityID, EntityName, ClientID, ClientName, and/or the like. Also depicted in the figure are a series of so-called Department Codes 705 comprising dynamic, hierarchical table-tracking syntax configured strings correlated with nodes in the organizational hierarchy 701, wherein each token in the string corresponds to and/or correlates with one of the descriptors and/or characteristics of the organizational department represented at a given node of the organizational hierarchy tree 701. In one implementation, a department code configured with a dynamic, hierarchical table-tracking syntax may include any and/or a particular class of logical arrangements of descriptors, including but not limited to: function, sub-function, country, location, vertical, business type, client, team, and/or the like.

For example, the root node depicting the identity of the organization, XYZ Corp. 710, has a corresponding department code of "XYZ" 715. A sub-node emanating from the root note, such as the "Analytics" department shown at 720, may then have a corresponding department code with a root token as in 715, but with the addition of a new token (ANA) delimited from the root token to yield XYZ.ANA 725. The addition of further levels of hierarchy may add further tokens to the string syntax. Depending on the hierarchical arrangement of organizational descriptors in the organizational tree 701, different department codes 705 may be generated having tokens in similar positions in the strings which, nevertheless, correspond to different types of descriptors, different tables, different table identifiers, and/or the like. For example, in the illustrated implementation, the department code at 730, XYZ.MAR.US.LA, has a concluding token "LA" indicating a location of the department (i.e., in Los Angeles 735). On the other hand, the department code at 740, XYZ.OPS.CA.A, has a concluding token "A" that is also in the fourth position of the string but, here, indicates a team affiliation (i.e., Team A 745). In one implementation, the ADE-WAM may parse a dynamic, hierarchical table-tracking syntax configured string in a hierarchical manner, proceeding from a root token which may, in some implementations, always correspond to a particular table, table identifier, table field, and/or the like, and then progressively comparing subsequent string tokens to table fields and/or linked tables until matches are found permitting identification of the tables, table identifiers, table fields, and/or the like to which the string tokens correspond. As such, the number of delimiters may indicate the relative hierarchical position of a value, but the tokens within the delimiters may represent the types of categorization; this has the very powerful advantage allowing for orthogonal constructs of disparate data types within the grammar without excess duplication of descriptors and greater number of descriptive permutations; for example, it allows for the decoupling of business categories of information from accounting categories, while allowing permutations therebetween.

Figure 7A:
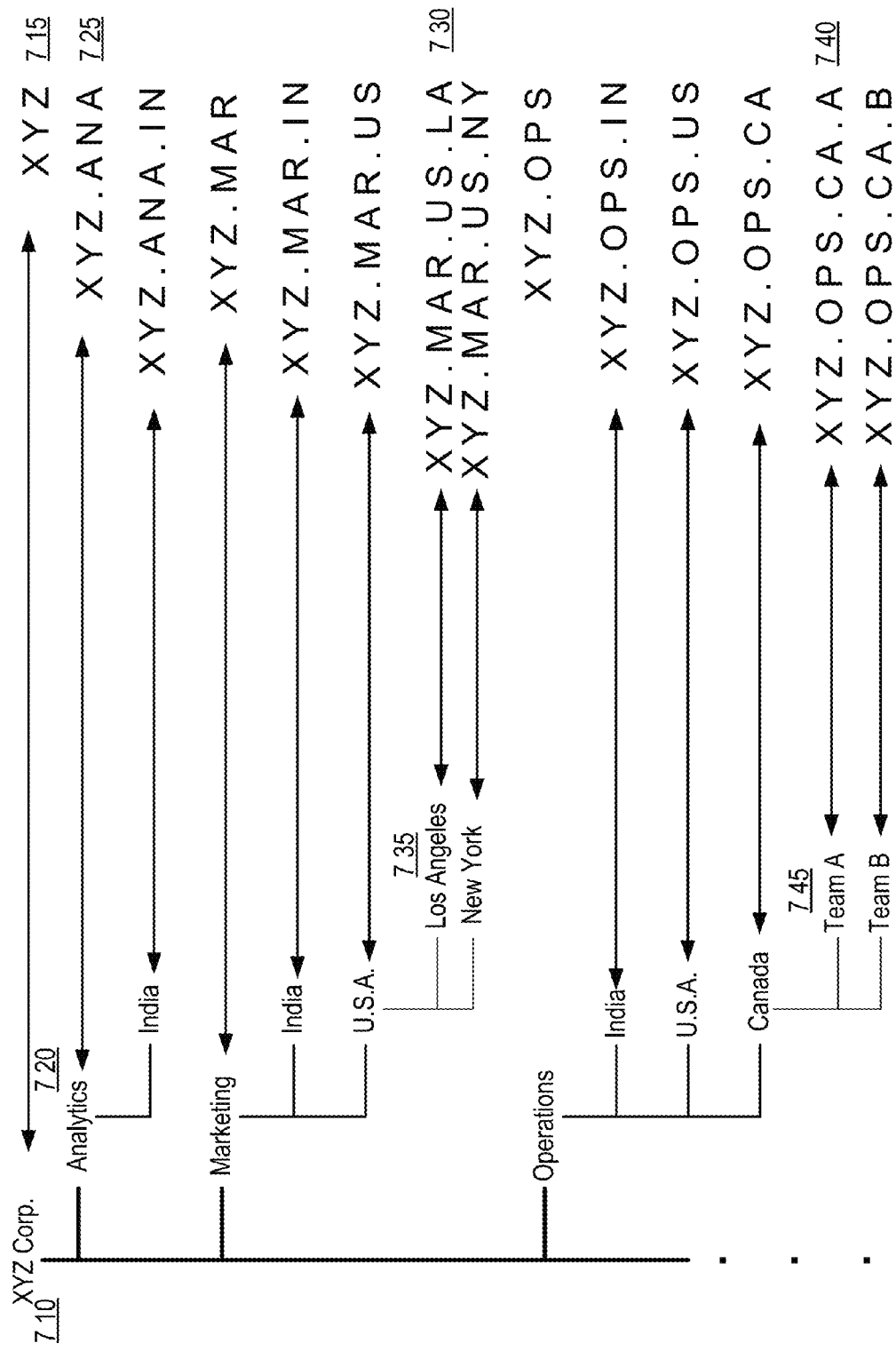
FIG. 7 shows a schematic illustration of correlations between positions within an organizational hierarchy and corresponding strings configured with a dynamic, hierarchical table-tracking syntax in one embodiment of ADE-WAM operation.
Figure 7B:
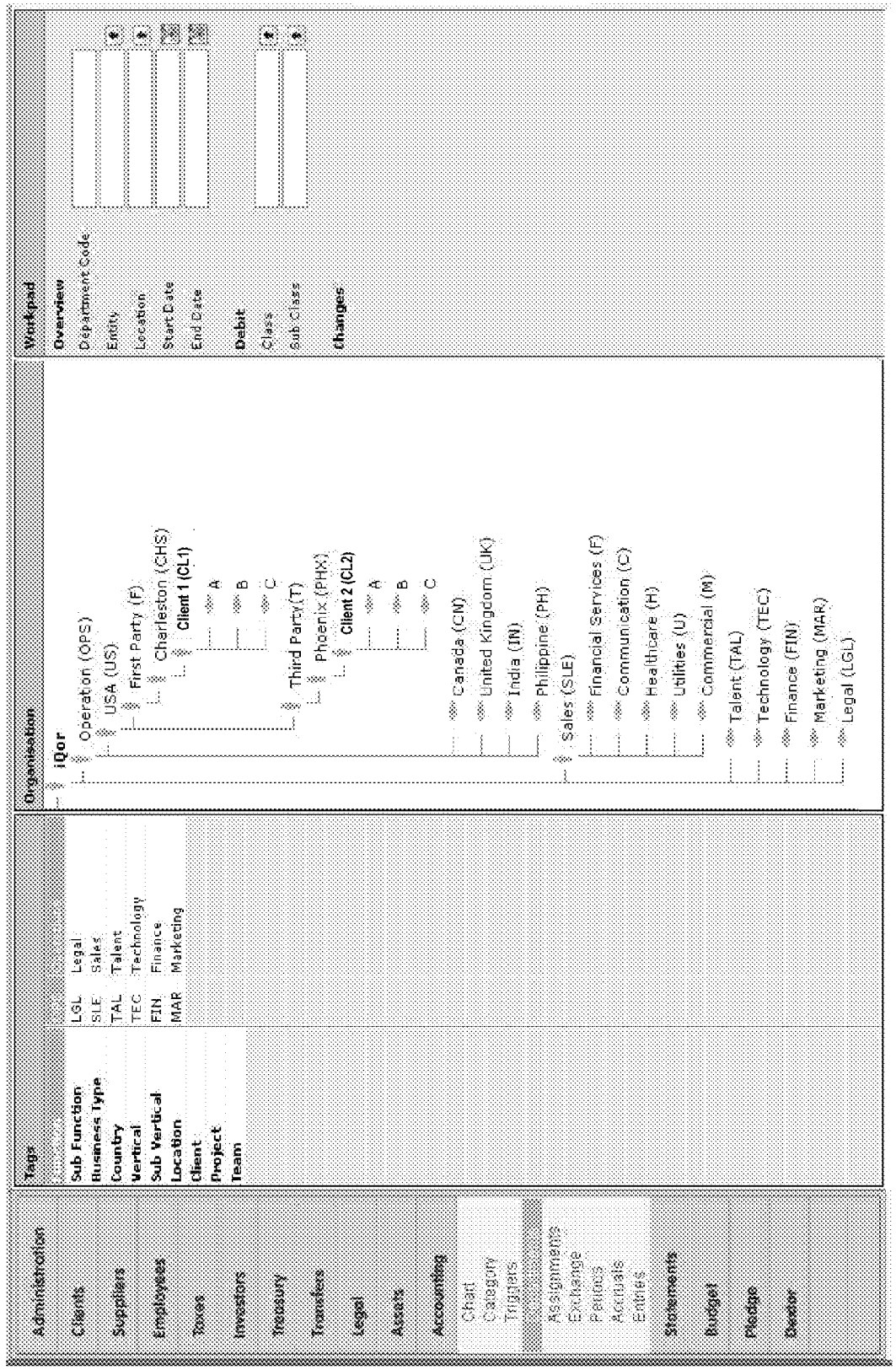

In one embodiment, the ADE-WAM may include a user interface facility similar in appearance to the schematic illustration shown in FIG. 7A permitting a graphical generation of a hierarchical organizational chart and corresponding dynamic, hierarchical table-tracking syntax configured strings, such as the department codes shown at 705 (see FIG. 7B illustrating an example UI screenshot). For example, such a user interface may include a plurality of organizational descriptors, such as function, sub-function, country, location, vertical, business type, client, team, and/or the like, that are configured as selectable interface elements. The organizational chart may then be generated by selecting the descriptors for association with different positions in the chart, causing new nodes to be created from those positions. In one implementation, each descriptor may be dragged and dropped from a bank of descriptors to a position on or near the chart, causing that descriptor to become a new node extending by a branch from the nearest node above it in the hierarchy. The ADE-WAM may also automatically generate a new department code corresponding to the new node by appending a token corresponding to the new node to the string corresponding to the next highest node in the chart from the new node.

Figure 8:
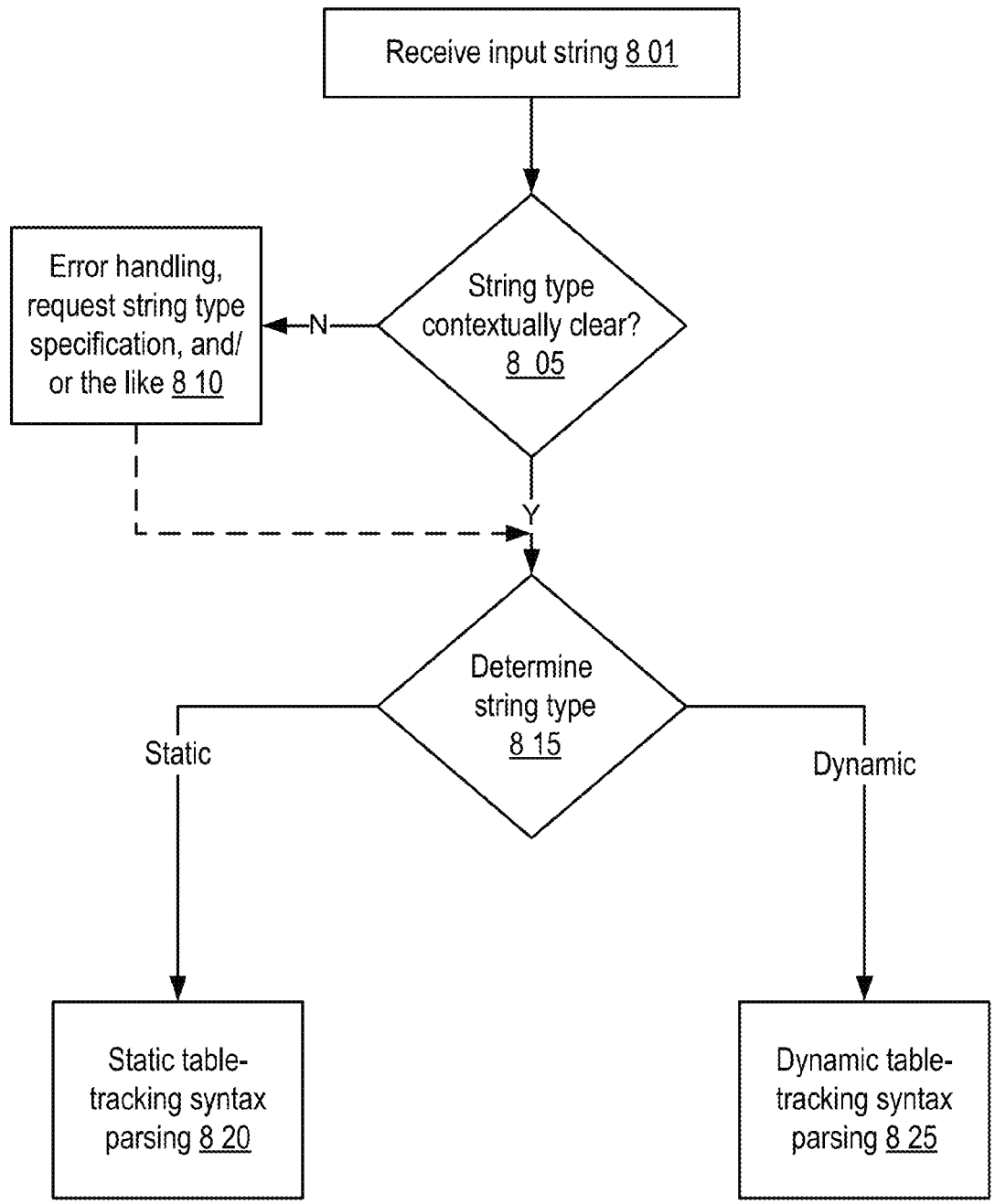
FIG. 8 shows an implementation of logic flow for string type discerning and parsing in one implementation of ADE-WAM operation.

FIG. 8 shows an implementation of logic flow for string type discerning and parsing in one implementation of ADE-WAM operation. The implementation illustrated in FIG. 8 may be employed, for example, in a circumstance wherein both static and dynamic table-tracking syntaxes are used and strings configured with either syntax may be received as inputs. The ADE-WAM may receive an input string 801, such as via a web interface, a text and/or command line input, data transfer from another ADE-WAM application and/or component, selection of input string tokens in a graphical user interface (e.g., from one or more pull-down menus), string tokens spoken into a microphone and analyzed with speech recognition software, a string scanned from a document and/or discerned from a photograph that is analyzed such as with optical character recognition (OCR), and/or the like. A determination may then be made as to whether the string type, associated table-tracking syntax and/or descriptive business grammar, and/or the like is clear from the context in which the string was input, and/or from the content of the string itself 805. For example, in one implementation, a string type may be identified from the application into which the string was input and/or the method of input and/or receipt of the input string. In another example, a string type may be identified from the length, composition, arrangement, content, and/or the like of the string itself. The input string may be compared to elements of a syntax database, which delineate the formal characteristics of a particular table-tracking syntax and allow for determination of whether a particular input string appears to be configured in accordance with the particular syntax. In one implementation, the ADE-WAM at 805 may determine whether sufficient indicia of string type exist to permit a determination of the string type. In one implementation, the ADE-WAM at 805 may only determine whether sufficient indicia exist to distinguish the string type and/or associated syntax between static table-tracking syntax and a dynamic table-tracking syntax.

If sufficient indicia do not exist to distinguish the type of string and/or syntax corresponding to an input string, the ADE-WAM may undertake an error handling process, request user specification of the string type, perform additional analysis on the input string to discern the type, and/or the like 810. If sufficient indicia are present at 805, the ADE-WAM may determine which string type and/or string syntax is associated with the input string, such as based on that indicia 815. In one implementation, the ADE-WAM may distinguish between a string configured in accordance with a static table-tracking index and with a dynamic table-tracking index. In the illustrated implementation, a static table-tracking syntax configured input string may then be subjected to a static table-tracking syntax parsing 820, and a dynamic table-tracking syntax configured input string may be subjected to a dynamic table-tracking syntax parsing 825.

Figure 9:
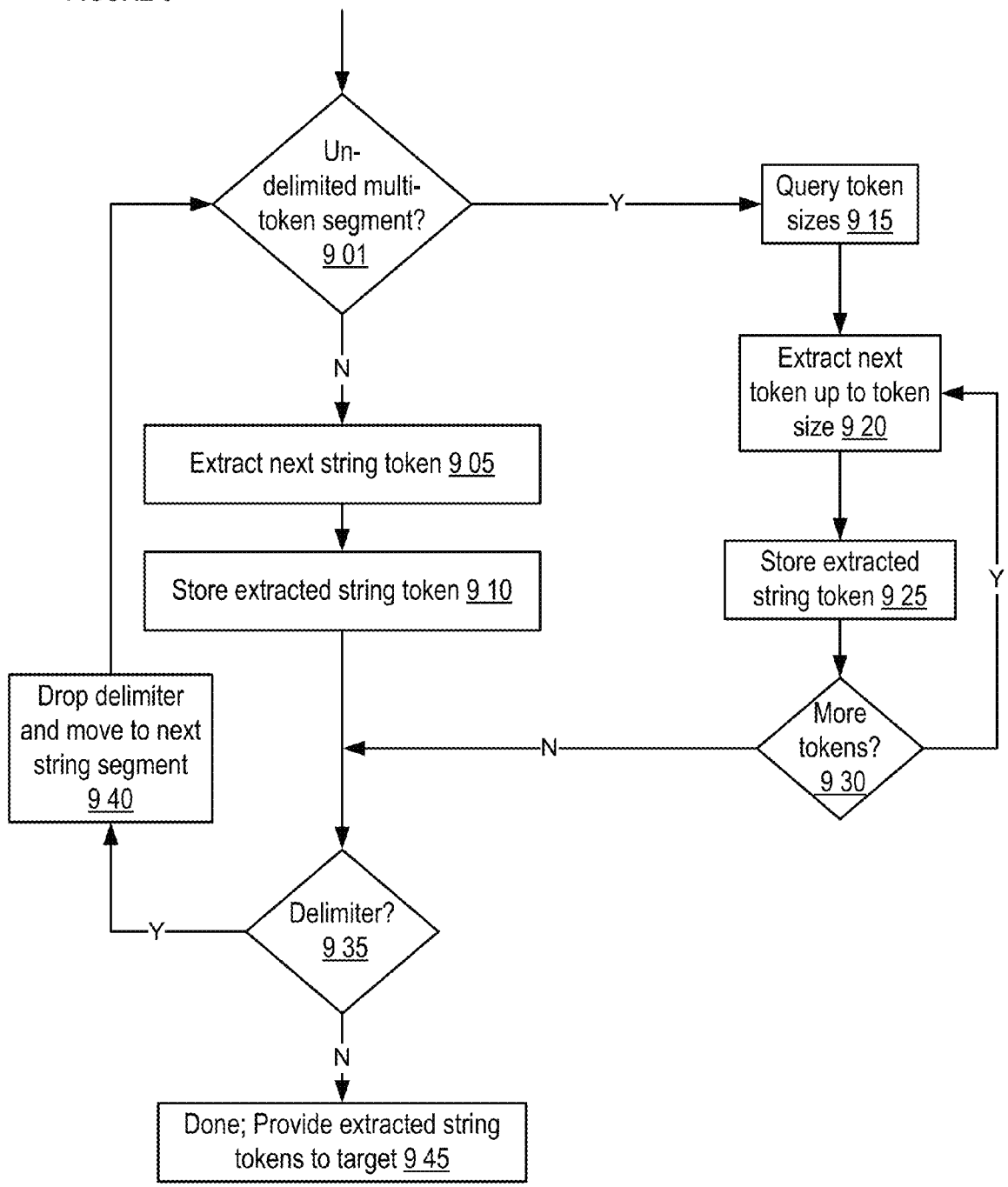
FIG. 9 shows an implementation of logic flow for static table-tracking syntax parsing in one embodiment of ADE-WAM operation.

FIG. 9 shows an implementation of logic flow for static table-tracking syntax parsing in one embodiment of ADE-WAM operation. A determination may be made as to whether a first segment of the received string and/or corresponding string syntax comprises a single token or an undelimited multi-token segment 901. In the latter case, the ADE-WAM may query a token size 915, such as from a syntax database that holds a list of table names, token sizes, and/or the like, and extract a next token from the undelimited multi-token segment based on the token size 920. In one implementation, a token size may be specified as part of the table-tracking syntax and/or descriptive business grammar. In another implementation, such as for a dynamic table-tracking syntax, a token size may be specified as a maximum number of characters for a table name corresponding to that token type. Extracted string tokens may be stored 925, and a determination made as to whether there are additional tokens in the undelimited multi-token segment 930, such as may be indicated by a syntax record in the syntax database. If so, the ADE-WAM may return to 920 to extract the next token in the segment.

If the ADE-WAM determines at 901 that the next segment in the string is not an undelimited multi-token segment, then the ADE-WAM may extract the whole segment as a string token 905 and store the extracted string token 910, such as in a database, in random access memory, and/or the like.

A determination may be made as to whether there exists a delimiter past the token or tokens previously extracted 935. If there is an additional delimiter, the ADE-WAM may drop the delimiter from the string and move to evaluate the next string segment 940. In an implementation where there is no trailing delimiter at the end of a string in a table-tracking syntax, determining that there are no delimiters at 935 may cause the ADE-WAM to conclude parsing the input string and/or to provide extracted string tokens to a target 945, such as an end user, target application, database table and/or record, display device, report, and/or the like.

Figure 10:
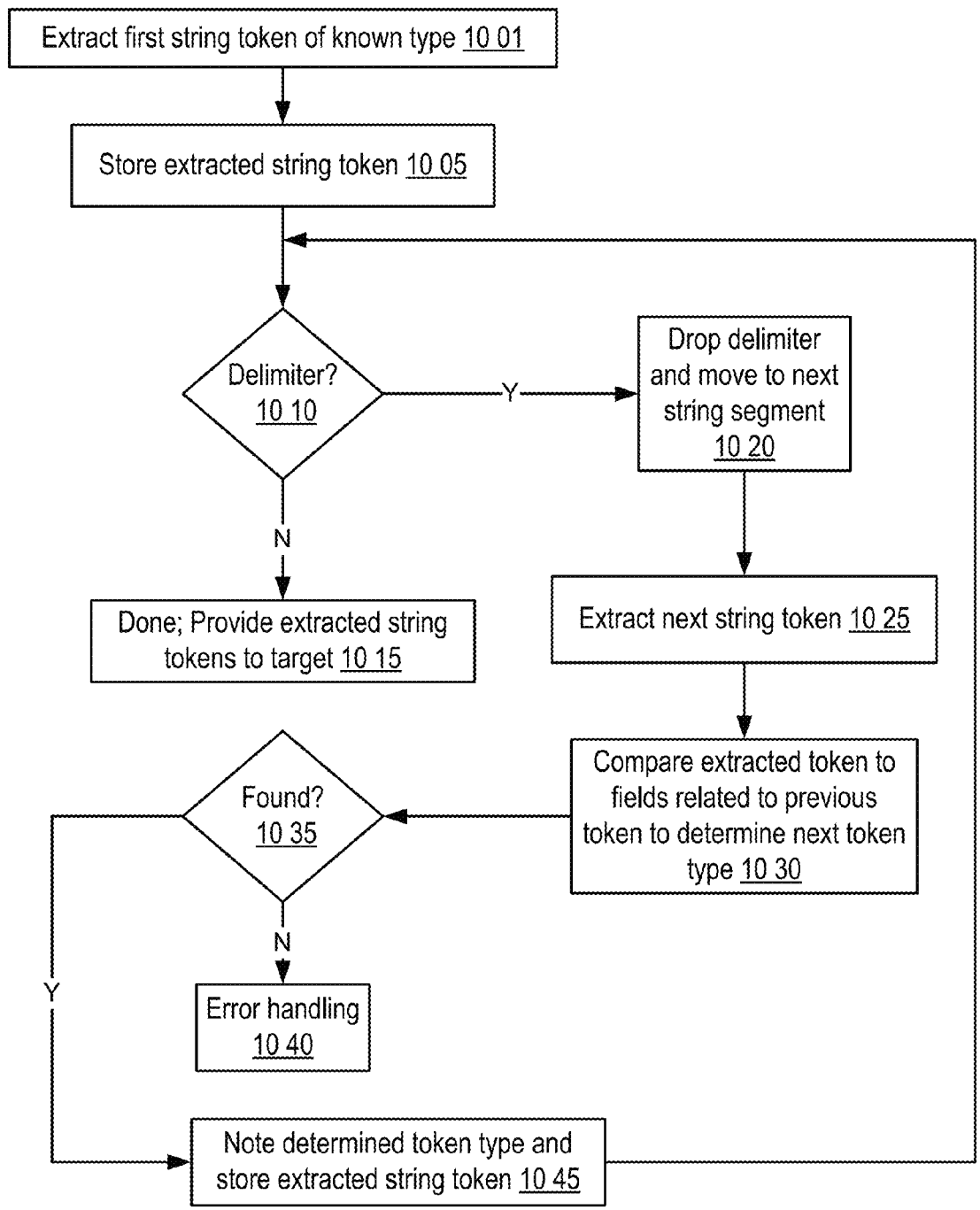
FIG. 10 shows an implementation of logic flow for parsing dynamic table-tracking syntax configured strings in one embodiment of ADE-WAM operation.

FIG. 10 shows an implementation of logic flow for parsing dynamic table-tracking syntax configured strings in one embodiment of ADE-WAM operation. A first string token of known type may be extracted 1001 and stored 1005. In one implementation, all dynamic table-tracking syntax configured strings may be configured with the same type of leading string token (e.g., an organization name). In another implementation, the token type of the leading string token may be discerned prior to parsing, such as via contextual indicia, such as how the string was submitted to the ADE-WAM, simultaneously running applications, other user inputs and/or instructions from other software modules, and/or the like.

A determination may then be made as to whether there exists a delimiter after the first extracted token 1010. If not, such as in the case of a single-token string configuration, then the ADE-WAM's parsing of the dynamic table-tracking syntax string may be concluded and/or the extracted string token provided to a target 1015. If a delimiter is found at 1010, the ADE-WAM may drop the delimiter from the input string and move to the next segment of the string 1020. The next string token may be extracted 1025 and compared with data fields and/or records of a table associated with the previously extracted token to determine a next token type 1030. A determination may be made as to whether a match to the token has been found 1035 and, if not, then an error handling procedure may be undertaken 1040, such as providing an error message to the user, requesting reentry of the input string, checking common typographical or spelling errors, and/or the like. If, on the other hand, a match is found to the next token, the determined token type may be noted and stored in association with the extracted token 1045, before returning to 1010 to check for a next delimiter in the string sequence.

In one embodiment, department codes may be parsed based on token positions relative to delimiting characters, and as such, provide the parsed values for use in SQL commands. For example, a rule may specify that all department codes having a particular token after the nth delimiting character are authorized to access a particular set of application files. A parsing routine may then count n delimiters and compare the immediately following token to the rule token to determine if the rule is applicable (e.g., whether a user associated with the department code is authorized to access the set of application files).

Figure 11:
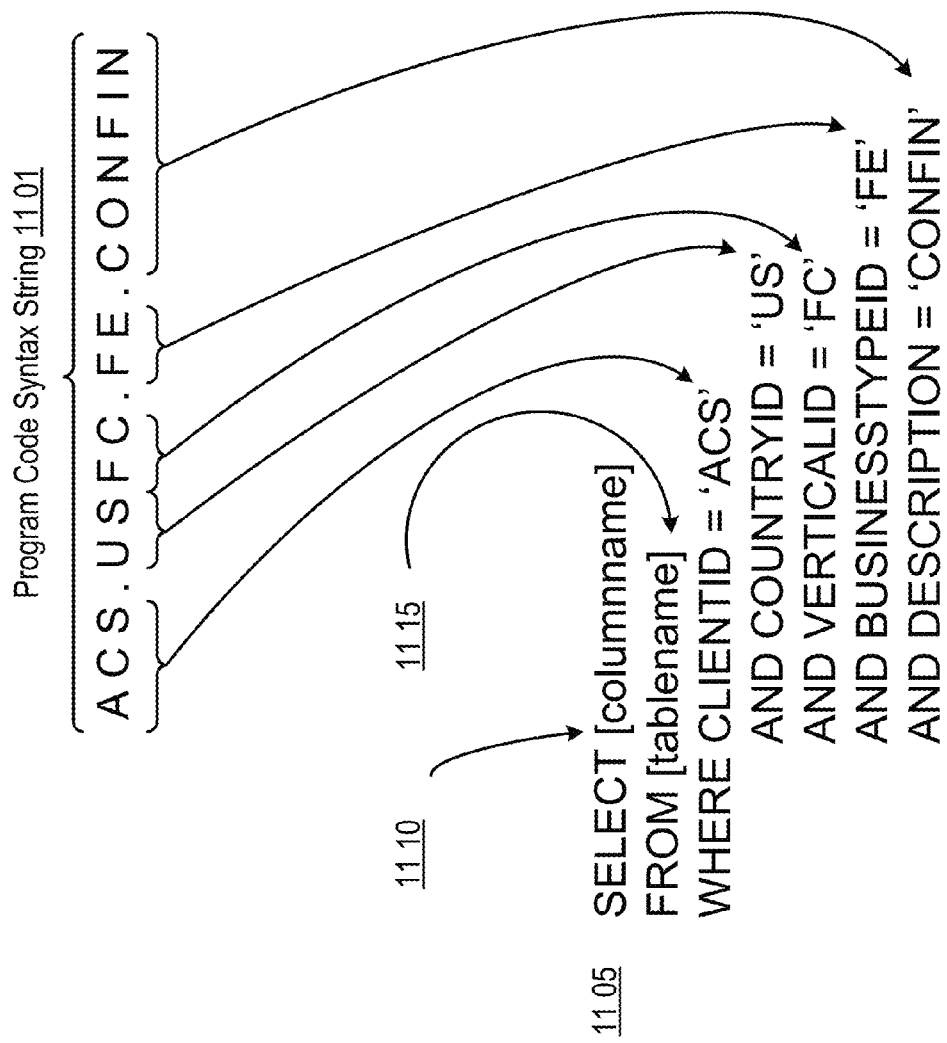
FIG. 11 provides a schematic illustration of an implementation of converting a table-tracking syntax configured string into a database query statement in one embodiment of ADE-WAM operation.

FIG. 11 provides a schematic illustration of an implementation of converting a table-tracking syntax configured string into a database query statement in one embodiment of ADE-WAM operation. The input string in the illustrated implementation 1101 is configured as a program code, having a first segment reflecting a client token, a second segment comprising an undelimited multi-token segment having a country token and a vertical token, a third segment reflecting a business type token, and a fourth segment reflecting a description token. The content of each token in a particular instance of a program code may be extracted and rearranged to form a SQL Select statement, such as that shown at 1105. In the illustrated implementation, the parsed string tokens are used to specify SQL Where search conditions, limiting the query to records having fields with matching values as those specified in the Where clauses. The Select statement 1105 also admits specification of a column name 1110 and table name 1115 from which the requested data should be selected. Thus, the Select statement at 1105 will select data from a column corresponding to "columnname" 1110 in a table corresponding to "tablename" 1115 for records in that table having a clientID="ACS", countryID="US", verticalID="FC", businesstypeID="FE", and description="CONFIN".

Figure 12:
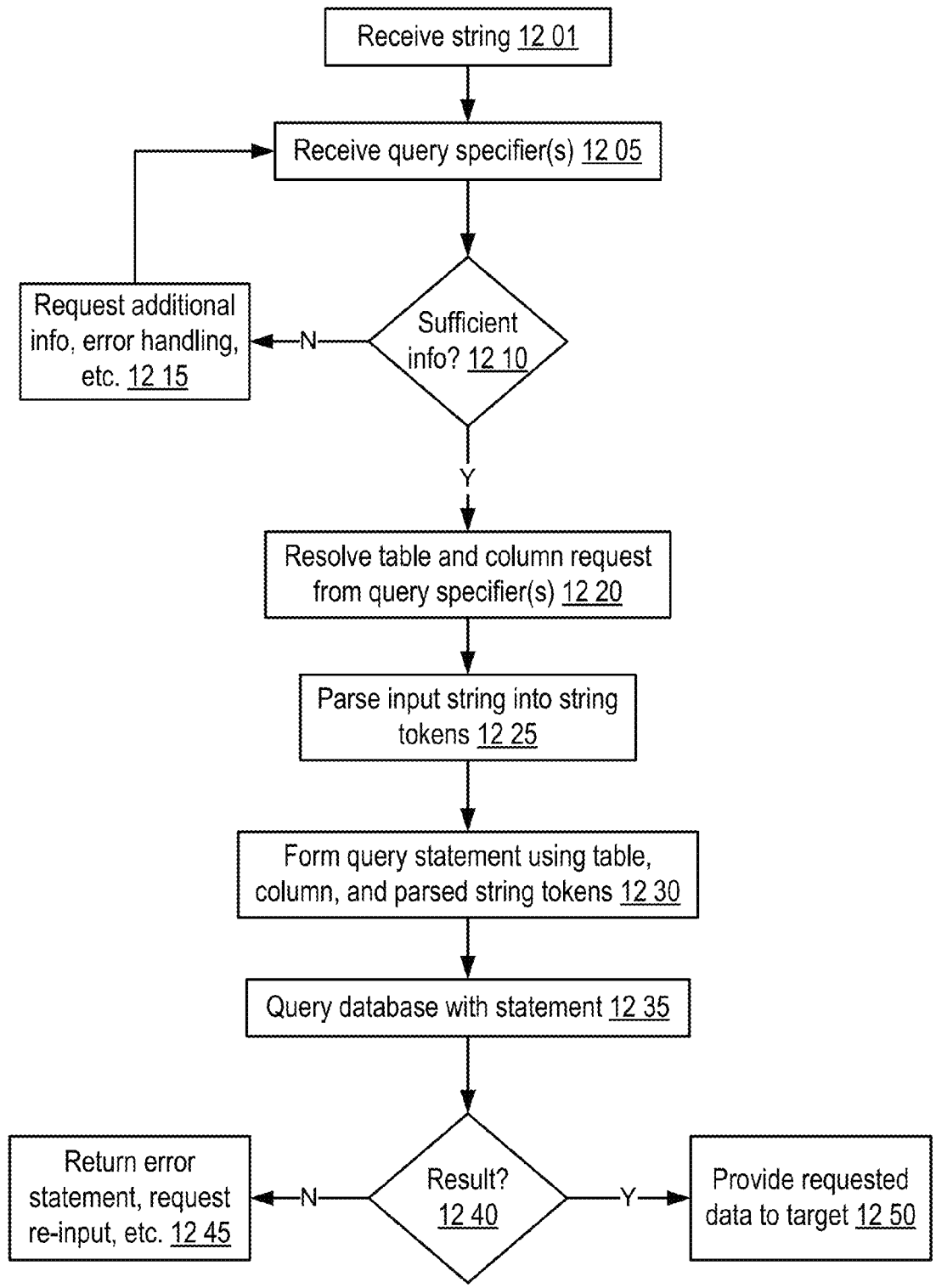
FIG. 12 shows an implementation of logic flow for forming a query statement based on an input string in one embodiment of ADE-WAM operation.

FIG. 12 shows an implementation of logic flow for forming a query statement based on an input string in one embodiment of ADE-WAM operation. A string is received at 1201, as well as any query specifiers 1205 which may comprise additional inputs that serve to provide further resolution and/or specificity related to a data request. For example, in one implementation, query specifiers 1205 may comprise information sufficient to identify at least one column name and/or table name in which requested data may be found. An example of a query specifier is a PLACEMENTMONTH of August 2008 submitted with a PROGRAMCODE of CL1.USMI.FP.HR to retrieve associated matching data.

A determination may be made as to whether sufficient query specifiers have been supplied to conduct a database query 1210. If not, then an error handling procedure may be undertaken, an error message returned, additional information may be requested from a user, and/or the like 1215. If sufficient query specifiers have been supplied, the ADE-WAM may resolve a table name and/or a column name based on the query specifiers 1220. For example, in one implementation, the query specifiers themselves may comprise a table name and/or a column name. The ADE-WAM may also parse the input string into one or more string tokens 1225. The query statement may then be formed as a combination of parsed string tokens and resolved table name and/or column name 1230, and said statement used to query the database 1235. A determination may be made as to whether one or more results are returned in response to the query 1240. If not, then an error handling procedure may be undertaken, an error message returned, reentry of query parameters requested, and/or the like 1245. Otherwise, if a result is obtained by the query, the result may be provided to a target 1250, such as to the requesting system, to a third party user, application, system, and/or the like 1250.

Figure 13:
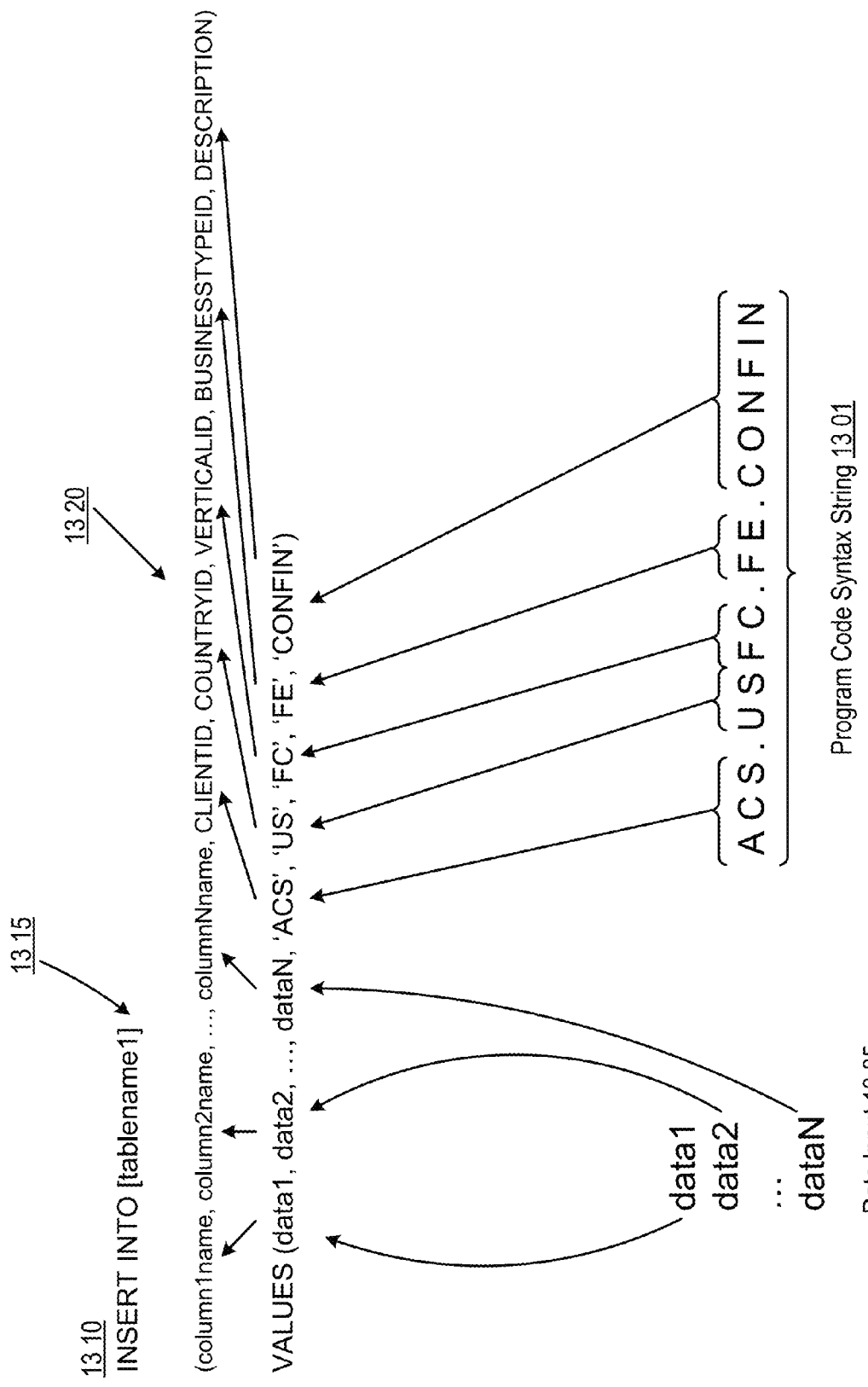
FIG. 13 provides a schematic illustration of an implementation of converting a table-tracking syntax configured string into a database input statement in one embodiment of ADE-WAM operation.

FIG. 13 provides a schematic illustration of an implementation of converting a table-tracking syntax configured string into a database input statement in one embodiment of ADE-WAM operation. In the illustrated implementation, a program code syntax configured string 1301 is provided to the ADE-WAM, along with a series of data inputs 1305. Tokens parsed from the input string, along with the data inputs, may be used to form a SQL Input statement such as that shown at 1310, where the data inputs and string tokens comprise values to populate fields in a database record. The illustrated Input statement may also include specification of one or more table names 1315, one or more column 1320, and/or the like, such as to identify a location in the database where the received data inputs should be entered. Therefore, in the illustrated implementation, data1 is slotted for input to column1name, data2 to column2name, and so forth, and "ACS" is slotted for input to the CLIENTID column, "US" to the COUNTRYID column, and so forth. The illustrated implementation is directed to circumstances where all of the input data is to be entered into a single table having accommodating fields. In some other implementations, the ADE-WAM may accommodate data inputs destined for different database tables, such as by discerning linking relationships between tables and generating appropriate JOIN statements for inclusion in a database transaction command statement such as that shown at 1301. In one implementation, a table name, column name, and/or the like to be included in the Input statement may be discernable based on a variety of different information sources, such as but not limited to a received string and/or parsed string tokens, a type and/or content of data inputs, a source of data inputs and/or input string (e.g., based on the identity of a submitting application), a user's data input permissions, and/or the like.

Figure 14:
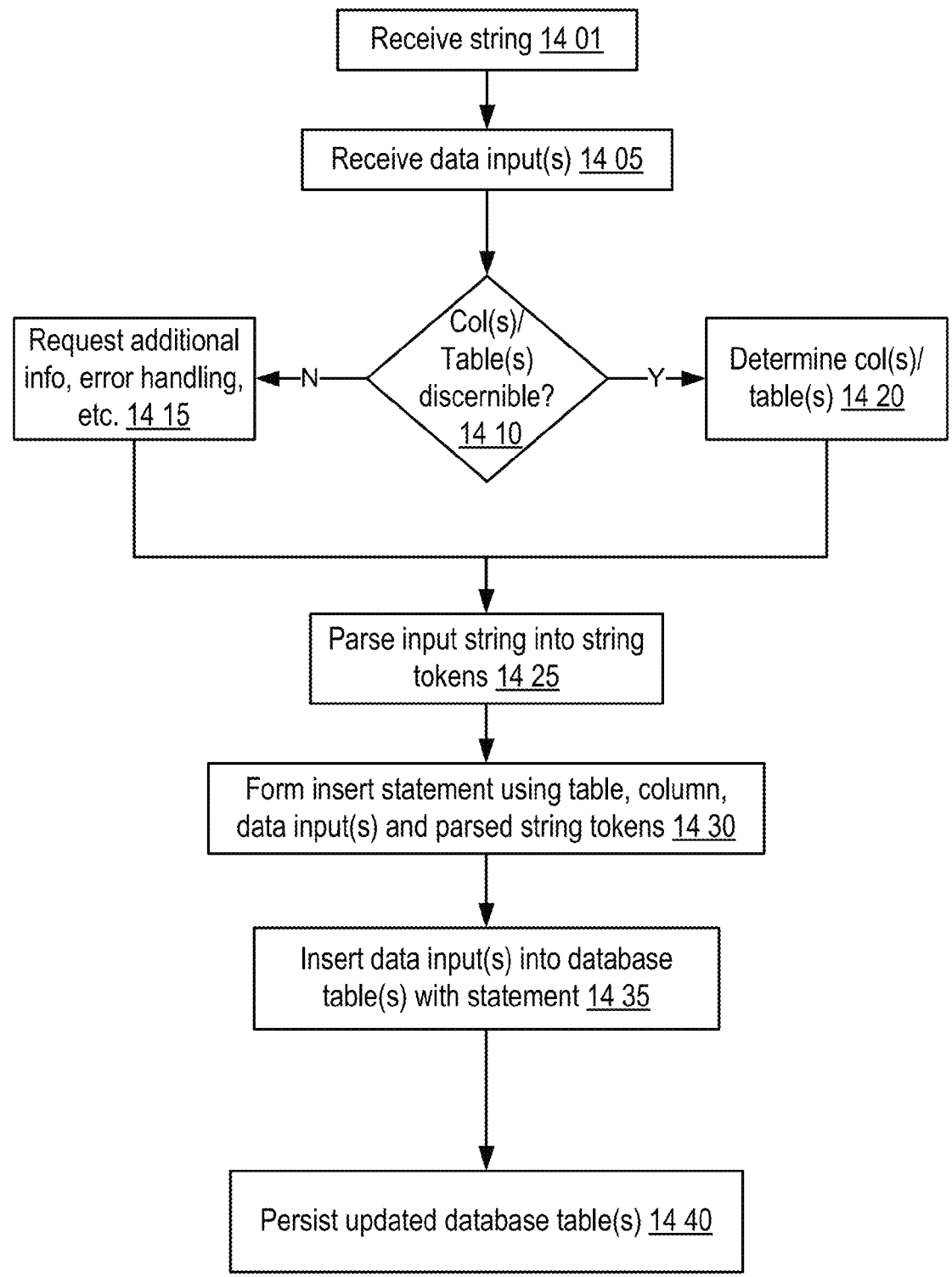
FIG. 14 shows an implementation of logic flow for forming a database input statement based on an input string in one embodiment of ADE-WAM operation.

FIG. 14 shows an implementation of logic flow for forming a database input statement based on an input string in one embodiment of ADE-WAM operation. An input string is received 1401, along with attendant data inputs 1405, which may represent data sought to be input to the database by a user, and may comprise data values, rules, reports, data collections, and/or the like inputs. A determination may be made as to whether a table name and/or column name are discernible 1410, such as based on the received string and/or data, a source of the received string and/or data (e.g., an application from which the string and data were received), a user profile and/or user permissions, and/or the like and/or any combination thereof. If a table name and/or column name are not discernible, the ADE-WAM may undertake an error handling procedure, request additional information from a user or requesting application, and/or the like 1415. Otherwise, the table name and/or column name may be determined from the provided information 1420. The ADE-WAM may then parse the input string into one or more string tokens 1425, and form an insert statement based on the parsed string tokens, the data inputs, and the table name and/or column name 1430. The data inputs may then be inserted into the database using the formed insert statement 1435, and the updated database tables may then be persisted 1440 for future use and/or reference.

Data Integration

Figure 15A:
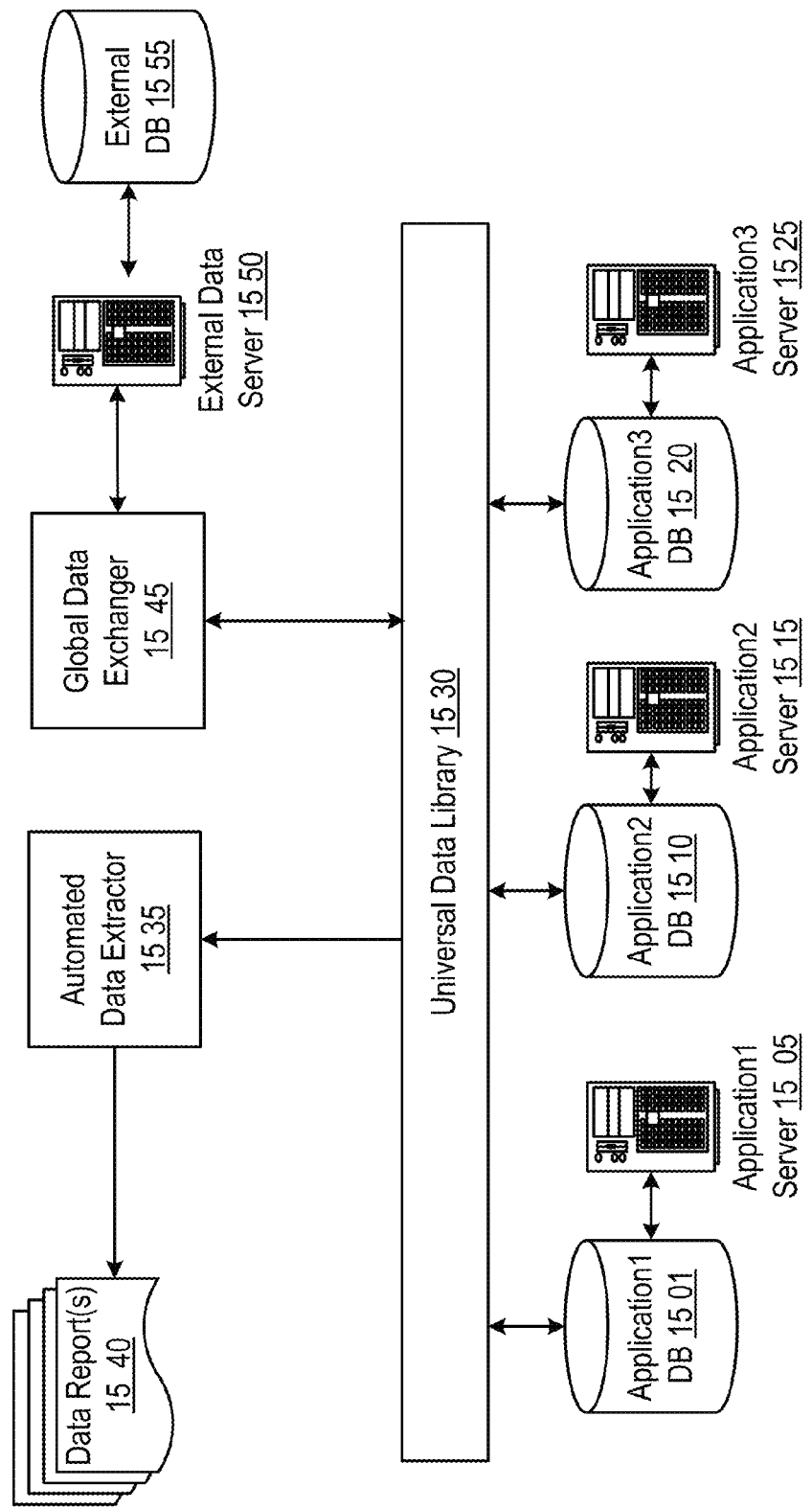
FIGS. 15A-B show an implementation of data flow between and among ADE-WAM system components in one embodiment of ADE-WAM operation.
Figure 15B:
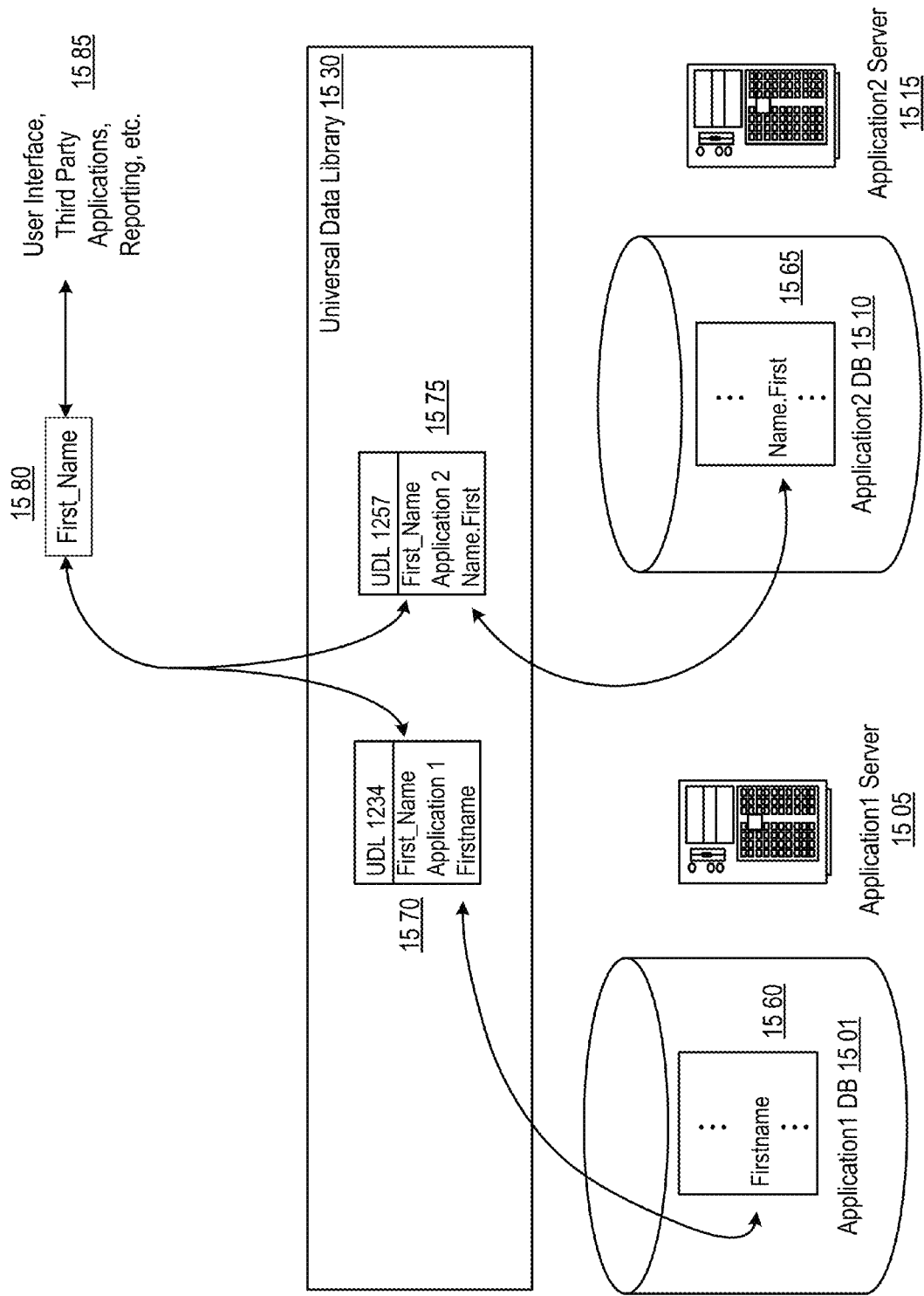

FIGS. 15A-B show an implementation of data flow between and among ADE-WAM system components in one embodiment of ADE-WAM operation. In FIG. 15A, plurality of application systems may exist, each having a respective application database (1501, 1510, 1520) and application server (1505, 1515, 1525). For example, an enterprise or organization may employ different applications for different enterprise goals or functions, such as a human resources application, a facilities application, a finance application, and/or the like. In some implementations, an enterprise may employ further databases that are independent of a specific application or specialized server system, such as for data storage or warehousing. A universal data library 1530 may be communicatively coupled to databases and/or application servers to provide and/or mediate access to data contained in the databases through the use of intermediate objects acting as universal variables. As described in further detail below, the universal variables contained in and managed by a universal data librarian system may provide object-oriented database access to users while masking the intricacies of database relational structure and the details of database query languages. Furthermore, judicious selection of universal variables allows common data types across otherwise disparate databases, including external data sources in some implementations, to be encapsulated within a relatively small set of universal variables and allows for effective integration of databases without the need for data warehousing practices. In some implementations, universal variables managed by the universal data librarian may be organized in accordance with a hierarchical schema, as described in further detail below.

In some implementations, the universal data library may be communicatively coupled with an automated data extractor 1535 configured to receive specification of report templates and/or to generate reports 1540 of values associated with universal variables. Report generation schedules, triggering conditions, and/or the like may likewise be specified as part of report template definition, and values included in the report may be draw in real-time and/or on a scheduled, periodic, or triggered basis, via the universal data librarian, from multiple otherwise disparate databases and/or data sources.

In some implementations, the universal data library may further be communicatively coupled with a global data exchanger 1545 configured to communicate with one or more internal or external databases and/or data sources to exchange data therewith. For example, the ADE-WAM may be coupled to one or more external data servers 1550 and/or external databases 1555 to receive data files therefrom and/or provide data files thereto. In one implementation, the ADE-WAM may be configured to retrieve one or more data files from an external data source (1550, 1555), such as on a scheduled, periodic, triggered, and/or the like basis; parse discrete data units from the file contents, wherein the parsing may depend on whether the file is fixed length, delimited, XML format, and/or the like; and associate the parsed data units with universal variables in accordance with a pre-defined specification. In some implementations, the ADE-WAM may further be configured to mediate exchanges of data between internal databases. For example, the ADE-WAM may be configured to draw data from a source database, such as on a scheduled, periodic, triggered, and/or the like basis, and to associate the drawn data with universal variables in accordance with a pre-defined specification. In both cases, association of sourced data with universal variables may cause the sourced data to be input in one or more internal databases based on associations between database tables and/or fields and universal variables, as defined within the universal data librarian.

In one implementation, the universal data librarian, global data exchanger, and/or ADE-WAM may be configured to reformat data, such as to place it in a condition of conformity with like data in a target database. For example, sourced date data may be in a MM/DD/YY format while target date data is stored in a DD/MM/YYYY format. One or more of the described systems may be configured to reformat data as needed or desired, in accordance with a pre-defined specification. In one implementation, the universal data librarian, automated data extractor, and/or ADE-WAM may be configured to combine data from one or more sources, such as by appending, arithmetic operation, and/or the like, into a single data value provided to a data target.

A schematic illustration of ADE-WAM operation in one example is provided in FIG. 15B. Here, two application databases 1501 and 1510, each attended by a respective application server (1505 and 1515), each have tables (1560 and 1565) containing fields related to a first name (labeled Firstname in table 1560 and Name.First in 1565). Each database is communicatively coupled to a universal data library 1530, which includes records specifying relationships between the fields in application databases and universal variables. In the illustrated example, a record 1570 specifies a relationship between the Firstname field in the application 1 database and the universal variable First_Name. Similarly, a record 1575 specifies a relationship between the Name.First field in the application 2 database and the universal variable First_Name. The universal variable First_Name 1580 and/or values thereof may then be provided to a user interface, third party application, external data target, report generator, and/or the like 1585. Though omitted for clarity, details pertaining to the location of fields in an application database, such as table names, foreign keys, and/or the like may also be included in universal data library records to facilitate location of desired data.

Figure 16:
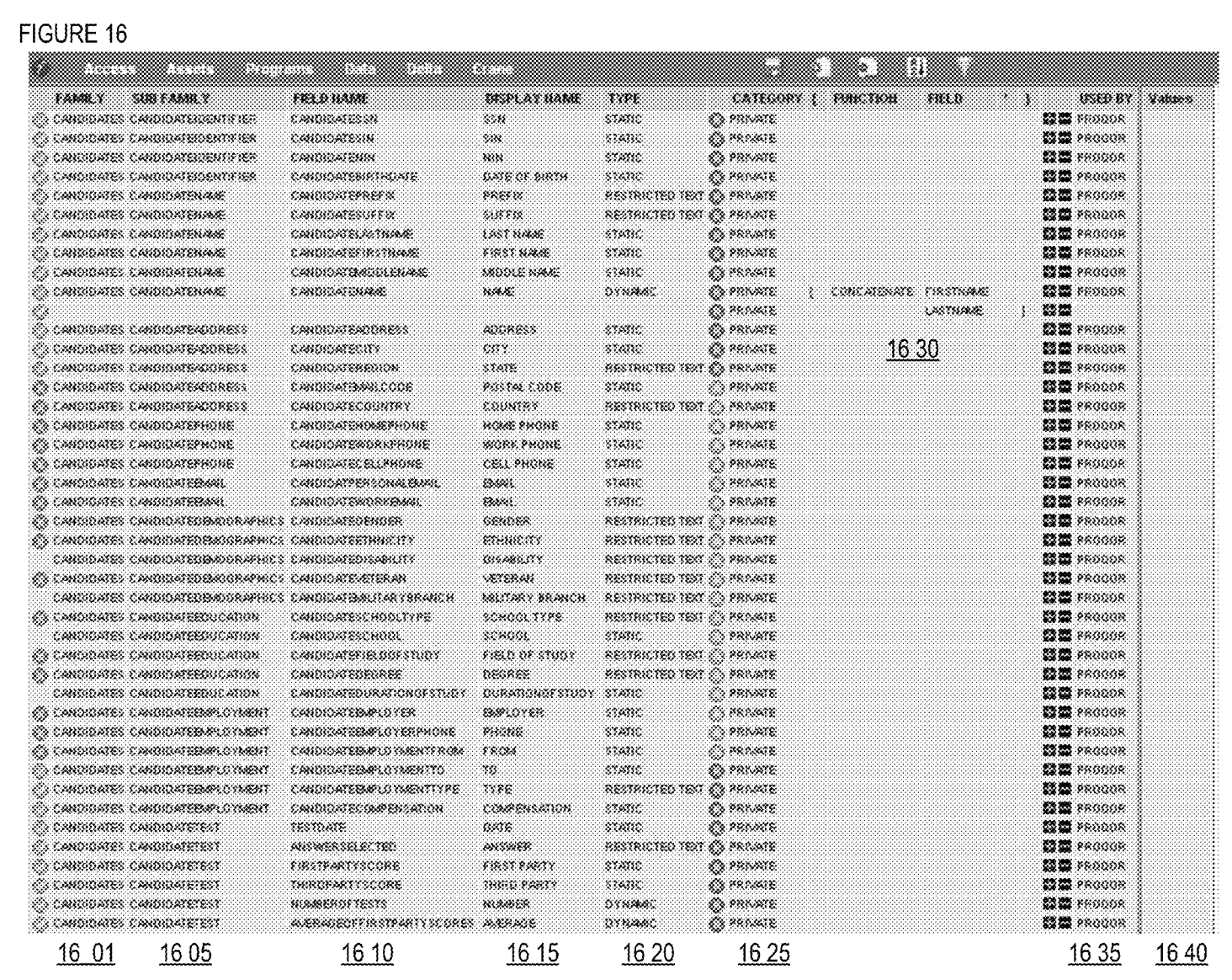

FIG. 16 shows an implementation of a user interface for universal variable allocation in one embodiment of ADE-WAM operation. The user interface shown in FIG. 16 allows a user to specify associations between universal variables and applications having database fields to which the variables are connected. In the illustrated implementation, universal variables are organized in accordance with a hierarchical structure comprising a family 1601, a subfamily 1605, and a field name 1610. Here, the family shown pertains to a "candidate", such as a candidate for a job opening. Subfamily designations provide further specificity as to the type of data that is being embodied in the universal variable, such as candidateidentifier, candidatename, candidateaddress, and/or the like. The field name then specifies the precise data embodied in the universal variable, such as candidatessn for a social security number, candidatebirthdate, candidatecity, and/or the like. The interface further allows for specification of a display name 1615 associated with the universal variable, such as may be used in display interfaces, used in reports, provided in integrated data manipulation and/or third party applications, and/or the like. The interface further allows for specification of any of a variety of universal variable types 1620. For example, types may include, but are not limited to: static (e.g., data that is likely to not change often or at all, such as a user social security number), dynamic (e.g., data that is expected to change at some time in the future or that is frequently updated, such as a number of tests taken by a user, a user password, and/or the like), restricted text (e.g., data that must conform to a particular format or limited number of input options, such as a state abbreviation, a gender, and/or the like), and/or the like. The interface may further allow for specification of a data category 1625, such as whether the data is private or publicly available.

The interface may further allow for specification of a function, reformatting, and/or the like to be applied to data associated with one or more universal variables 1630. For example, in the illustrated implementation, the CandidateName universal variable field is set as a concatenation of a firstname variable and a lastname variable. The interface may further allow for specification of one or more databases, applications, and/or the like with which a universal variable is to be associated 1635. In one implementation, by specifying an application in connection with a particular universal variable, a facility may be made available for a user to further specify a particular table and/or field within a database associated with that application to which the universal variable should be connected and/or mapped. Such further specification is described in further detail below. The interface may further admit specification of particular values for universal variables, such as a fixed value for particular variables and/or sets of restricted values to which future inputs and/or associations must be matched (e.g., a list of 50 state abbreviations to which any state input to a corresponding universal variable must conform).

Figure 17:
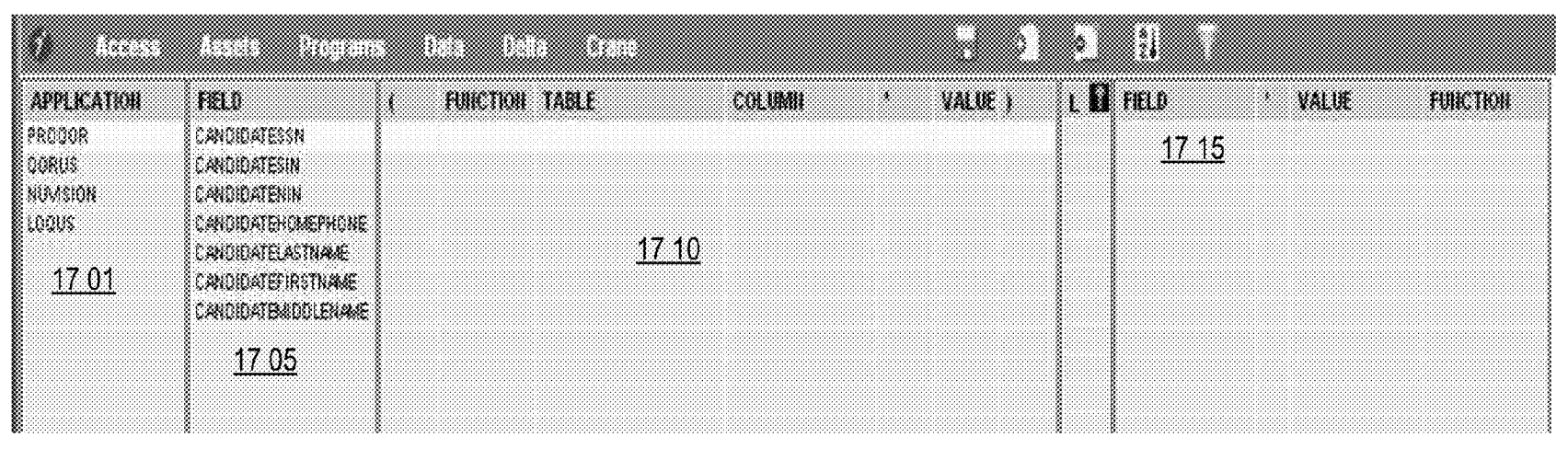

FIG. 17 shows another implementation of a user interface for universal variable allocation in one embodiment of ADE-WAM operation. The interface shown in FIG. 17 may, in one implementation, allow for specification of specific tables and/or fields in databases, such as may be associated with particular software applications, to which specified universal variables are to be connected and/or mapped. A list of available, selectable applications and/or databases is provided at 1701. Selection of a particular application and/or database may cause a list of connected universal variables to be provided 1705. In one implementation, the list of universal variables shown 1705 in connection with a selected application or database 1701 is based on specifications made via the interface of FIG. 16. Each listed universal variable name at 1705 may then have one or more fields from tables in a database connected with the application and/or database specified at 1701, such as in the interface area shown at 1715. In one implementation, the interface may further allow for specification of one or more functions, reformatting, and/or the like to be applied to field values as they are associated with universal variables 1710. For example, a particular database may store an account value in US cents instead of US dollars, which may be the typical unit for the corresponding account value universal variable. The interface at 1715 would allow the database account value to be divided by 100 before association with the universal variable for the account.

An example implementation of hierarchically arranged universal variables is provided in Appendix A for one embodiment of ADE-WAM operation. Each universal variable includes family and subfamily designation, and is further characterized by a field name. Variable families may specify high-level categories to which particular universal variables belong and/or are associated. In the implementation illustrated in Appendix A, the families include Consumer, Account, Payment, Letter, Call, Product, Consumer Credit, Candidate, Employee, Plans, Forms, Supplier, Program, Employee, Government, Investor, Entity, and/or the like. Subfamilies may provide further detail as to the nature of the particular universal variable, and the field name provides yet further detail to unambiguously designate the type of data to be associated with that universal variables. Universal variables, such as may be organized hierarchically, with families, subfamilies, field names, and/or the like, may be selected, in some implementations, to maximize the extent to which the variables can be mapped to and/or otherwise associated with enterprise and/or third party data and/or database tables and/or table fields. For example, in one implementation, universal variables may comprise business objects, wherein the selection, naming, and organization of the universal variables is designed to facilitate understanding of the variables in a business context and/or by those skilled in business who may otherwise have little or no knowledge of database design or management. By mapping table fields from the underlying databases to such business object universal variables, the ADE-WAM may facilitate manipulation of the data relevant to business managers without the need for assistance from database administrators and/or any other database manipulation experts. The selection of universal variables illustrated in Appendix A will hereinafter be referred to as a business descriptive set of universal variables.

In an alternative implementation, a universal variable hierarchy may follow a business grammar construct, where each segment of the hierarchy follows a business grammar segment or token type (e.g., client name, followed by country, followed by vertical, followed by business type, followed by client program, in an implementation wherein the hierarchy follows a program code grammar).

In another embodiment, the hierarchy may itself be stored in the ADE-WAM database; e.g., where an object oriented database may be used to establish entity-relationships between a superclass entity and its constituent subclasses, and its eventual field entries. In one embodiment, each of the XML and/or data entries may be read into the user interface table column headings. Thus, when a user creates and/or edits values in the user interface, appropriate records and/or XML entries are pushed into the hierarchy data structure.

Figure 18:
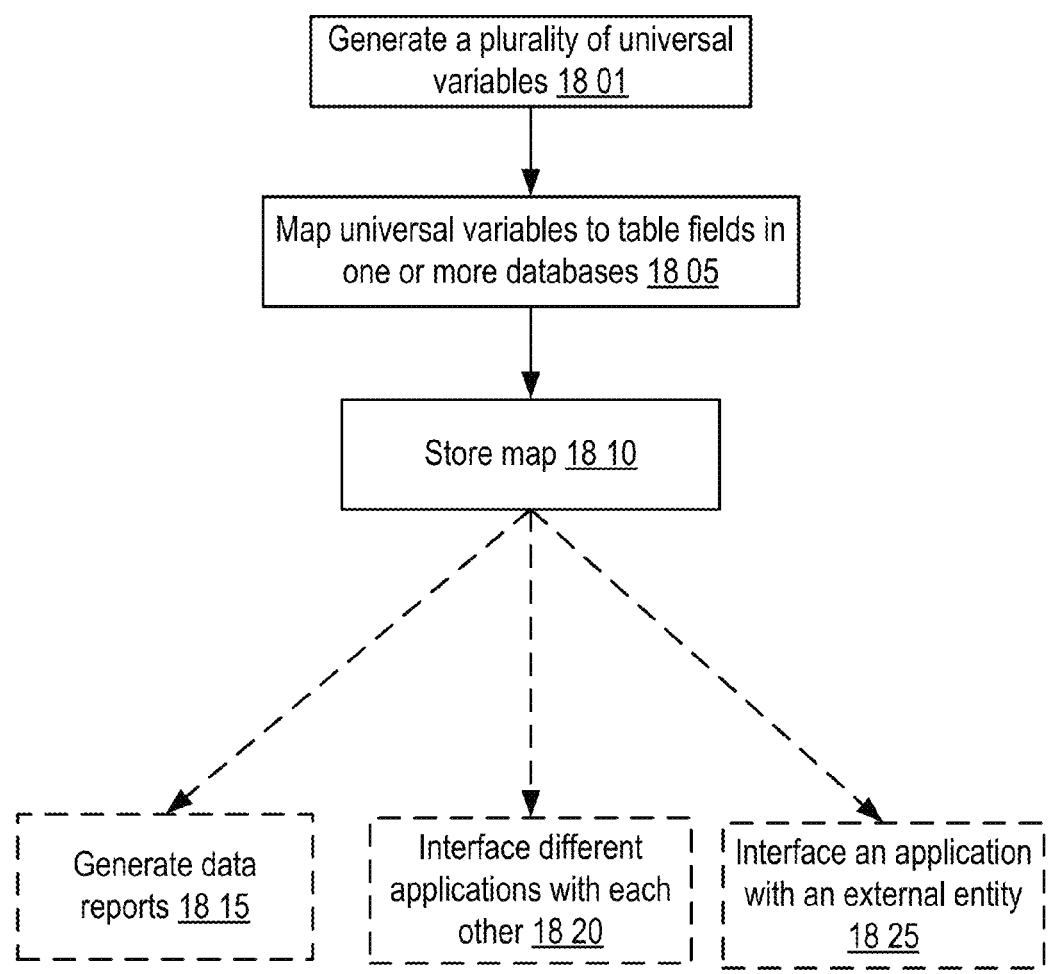
FIG. 18 shows an implementation of overall logic flow for a universal data library in one embodiment of ADE-WAM operation.

FIG. 18 shows an implementation of overall logic flow for a universal data library in one embodiment of ADE-WAM operation. A plurality of universal variables may be generated at 1801. In one implementation, universal variables may be organized in accordance with a hierarchical schema, such as may include a variable families, subfamilies, and fields. In one implementation, the universal variables may be selected and/or specified to represent business objects and/or with an eye to maximizing applicability of the variables across multiple entities, databases, clients, companies, and/or the like. The generated universal variables may then be mapped and/or otherwise connected to table fields in one or more databases 1805, and the mapping stored 1810, such as in a universal data library database. The universal variables, stored in the universal data library and managed by a universal data librarian, may then be used for a wide variety of different activities. For example, data reports may be generated 1815, whereby a user specifies data to be included in the report using universal variables, as well as a data layout in some implementations, and the data to be included in the reports is automatically extracted from the appropriate sources based on the mapping of universal variables to database tables and fields. In another example, different applications and/or databases having different data, table, and field labeling, database structure, data formatting, and/or the like, may be interfaced and/or integrated with each other 1820, whereby data updates in one database are automatically ported to corresponding fields in the interfaced database. This would allow, for example, data input from one application to update a database associated with a different application. In another example, an application and/or local database may be interfaced with an external entity and/or database 1825, whereby data updates by the local application and/or in the local database may be automatically provided to the external entity and/or database, and/or updates at the external entity and/or database may be automatically provided to the local database. These and other aspects and applications of the universal variables will be described in further detail below.

In one embodiment, the universal data librarian and/or other components described herein may connect to internal and/or external databases by means of one or more database adapters, such as but not limited to ODBC, JDBC, ADO.NET, OLEDB, and/or the like.

Figure 19:
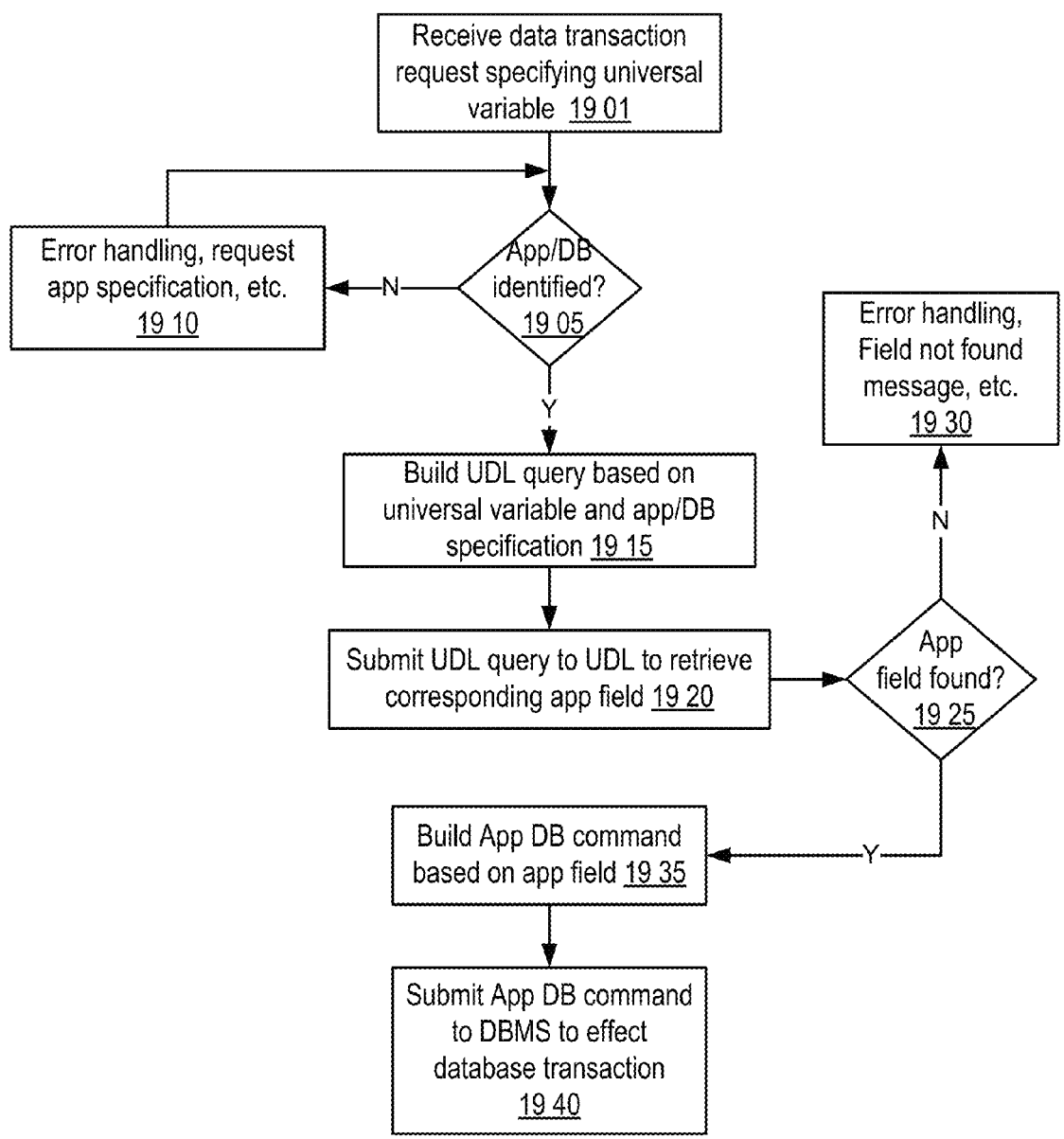
FIG. 19 shows an implementation of logic flow for connecting universal variable commands to application database commands in one embodiment of ADE-WAM operation.

FIG. 19 shows an implementation of logic flow for connecting universal variable commands to application database commands in one embodiment of ADE-WAM operation. A data transaction request, such as a request to input data, a data query, and/or the like, that specifies at least one universal variable is received 1901, and a determination is made as to whether a particular application, application database, other database, and/or the like has been identified or is identifiable in association with the request 1905. For example, in one implementation, a user may include an application and/or database specification in the request. In another example, an application and/or database may be contextually discerned based on the type of request, type of data queried, type of input, application used to generate the request, user identifier, and/or the like. For example, the ADE-WAM may compare a user identifier of a requesting user with a record of application and/or database identifiers associated with that user and/or for which the user is authorized to discern a database from which to query the requested data. In one implementation, a database registration table may be used as a repository for all database tables with which the ADE-WAM has come into contact, and the ADE-WAM may query such a table to (a) provide a user with a list of targets, (b) use a program specified parameter to match and/or specify a database, (c) use terms in the request to match best to a database entry, and/or the like.

If at least one database for the request cannot be identified, an error handling procedure may be undertaken 1910, such as providing an error message to the user, requesting specificity as to the application and/or database to which the request is directed, and/or the like. Otherwise, a universal data library query may be generated 1915 based on the specified one or more universal variables and the specified and/or discerned application and/or database.

In one implementation, business grammar tokens may be connected to and/or otherwise associated with particular universal variables which, in turn, may be linked to table fields in local and/or remote databases. A query or other database transaction leveraging a business grammar string may, then, be employed to access and/or transact data with table fields in either local or remote databases, using universal variables as intermediaries in construction of, for example, SQL commands. This query may be submitted to the universal data librarian 1920 to determine one or more table fields in the specified database, and/or a database associated with the specified application, to which the specified universal variable corresponds. A determination may be made as to whether the associated field exists in the target database, whether the field has some data values stored in association with it, and/or the like 1925 and, if not, another error handling procedure may be undertaken 1930, such as providing an error message to the user. In one implementation, determination of whether an associated field exists may be accomplished by evaluating a database management system response to a query submission (e.g., whether the desired data is retrieved, or whether an error message is returned from the database management system). Otherwise, a database command may be generated for the target database based on the identified one or more fields and the original user request 1935. The database command may, in various implementations and/or uses, comprise a query, an input, a data transfer, a data reformatting, an update, and/or the like. The generated command may then be submitted to the target database to effect the desired transaction 1940.

Figure 20:
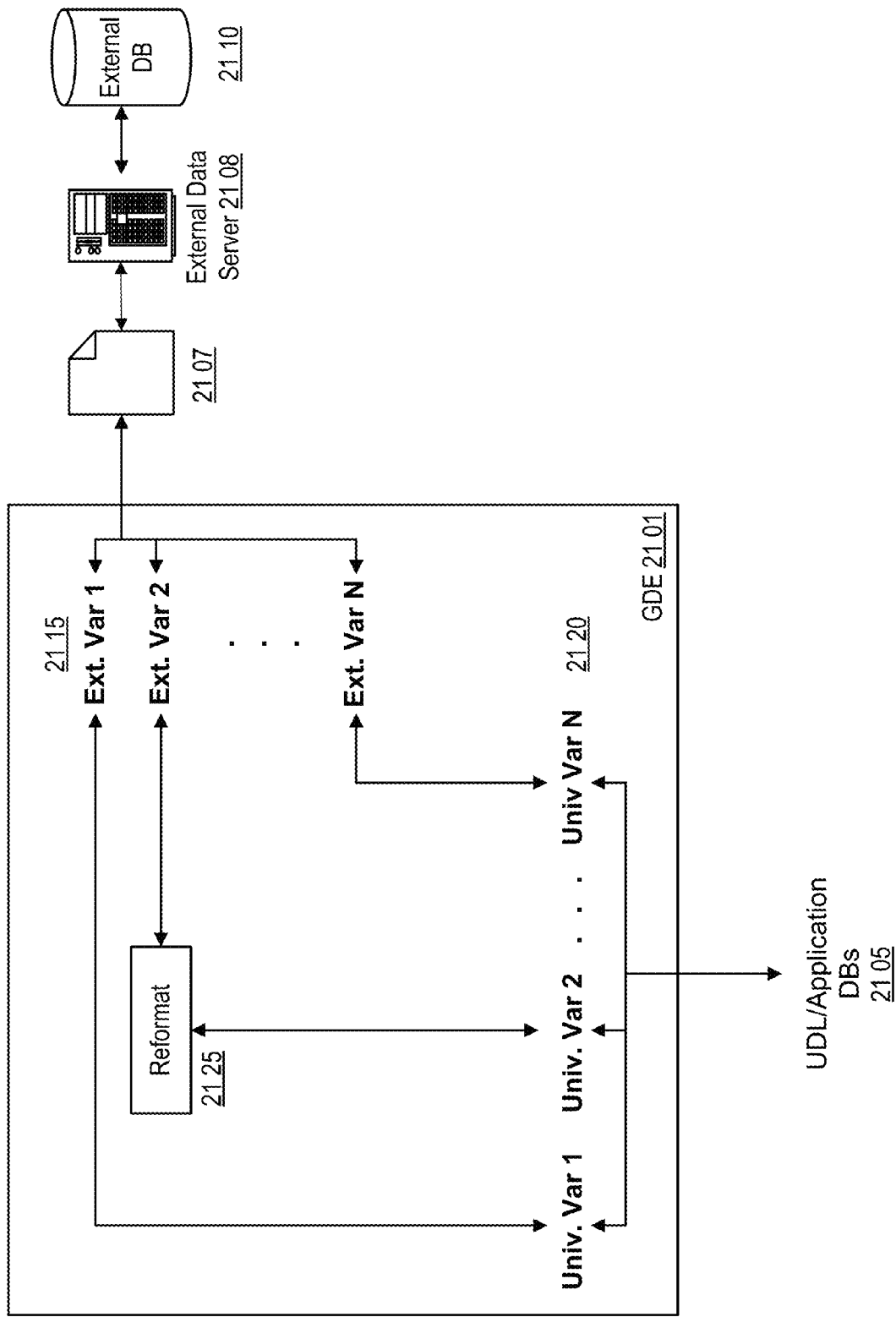

FIGS. 20 and 21 show implementations of data flow for interfacing universal variables to external database fields in one embodiment of ADE-WAM operation. In FIG. 20, the ADE-WAM is shown as a connecting interface between a universal data librarian and/or application databases and an external data server 2108, external database 2110, and/or the like. In the illustrated implementation, the external data server 2108 may generate a data file 2107 based on data contained in the external database 2110. The data file 2107 may be configured in accordance with a variety of formats and/or protocols, such as but not limited to fixed-length, delimited, extensible markup language (XML), and/or the like. In one implementation, the file may be stored in a pre-specified location and accessed by the ADE-WAM, such as on a scheduled, periodic, triggered, and/or the like basis. In an alternative implementation, the file may be pushed to the ADE-WAM as desired by the external data server 2108. The data in the file may be parsed by the ADE-WAM into values for a plurality of external data variables 2115. How the data is parsed from the file may depend on the format and/or protocol with which the file is configured and is discussed at greater length below. The ADE-WAM may access a mapping to determine which universal variables 2120 correspond to which external variables and/or external variable values 2115 parsed from the input file 2107. In some implementations, the ADE-WAM may apply reformatting instructions 2125 to one or more external variable values 2115 prior to storage of those values in association with the corresponding one or more universal variables 2101. Illustrative examples of reformatting instructions include conversion of a Julian formatted date into its Gregorian formatted equivalent; extraction of a first name from any of a variety of different name formats (e.g., First Middle Last, Last First, Last First Middle, etc.); conversion of data present in binary-coded decimal to ordinary decimal representation; and/or the like.

Once the external values are associated with universal variables, the values may be stored in an appropriate database, provided to a local application, and/or the like 2105.

In some implementations, the reverse procedure may also be implemented by the ADE-WAM, whereby data values stored in a local database 2105 and associated with universal variables 2101 are provided as values for external variables 2115 and configured as an output file 2107 for provision to an external data server 2108 and/or external database 2110. In some implementations, the output file 2107 may be configured as a report, which may be provided for viewing on a display device, for printing, and/or the like. In some implementations, the formatting instructions 2125 may be reversible and applied to either external variable values or reversibly to universal variable values.

The data exchange illustrated in FIG. 21 is similar to that shown in FIG. 20, except that instead of reformatting a single external variable 2115 and/or universal variable 2120 value, the ADE-WAM 2101 may apply a function 2130 to combine values associated with more than one of the variables to yield the appropriate associations. For example, the function may specify that Universal Variable 1 is equal to External Variable 1, while Universal Variable 2 is equal to a sum of External Variable 1 and External Variable 2. This example function is reversible, since External Variable 1 and External Variable 2 could be recovered from Universal Variable 1 and Universal Variable 2 (i.e., External Variable 1=Universal Variable 1, and External Variable 2=Universal Variable 2−Universal Variable 1). Any mathematical operation, calculation, computation, data manipulation, reformatting, and/or the like may be applied to data by the ADE-WAM, as desired in various implementations or embodiments of ADE-WAM operation.

In some implementations, the ADE-WAM 2101 in FIGS. 20 and 21 may be provided at the local side 2105 with a limited subset of universal variable inputs, a file containing universal variable inputs and/or pointers to universal variables, and/or the like. This may allow for isolation of data received from an external source and/or generation of universal variable collections for particular functions or implementations of ADE-WAM embodiments. For example, in one implementation, a universal payment file may be generated locally, containing a set of universal variables that are expected to be relevant to any bank payment transaction. The ADE-WAM may then have particular mappings set up for particular banks whereby each mapping selects a subset of universal variables from the universal payment file that is relevant to and/or desired by the particular bank to which payment information is being provided. For example, a domestic wire transaction in the U.S. may only use a routing number and account number, while an international wire may instead, or in addition, require a Society for Worldwide Interbank Financial Transaction (SWIFT) code, intermediary bank information and account number, and/or the like.

Figure 22A:
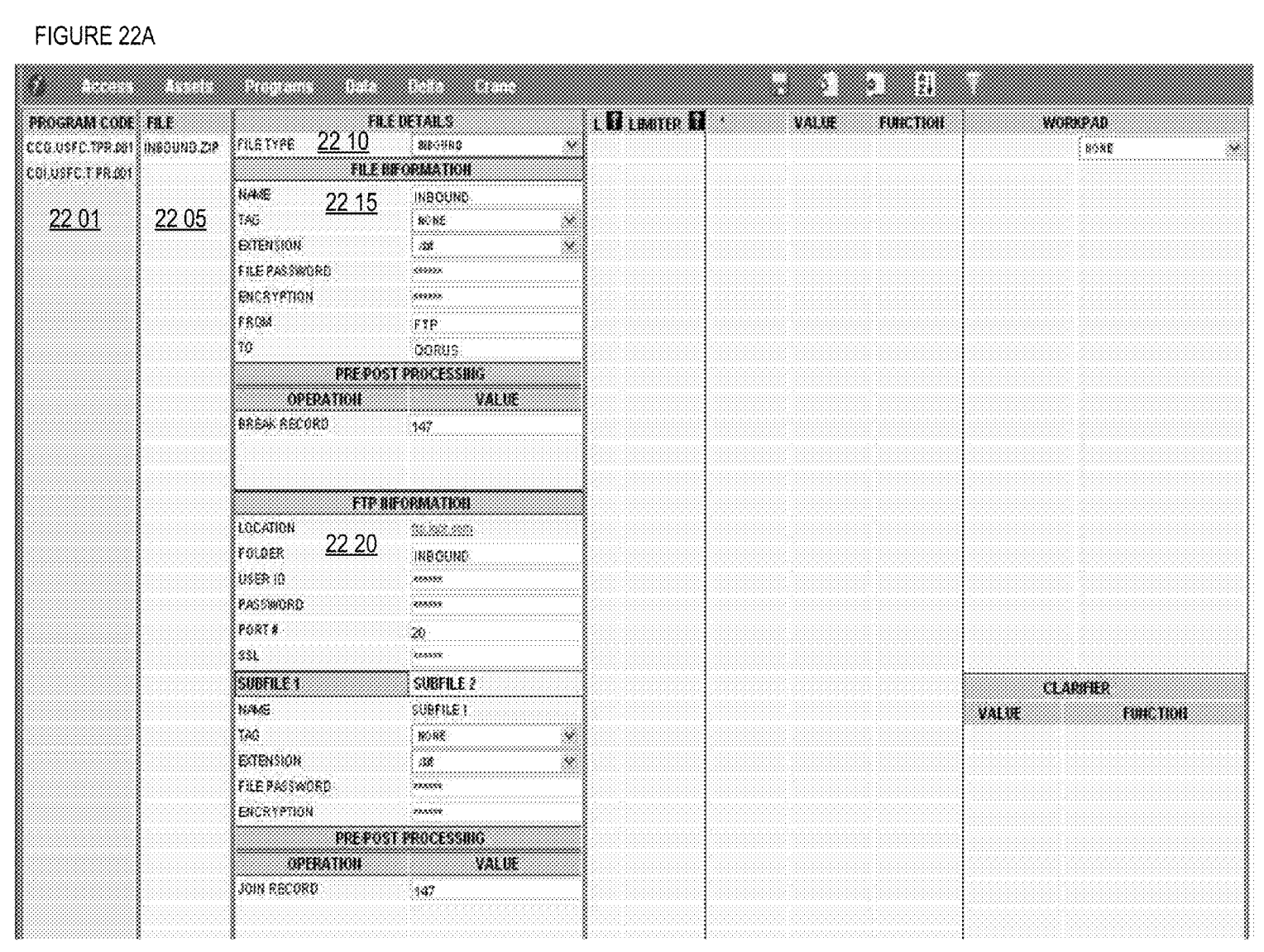
Figure 22B:
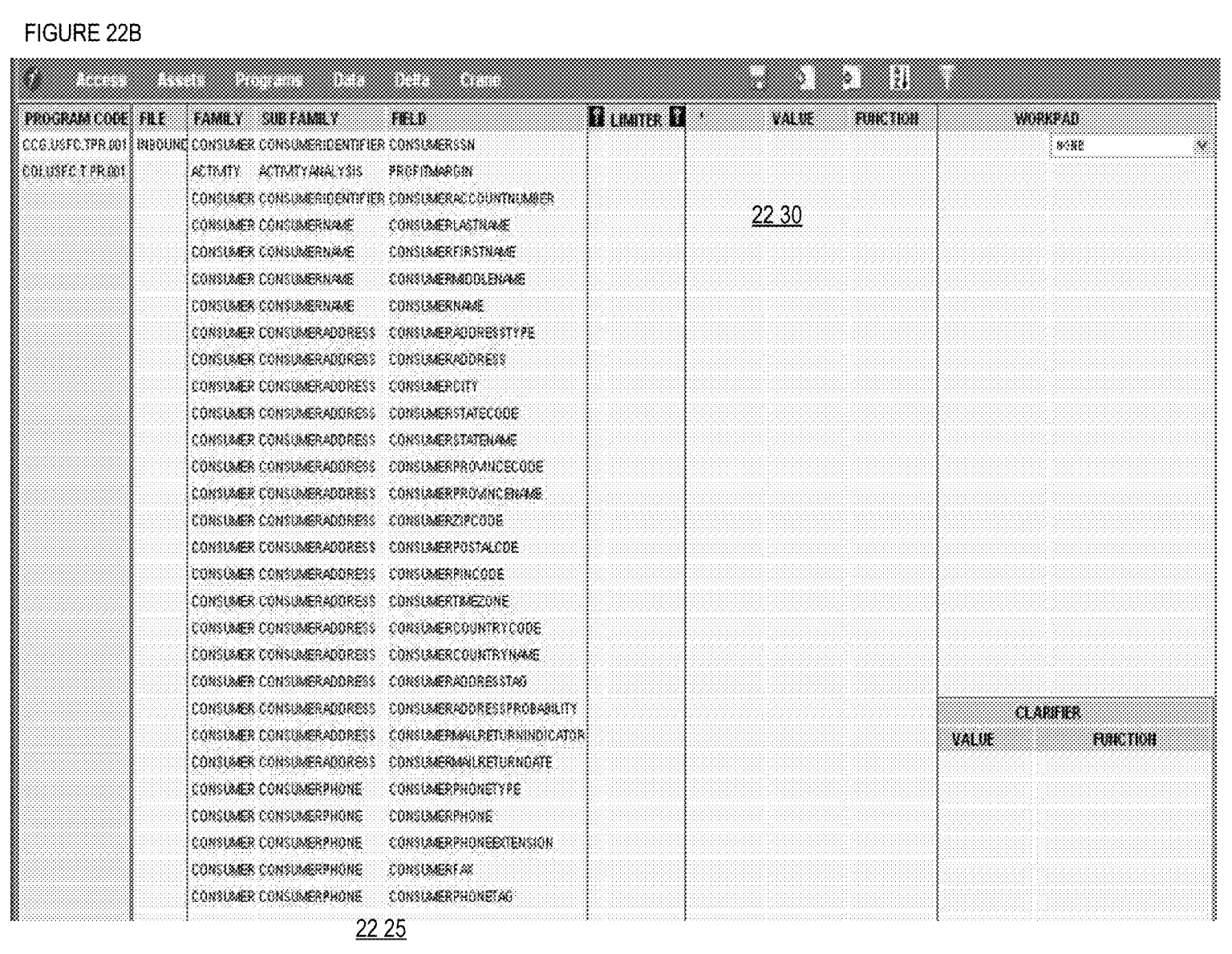
Figure 22C:
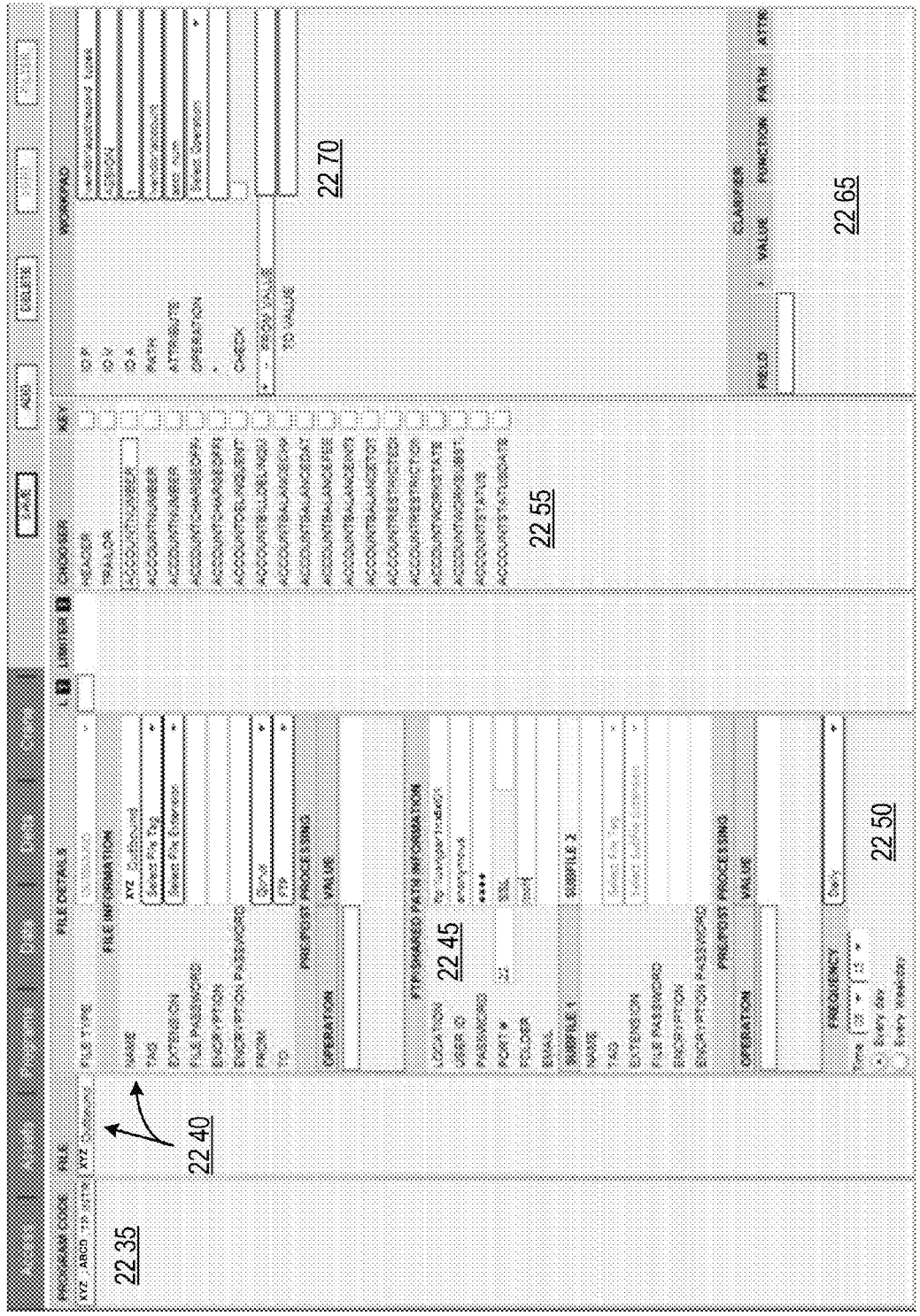

FIGS. 22A-C show implementations of a user interface for data exchange specification in one embodiment of ADE-WAM operation. In FIG. 22A, a user may specify parameters associated with a data exchange with one or more external data sources. For example, the interface may admit specification of a program code 2201, such as may specify characteristics of a program, project, work order, and/or the like. Program codes are described in further detail above. Specification of a program code may cause received data to be stored in association with the program code and/or in association with data corresponding to one or more tokens specified in the program code. The interface may further admit specification of a filename 2205, such as may correspond to a file received from or sent to the external data source. In some implementations, the interface may further admit specification of a filename for a local file input. Additional file information may also be specified, such as a file type 2210 (e.g., inbound, outbound, and/or the like), file format, and a variety of other file information 2215, which may include a file extension and/or associated reader application, file passwords, encryption key, decompression tool, file source (e.g., file transfer protocol [FTP]), file target (e.g., database to which the file and/or data contained therein should be provided), file tags, and/or the like. In an example wherein the file source is an FTP source, the interface may further admit specification of a variety of FTP information 2220, such as an FTP server address, a folder therein, a login and/or password, port number, secure sockets layer information, other security information, and/or the like. The interface may further include facilities for specifying one or more schedules, triggering conditions, and/or the like for causing data to be exchanged between the universal variables and the target. For example, these specified values may be exported as comma delimited values which are to be read by a cron job that feeds them as parameters to various programs.

In one implementation, an FTP cron entry may take a form similar to the following example:

Source: ftp.xyz.com 22 Folder: /inbound/placement Frequency: Daily at 5 AM.

In another example, a user may specify a periodic schedule (e.g., a specified time of each day) at which the ADE-WAM is to pull a file from (or push a file to) an external data target. In another example, a user may specify a triggering condition (e.g., a data update, a user request or other user action, occurrence of an automated part of a process, and/or the like), the occurrence of which triggers a ADE-WAM mediated data exchange between the universal variables and the target. The scheduled and/or triggered data exchange may also apply to data exchanges between local databases mapped to universal variables. For example, a user may specify that, at a specified time every day, particular fields in local database 1 corresponding to the universal variables should be updated with data in fields in local database 2 associated with those same universal variables. In some implementations, a user may specify a time-variable and/or trigger-variable frequency of effectuating transactions. For example, if a new external source has just been added and the data from that source is expected to be updated frequently in an initial period, the transaction schedule for that source may be set to a twice-daily frequency for the first week, followed by a once-daily update for the following two weeks, and a weekly update thereafter. Transaction frequencies may also be automatically varied based on the detected occurrence of specified triggers. For example, the ADE-WAM may monitor a stock market index, such as the Dow Jones Industrial Average, and may be configured to increase transaction frequencies related to market data when a slope of the monitored index exceeds a specified threshold and to decrease the transaction frequency when the slope of the monitored index drops back below the specified threshold.

The interface may further provide a listing of selectable universal variables for association, such as via a drag-and-drop interface mechanism, with parsed components of an external data file (such as may be received from an external source or may be destined for transmission to an external target). An example of such a listing of selectable universal variables is shown at 2225 in FIG. 22B. In one implementation, a universal variable may be dragged and dropped to an association area of the interface, wherein the universal variable may be mapped to and/or otherwise associated with a specified portion of the external file. For example, in one implementation, the external file may be configured as a fixed-length file and one or more universal variables may be associated with one or more portions of the fixed-length file as specified by the position of the data within that file. In another implementation, the external file may be configured as a delimited file and one or more universal variables may be associated with one or more portions of the delimited file as specified by how the data is delimited within the file. In another implementation, the external file may be configured as an XML file and one or more universal variables may be associated with one or more portions of the XML file as specified by the XML tags setting off data within the file.

FIG. 22C shows another implementation of a user interface for specifying parameters associated with a data exchange with one or more external data sources. The interface may include a variety of different parameter specification fields and/or field areas, such as but not limited to: a program code area 2235 for entering one or more strings structured in accordance with a table tracking syntax and/or a descriptive business grammar; filename and detail information area 2240; data exchange counterparty address and detail information area 2245; scheduling information area 2250; universal variable selection listing area 2255, such as may, in one implementation, be configured with a drag-and-drop facility (e.g., employing Silverlight code and language libraries); clarifier specification area 2265 for refining data retrieval results; workpad area 2270 for entering data processing and/or analytical instructions; and/or the like.

An implementation of an XML data exchange specification resulting from inputs to interfaces such as those shown in examples of FIGS. 22A-C may take a form similar to the following example:

<vendor vendor_id='irmcocap'>
<account acct_num="1001221235" bid="1" sid="2" action_dt="2009-10-07">

```xml
<record_types>
  <record_type>ASSIGN</record_type>
</record_types>
<vendor_assignment_detail>
  <screen_name>JOE SHREE</screen_name>
  <day_phone_quality_score>10</day_phone_quality_score>
  <night_phone_quality_score>01</night_phone_quality_score>
  <pi_code>3916</pi_code>
  <pi_title>AOL</pi_title>
  <usage1>0</usage1>
  <usage2>0</usage2>
  <usage3>0</usage3>
  <usage4>0</usage4>
  <usage5>0</usage5>
  <usage6>0</usage6>
  <usage7>0</usage7>
  <usage8>0</usage8>
  <last_4mon_fee>0</last_4mon_fee>
  <last_4mon_roaming>0</last_4mon_roaming>
  <last_4mon_commsurch>0</last_4mon_commsurch>
</vendor_assignment_detail>
<contact_name>
  <first_name>JOE</first_name>
  <last_name>SHREE</last_name>
</contact_name>
<address>
  <street1>100 XYZ ST </street1>
  <street2> </street2>
  <city>XYZ CITY </city>
  <state>NJ</state>
  <zip>00000-0000</zip>
</address>
<phone>
  <day_phone>2222222222</day_phone>
  <evening_phone>2222222222</evening_phone>
</phone>
<acct_osb_amount>10360</acct_osb_amount>
<member_misc_details>
  <current_pm_id>4</current_pm_id>
  <cancel_dt>2009-06-22</cancel_dt>
  <registration_dt>1999-11-26</registration_dt>
  <special_instr> </special_instr>
  <member_status_indicator> </member_status_indicator>
</member_misc_details>
<letter_details>
  <letter_id> </letter_id>
  <letter_due_days>0</letter_due_days>
</letter_details>
<payment_chargeback_details>
  <last_payment_dt> </last_payment_dt>
  <last_payment_amount>0</last_payment_amount>
  <last_chargeback_code> </last_chargeback_code>
  <last_chargeback_amount>0</last_chargeback_amount>
  <last_chargeback_dt> </last_chargeback_dt>
  <old_delinquent_charge_dt>2009-02-27</old_delinquent_charge_dt>
</payment_chargeback_details>
<special_codes/>
<line_item_transactions>
  <transaction>
    <charge_id>0000000000000</charge_id>
    <line_item>1</line_item>
    <line_item_desc>TWX*AOL SERVICE </line_item_desc>
    <pm_id>4</pm_id>
    <osb_amount>10360</osb_amount>
    <placement_dt>2009-10-07</placement_dt>
  </transaction>
</line_item_transactions>
</account>
<account acct_num="000000000" bid="1" sid="2" action_dt="2009-10-07">
</vendor>
```

Other file configurations and parsing specifiers may be employed within various implementations of ADE-WAM embodiments.

Figure 23:
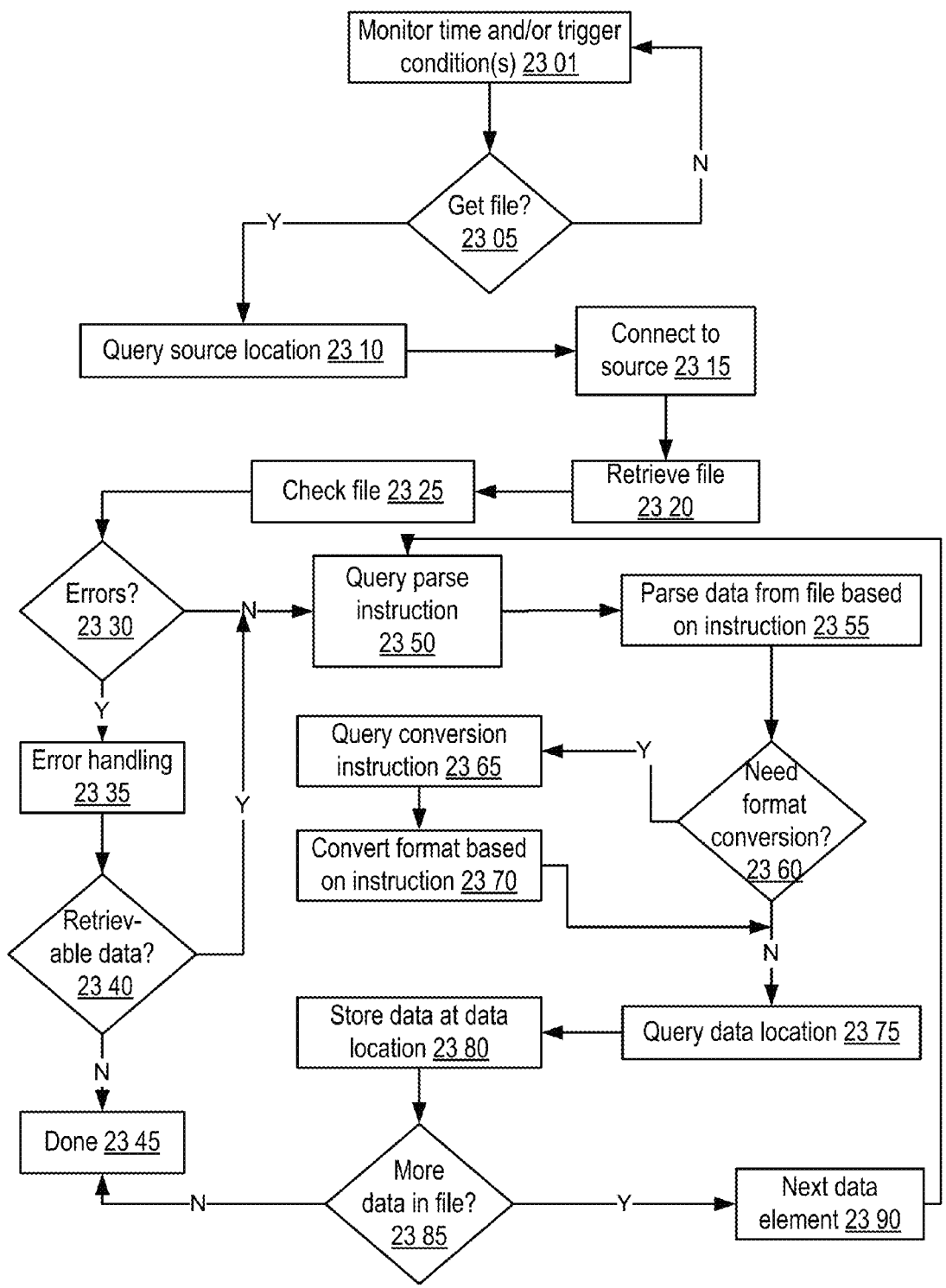
FIG. 23 shows an implementation of logic flow for data exchange in one embodiment of ADE-WAM operation.

FIG. 23 shows an implementation of logic flow for data exchange in one embodiment of ADE-WAM operation. The example illustrated in FIG. 23 is directed to receipt of a file from a data source and provision of data therein to fields associated with the universal variables. It is to be understood that the ADE-WAM may also be configured for the reverse process, generation of a file, report, and/or the like and provision to a target based on data contained in fields mapped to the universal variables (see, e.g., FIGS. 27 and 28). The ADE-WAM may further be configured, in some implementations, for exchange of data from fields in one database that are associated with the universal variables to fields in another database that are also associated with the universal variables (see, e.g., FIG. 26). In the implementation illustrated in FIG. 23, the ADE-WAM may monitor time in relation to a specified schedule and/or one or more specified triggering conditions 2301 to determine whether or not to effectuate a specified data exchange 2305. If not, the ADE-WAM may continue to monitor until the specified time and/or conditions indicate that an exchange is to occur. Once the exchange is triggered, the ADE-WAM may query the location of a data source 2310 (e.g., the address of an FTP server, such as specified at 2220 in FIG. 22A), such as from a mapping record in a database. The ADE-WAM may then connect to the source using the queried address 2315 and retrieve a file 2320 contained therein. In one implementation, the ADE-WAM may retrieve every file contained in a specified target location (e.g., any file stored on the server, any file contained in a specified subfolder, and/or the like). In another implementation, the ADE-WAM may retrieve only a file having a filename matching a name specified in a mapping record associated with the data exchange.

In one implementation, the ADE-WAM may perform an initial check of the file to ensure that it does not have any clear problems or errors. For example, the ADE-WAM may check that the file has at least a minimum file size (e.g., not a null file), is configured in accordance with an expected format, does not exhibit any characteristics of a virus or other undesired file, and/or the like. If errors or other problems are detected 2330, an error handling procedure may be undertaken 2335, such as providing an error message to a specified recipient (e.g., an administrator of the data source), attempting to repair the file, attempting to extract any salvageable data from the file, and/or the like. A determination may be made as to whether there is any retrievable data in the file 2340, such as following an attempted repair at 2335, and, if not, then the process may conclude 2345. Otherwise, if data can be retrieved from the file, the ADE-WAM may query a parse instruction from a mapping record associated with the transaction 2350. The parsing instruction may, for example, specify a position of data in the file for a fixed-length file, a number of delimiters setting off data in the file for a delimited file, an XML tag setting off the data in an XML file, and/or the like. Based on the parsing instruction, the ADE-WAM may parse data from the file 2355. A determination may then be made as to whether any reformatting of the data is needed or desired 2360, such as may be specified in the mapping record. For example, the convention for formatting of dates may be different in the file than for the universal variable to which the date is to be connected, so a conversion of format may be desired before associating the file data with the universal variable and/or table fields connected thereto in local databases. If conversion is desired, then a conversion instruction may be queried from the mapping record 2365, and the particular data converted and/or reformatted in accordance with that instruction 2370. The ADE-WAM may then query a data location associated with the mapping to which the data from the file is to be provided 2375, such as may be directed by a universal variable specified in the mapping record. For example, the data location may be a field in a table in a database mapped to the universal variable to which the data from the file is connected. The data parsed from the file may then be stored at the data location 2380, and a determination made as to whether there is any further data in the file to be extracted 2385. If so, information associated with the next data element may be queried from the mapping record associated with the transaction 2390, and the ADE-WAM may return to 2350 to parse that next data from the file. Otherwise, the transaction may be concluded 2345.

Figure 24:
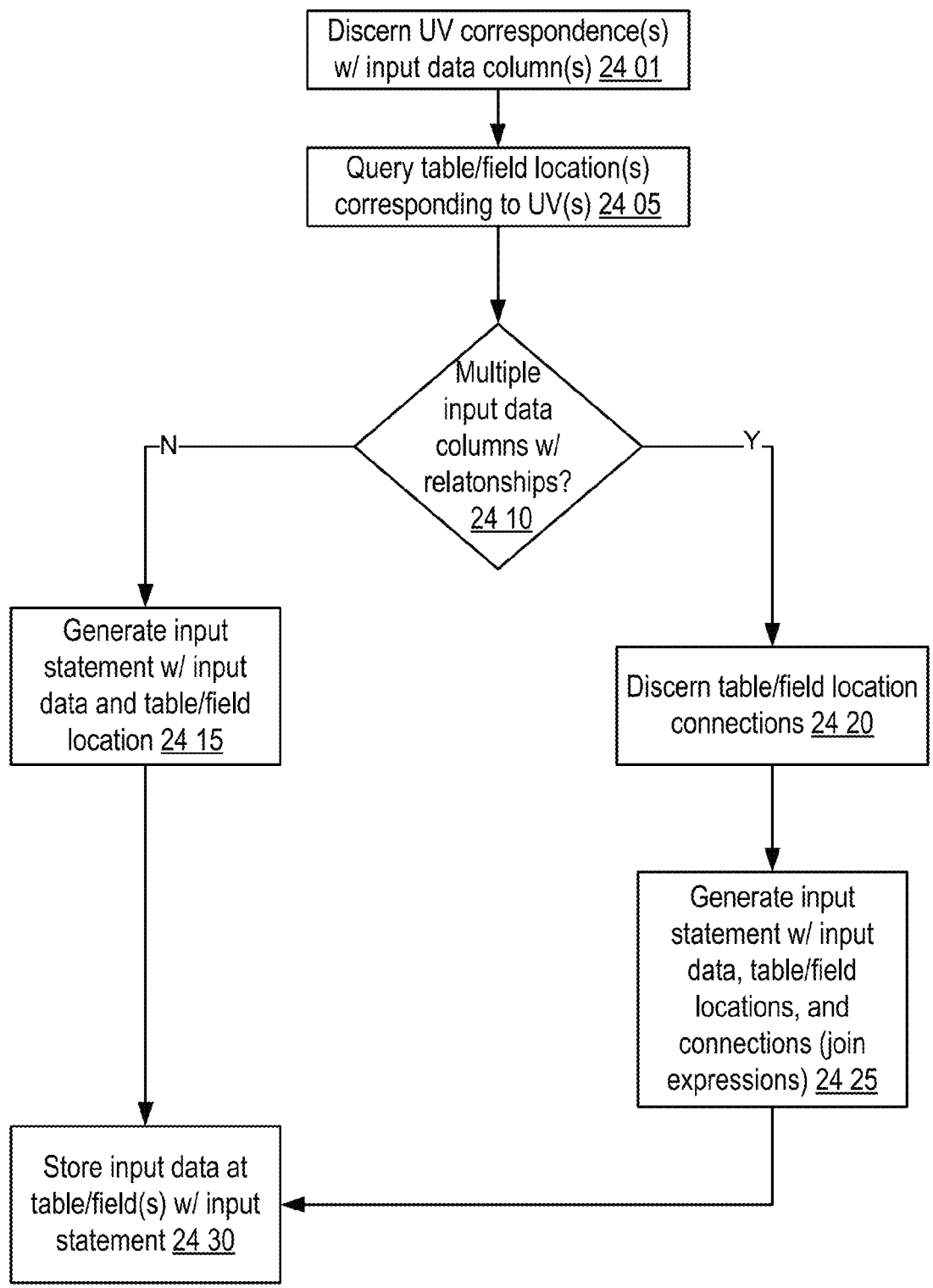
FIG. 24 shows an implementation of logic flow for database input statement generation in one embodiment of ADE-WAM operation.

FIG. 24 shows an implementation of logic flow for database input statement generation in one embodiment of ADE-WAM operation. The logic flow shown in 24 may, in some implementations, be provided as a further detail of the storage of data at 2375 and 2380 in FIG. 23. In some circumstances, data provided in an external file may be provided as a single column of data or may be provided as multiple columns that are independent of each other (i.e., wherein the data in a given row of one column has no relationship to data in a corresponding row of any other column). On the other hand, in some circumstances, data provided in an external file may comprise multiple columns having fixed relationships to each other. An example of this latter circumstance may be a file containing a column of customer names and a second column of customer accounts, wherein exactly one account corresponds to each customer name. The flow in FIG. 24 serves to distinguish between these two circumstances and to handle each appropriately. The ADE-WAM may discern universal variable correspondences to input data columns 2401 and to query the databases and/or table/field locations associated thereto 2405, such as via a mapping record and/or records for universal variables stored in a universal data library. A determination may then be made as to whether there are multiple data columns having fixed relationships to each other in the input data file 240. In one implementation, this determination may be made by querying a specification of a multi-column file with fixed relationships in a mapping record. In another implementation, the ADE-WAM may automatically determine whether columns have a fixed relationship to each other, such as by comparing column headers to values in a table indicating columns that are likely to be related (e.g., "name" and "account" may be associated in such a record, so columns having these words their headers may be automatically determined to have a fixed relationship).

If there are not multiple columns, or if there are multiple columns but no fixed relationship therebetween, the ADE-WAM may generate input statements, such as SQL Input statements, with the input data (which may, in some implementations, be arranged in multiple independent columns) and the corresponding table/field locations 2415 to save the data from the file at those locations 2430. In some implementations, a SQL statement generated as described above may take a form similar to the following example:

insert into tblAccountHdr
(ClientAccountNumber ,ProgramID ,CreatedDate ,TS ,CreatedBy)
select tblAccountHdr_ClientAccountNumber ,ProgramID ,getdate( )
,'633976851390226187', '311'
from
(select t1.tblAccountHdr_ClientAccountNumber__1__0 as tblAccountHdr_ClientAccountNumber ,t2.ProgramID
From ##iQorFileMapping_
 fdfde5fb3c8c03411f3be8a3cd7c6953edcf2 t1
inner join tblProgram t2 on t2.ProgramCode=t1.tblProgram_ProgramCode__1__1
WHERE t1.tblAccountHdr_ClientAccountNumber__1__0 is not null
Except
Select ClientAccountNumber ,ProgramID
from tblAccountHdr ) b
|Q|Parent
insert into tblPhoneNumber
(PhoneTypeCode ,PhoneNumber ,PhoneSource ,PhoneSubSource ,AccountID
,EffectiveDate ,CreatedDate ,TS ,CreatedBy)
select tblPhoneNumber_PhoneTypeCode ,tblPhoneNumber_PhoneNumber
,tblPhoneNumber_PhoneSource ,tblPhoneNumber_PhoneSubSource ,AccountID
,getdate( ) ,getdate( ) , '633976851390538675', '311'
from
(select t1.tblPhoneNumber_PhoneTypeCode__5__0 as tblPhoneNumber_PhoneTypeCode ,
case
when len(ltrim(rtrim
 (t1.tblPhoneNumber_PhoneNumber__6__0)))>0 and
isnumeric(ltrim(rtrim
 (t1.tblPhoneNumber_PhoneNumber__6__0)))=1
then convert(decimal(20,0),ltrim(rtrim
 (t1.tblPhoneNumber_PhoneNumber__6__0)))
when len(ltrim(rtrim
 (t1.tblPhoneNumber_PhoneNumber__6__0)))=0 and
isnumeric(ltrim(rtrim
 (t1.tblPhoneNumber_PhoneNumber__6__0)))=0
then 0
else ltrim(rtrim(t1.tblPhoneNumber_PhoneNumber__6__0)) end as
tblPhoneNumber_PhoneNumber
,t1.tblPhoneNumber_PhoneSource__9__0 as
tblPhoneNumber_PhoneSource
,t1.tblPhoneNumber_PhoneSubSource__10__0 as
tblPhoneNumber_PhoneSubSource ,t3.AccountID
from ##iQorFileMapping_
 fdfde5fb3c8c03411f3be8a3cd7c6953edcf2 t1
inner join tblProgram t2
on t2.ProgramCode=t1.tblProgram_ProgramCode__1__1
inner join tblAccountHdr t3
on t3.ClientAccountNumber=t1.tblAccountHdr_ClientAccountNumber__1__0 and
t3.ProgramID=t2.ProgramID WHERE
 t1.tblPhoneNumber_PhoneTypeCode__5__0 is not
null AND t1.tblPhoneNumber_PhoneNumber__6__0 is not
 null AND
t1.tblPhoneNumber_PhoneSource__9__0 is not null AND
t1.tblPhoneNumber_PhoneSubSource__10__0 is not null)b If, on the other hand, the ADE-WAM determines that there are multiple columns with a fixed relationship between them at 2410, then it may seek to discern relationships between table/field locations to which the columns in the file correspond 2420. For example, the file may include a column for customer_name, which is connected to a universal variable CustomerName, and a column for customer_account, which is connected to a universal variable CustomerAccount. Each universal variable is, in turn, mapped to table fields within one or more databases, such as a customer name field and a customer account field. In order to build a command to port the file data to those fields, the ADE-WAM may seek to determine the relationship between the customer name field and the customer account field. If these fields are in the same table in the same database, a direct Input statement may be employed. However if, for example, the fields exist in different tables within a database, the Input statement may be supplemented with a Join clause, such as a SQL Join clause, to reflect the connection between the tables and the data provided thereto. By inputting the data with the Join clause, the connection between the customer name information and the customer account information will be preserved for future access. Further detail as to how the relationship between table fields is determined is provided below. Once the relationship is established, the ADE-WAM may generate an Input statement with the file data, the table/field locations, and any necessary or desired Join clauses 2425, and may store the data with the generated statement 2430.

Figure 25:
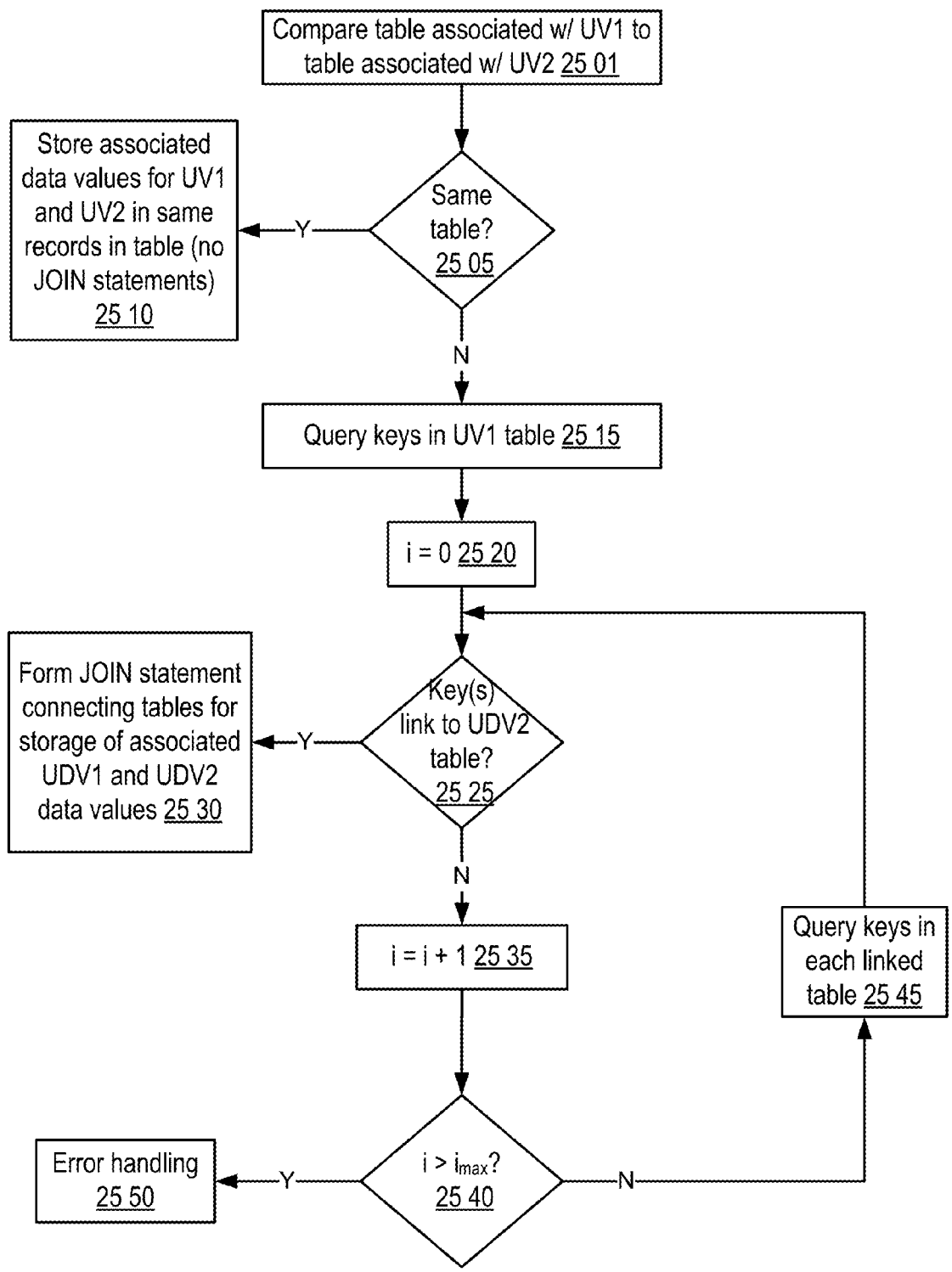
FIG. 25 shows an implementation of logic flow for determining data relationships in one embodiment of ADE-WAM operation.

FIG. 25 shows an implementation of logic flow for determining data relationships in one embodiment of ADE-WAM operation. The example illustrated in FIG. 25 is directed primarily to an implementation discerning a relationship between two related data columns. It should be understood, however, that the flow can be generalized to discern relationships between any desired number of data columns, such as to assist in generation of Join clauses for database transaction commands. The ADE-WAM may compare a first table field associated with a first universal variable (which, in turn, may be associated with a first column of an input file) and a second table field associated with a second universal variable (which, in turn, may be associated with a second column of an input file) 2501. A determination may be made as to whether the first table field and second table field are fields within a single table 2505. For example, the ADE-WAM may check whether the fields are in tables having the same name and in existing in the same database. If the fields are in the same table, the ADE-WAM may generate a database command to store the values in the same table, wherein the command may not include any Join clauses 2510. If the fields are not in the same table, the ADE-WAM may query keys contained in the table associated with the first universal variable 2515 and a counter may be initialized 2520. The ADE-WAM may then determine whether at least one of the keys in the table corresponding to the first universal variable connects to a table associated with the second universal variable 2525. If so, the ADE-WAM may form a Join clause for inclusion in a database command for storing the data values in association with the first and second universal variables, wherein the Join clause explicitly connects the tables associated with each universal variable 2530. Otherwise, if no direct connection can be discerned between the tables associated with the first and second universal variables, then the counter may be incremented 2535, and a determination made as to whether the counter exceeds a pre-set maximum value 2540. If not, then the ADE-WAM may query keys contained in each table directly connected to the table corresponding to the first universal data variable, or to whatever the last round of tables checked at 2525 were, and repeat the determination of whether any of those keys link to the table corresponding to the second universal variable (2525-2540). When the counter exceeds the maximum, the flow may be exited and/or an error handling procedure may be undertaken 2550, such as providing an error message to a user and/or administrator indicating that the distance between the tables corresponding to the first and second universal variables is too great to be established, and/or the like.

FIG. 26 shows an implementation of a user interface for database integration in one embodiment of ADE-WAM operation. The interface shown in FIG. 26 may, in one implementation, be employed to specify connections between table fields in different databases, such as local databases and/or separate databases connected to different enterprise software applications. The interface may, in one implementation, admit specification of one or more universal variables 2601, as well as an identifier of a source database 2605 and of a target database 2610. The interface may further admit specification of a frequency, schedule, triggering condition, and/or the like 2615, which may set how often the data in a field in the source database that is associated with the universal variable is provided to corresponding field in the target database. In one implementation, a default schedule may be implemented when no other scheduling and/or triggering specification is provided, such as one time only, once per day, once per week, and/or the like. The interface areas at 2620, 2625 and 2630 may further admit additional limitations, specifications, operations, and/or the like for the data transactions specified in the interface. In one implementation, a user may specify information to limit the data associated with a universal variable that is passed from the source database to the target database. For example, a user may specify values for a second table field and/or universal variable to limit data for the first universal variable to only those values associated with the specified values for the second universal variable and/or table field (e.g., only provide account information or male customers). The interface may further admit specification of reformatting instructions and/or one or more functions and/or operations (e.g., mathematical calculations) to be performed on one or more data values extracted from the source before providing the processed data to the target.

Figure 27B:
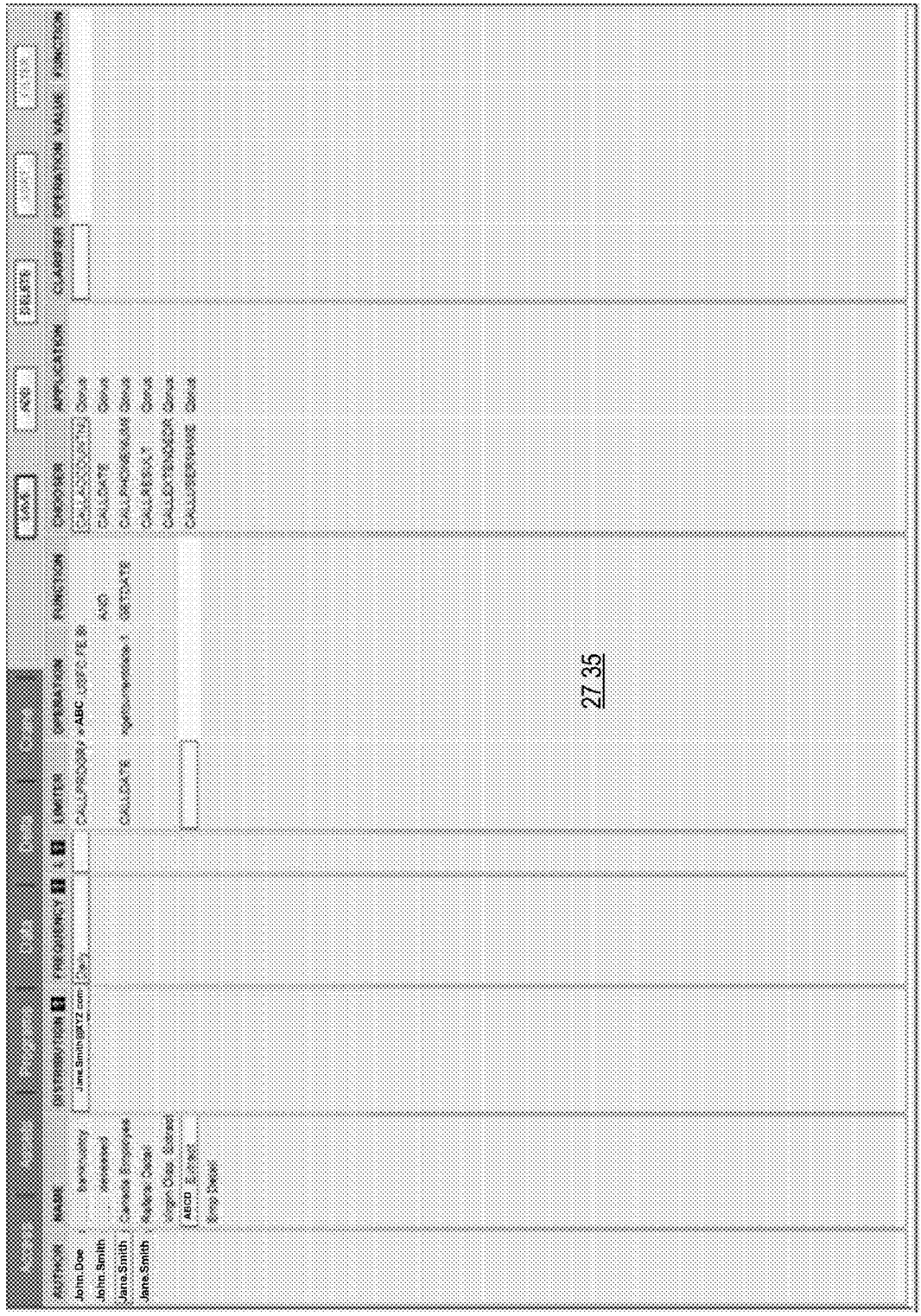

FIGS. 27A-C show implementations of a user interface for report generation and generated reports in one embodiment of ADE-WAM operation. The interface in FIG. 27A may, in various implementations, admit input of report specifications, including a selection of data to be included (such as may be specified in terms of universal variables), data layout, desired or required manipulations of data, scheduling and/or triggering of report generation and/or output, and/or the like. In one implementation, the interface may admit specification of an author of a particular report generation template 2701, as well as a name identifying the template 2705, a distribution list and/or other target information for the report 2710 (e.g., a list of e-mail addresses, an FTP server address, a location on a file system, and/or the like), a report generation frequency (and/or, in various implementations, a schedule, triggering condition or event, and/or the like), and/or the like. The interface may further admit selection of any of the full set or some subset of universal variables, such as via a drag-and-drop mechanism. Selected universal variables, shown at 2725 in the figure, may be limited as to the particular database from which their associated data is to be drawn, and may further be limited in a variety of other ways. For example, the illustrated implementation admits entry of so-called Limiters 2720, specifying desired values for particular universal variables, program codes and/or code tokens, department codes and/or code tokens, and/or the like. Here, the data retrieved for a report is limited to those data associated with a PROGRAM-CODE of CL1.USMI.FP.HR and a PLACEMENTMONTH of August 2008. The interface may further admit additional limitations on the data included in the report, such as by the so-called Clarifiers shown at 2730. Clarifiers may, in one implementation, limit the data based on specified relationships between universal variables (e.g., "DIALEDDATE>=PLACEMENTDATE", "CALLRESULT=PROMISE", and/or the like).

Another implementation of a report parameter specification interface is shown at 2735 in FIG. 27B, with report parameter fields filled. FIG. 27C displays an example of a report generated by the inputs shown in FIG. 27B. The report is configured as a spreadsheet file and includes columns corresponding to extracted data such as call account number 2740, call user name 2745, call phone number 2750, call result 2755, extended result 2760 (which may, in one implementation, include additional information to refine the call result information), call date and/or time 2765, and/or the like.

In one implementation, Silverlight code, general Silverlight language libraries, and/or the like may be used to generate the tables and column presentation in HTML format. The tables may be comprised of text fields, and appropriate calls to the libraries may be made to pass information via drag and drop.

In various implementations, a report may be generated for output as a physical document (e.g., a printout), an electronic document, a structured data file (e.g., fixed length, delimited, XML, and/or the like), one or more database records, a user interface display, and/or the like.

Figure 28:
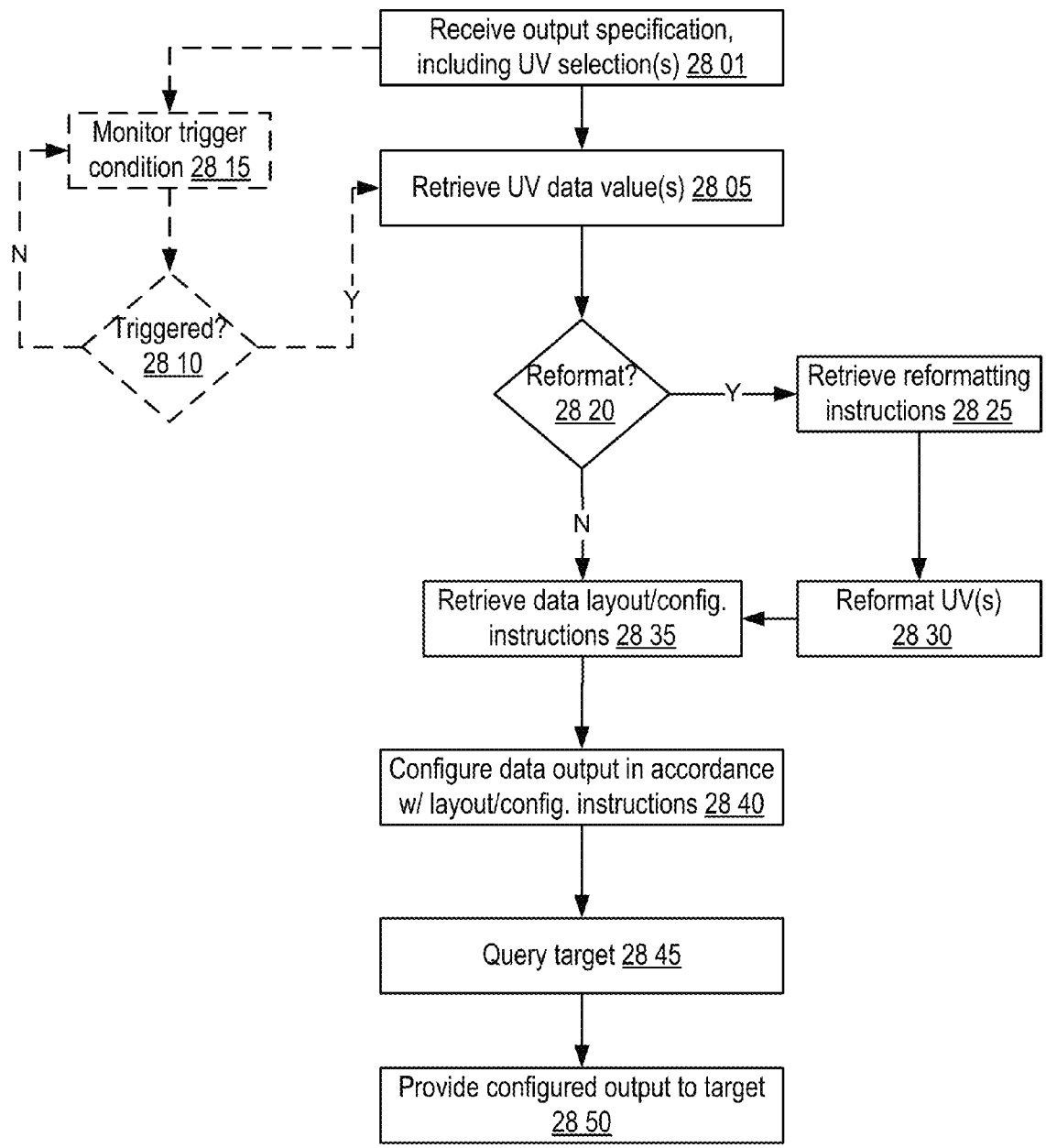
FIG. 28 shows an implementation of logic flow for report generation in one embodiment of ADE-WAM operation.

FIG. 28 shows an implementation of logic flow for report generation in one embodiment of ADE-WAM operation. A report output specification, such as may define a report template and may include a selection of universal variables, may be received 2801, such as via a report generation user interface. Based on the universal variables specified in the report output specification, data values associated with selected universal variables may then be retrieved from the sources containing those values 2805. In one implementation, data values in contained in table fields in remote databases that are associated with universal variables may first be pulled into one or more cache and/or local databases, and/or used to update table fields in local databases, before being retrieved for report generation. In an alternative implementation, no intermediate pulling of data values occurs, and the data is read directly from the remote database prior to inclusion in the report. In one implementation, such as when a report specification includes scheduling information, periodicity, triggering conditions, and/or the like, those triggering conditions, a clock, and/or the like may be monitored 2815 to determine when a report is to be generated, when the data for the report is to be sampled, and/or the like. A determination may be made as to whether or not report generation, data sampling, and/or the like has been triggered 2810 before proceeding to retrieve the requisite data for the report 2805.

A determination may be made as to whether any of the retrieved data is to be reformatted, modified, functionally combined with one or more other data values, and/or the like prior to inclusion in the report 2820. If so, the reformatting instructions may be retrieved 2825, such as by querying them from a report generation template record, and those instructions may then be applied to one or more selected universal variables and/or universal variable values 2830. In one implementation, a set of data layout and/or configuration instructions may also be retrieved 2835, such as from a report specification template record. Data layout and/or configuration instructions may, for example, include specifications of the arrangement and/or order of data; font, text size, text color, and/or other typographical characteristics of the data; titles, headers, borders, margins, table formats, charts, graphics, and/or the like for inclusion with the data; and/or the like. The retrieved data may then be configured in accordance with the retrieved layout and/or configuration instructions 2840.

A report target may then be queried 2845, such as from a report generation template record. A report target may, in various implementations, be selected from any of a wide variety of different possibilities, such as a display interface, a printer, a local or remote database and/or data server, an electronic file and/or document format (e.g., portable document format, spreadsheet, word processing document, and/or the like), and/or the like. The configured report may then be provided to the target 2850. In some implementations, a schedule, triggering condition, and/or the like may monitored to determine when the report should be provided to the target. In one implementation, the schedule, triggering condition and/or the like for provision of a report to a target may be separate and distinct from a schedule, triggering condition, and/or the like for report generation and/or data querying for inclusion in a report.

In some implementations, the ADE-WAM may be integrated as part of the system architecture illustrated in FIG. 1 and may interact with any or all of the other system components described with reference thereto. For example, in one implementation, the ADE-WAM may be provided at the authentication/control server 135 and/or at the data server 140 to mediate interactions with data stored in one or more central databases 145. Mediated interactions may include interactions with external and/or third party data sources or targets, projection servers 115, thin clients and/or other network terminal devices, and/or the like.

Communications Management

In some implementations, the ADE-WAM may include facilities for managing communications, including: a call restrictor (ADE-WAM), which may modify call placement and reception abilities of one or more softphone applications executing on a client terminal; a call searcher (ADE-CS), which may monitor softphone calls, analyze and rate call properties, flag specific calls based on the monitoring, analysis and property ratings, and provide search functionality for calls according to call properties, ratings and/or flags; and a web access manager (ADE-WAM), which may control network access abilities of the client terminals.

Figure 29A:
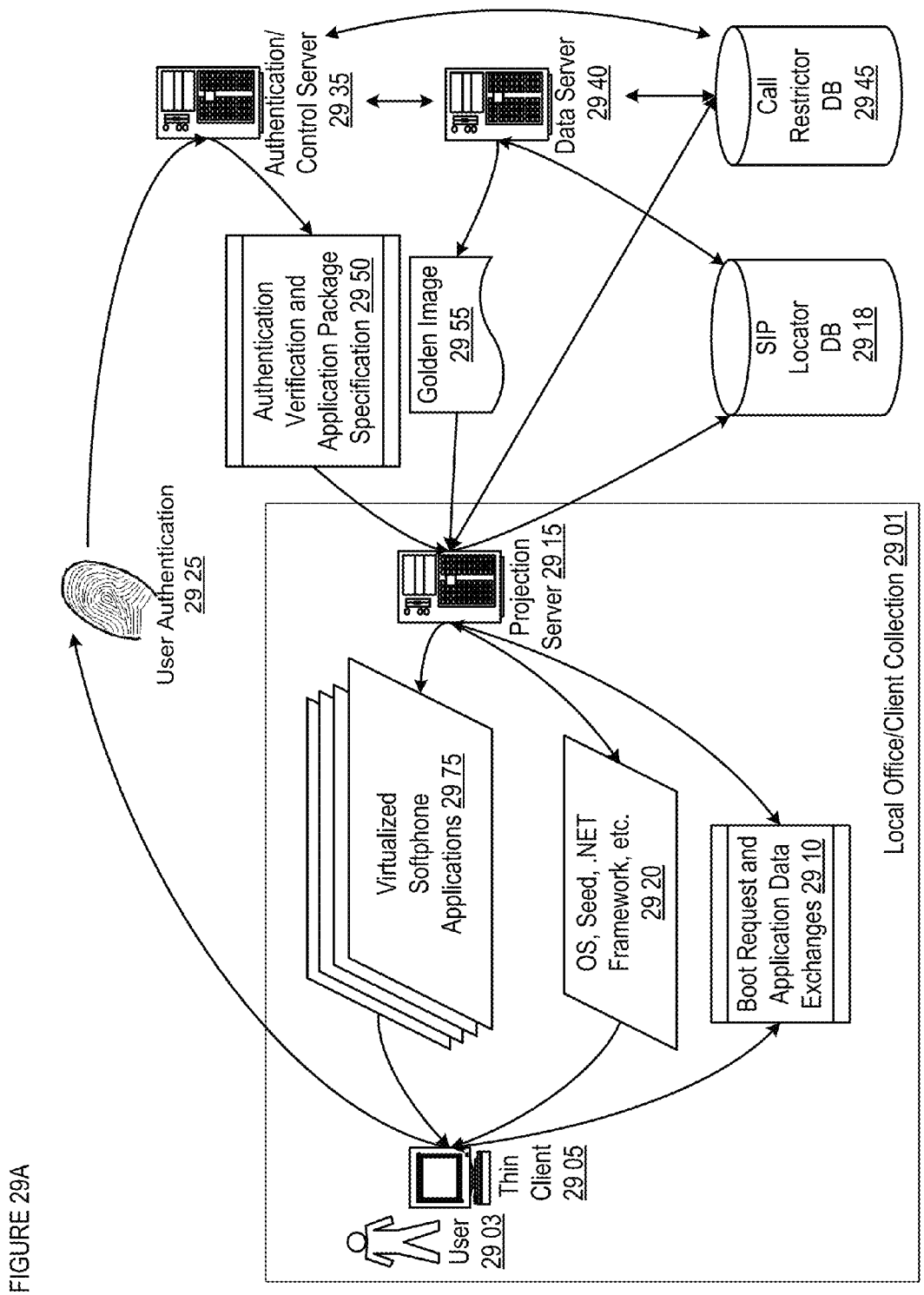
FIGS. 29A-B illustrate an implementation of data and logic flow among and between ADE-WAM components and/or affiliated entities for setting up a client terminal to operate softphone applications in one embodiment of ADE-WAM operation.
Figure 29B:
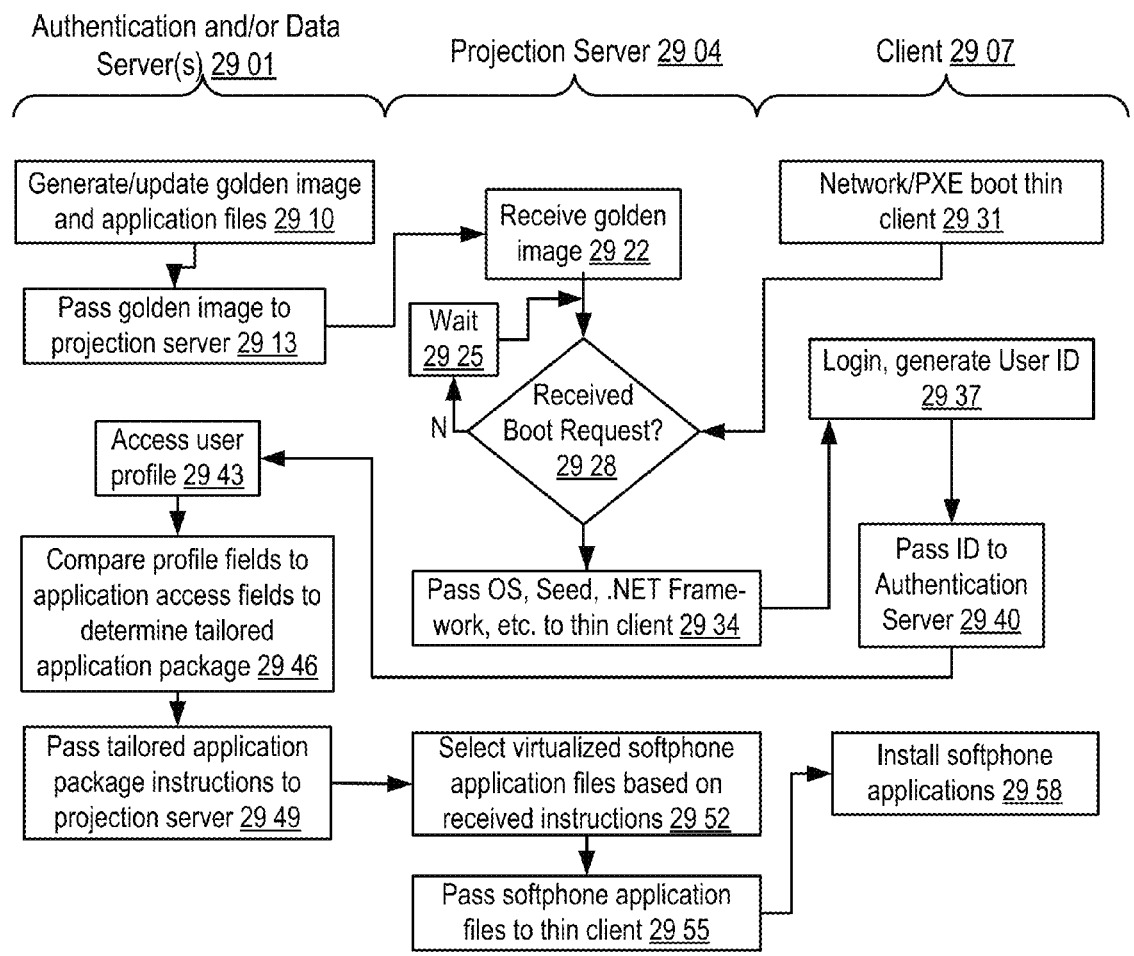
Figure 30A:
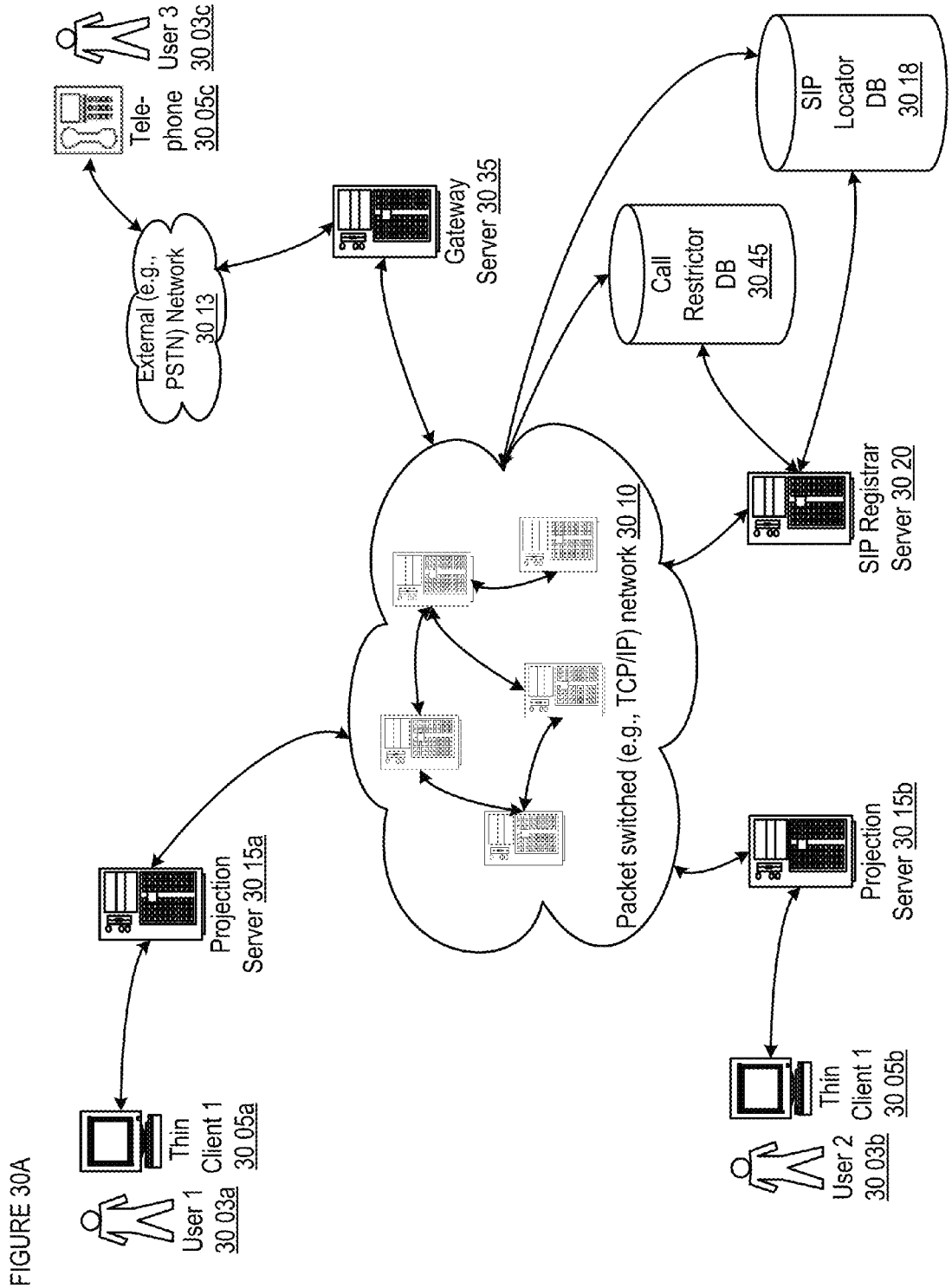
Figure 30B:
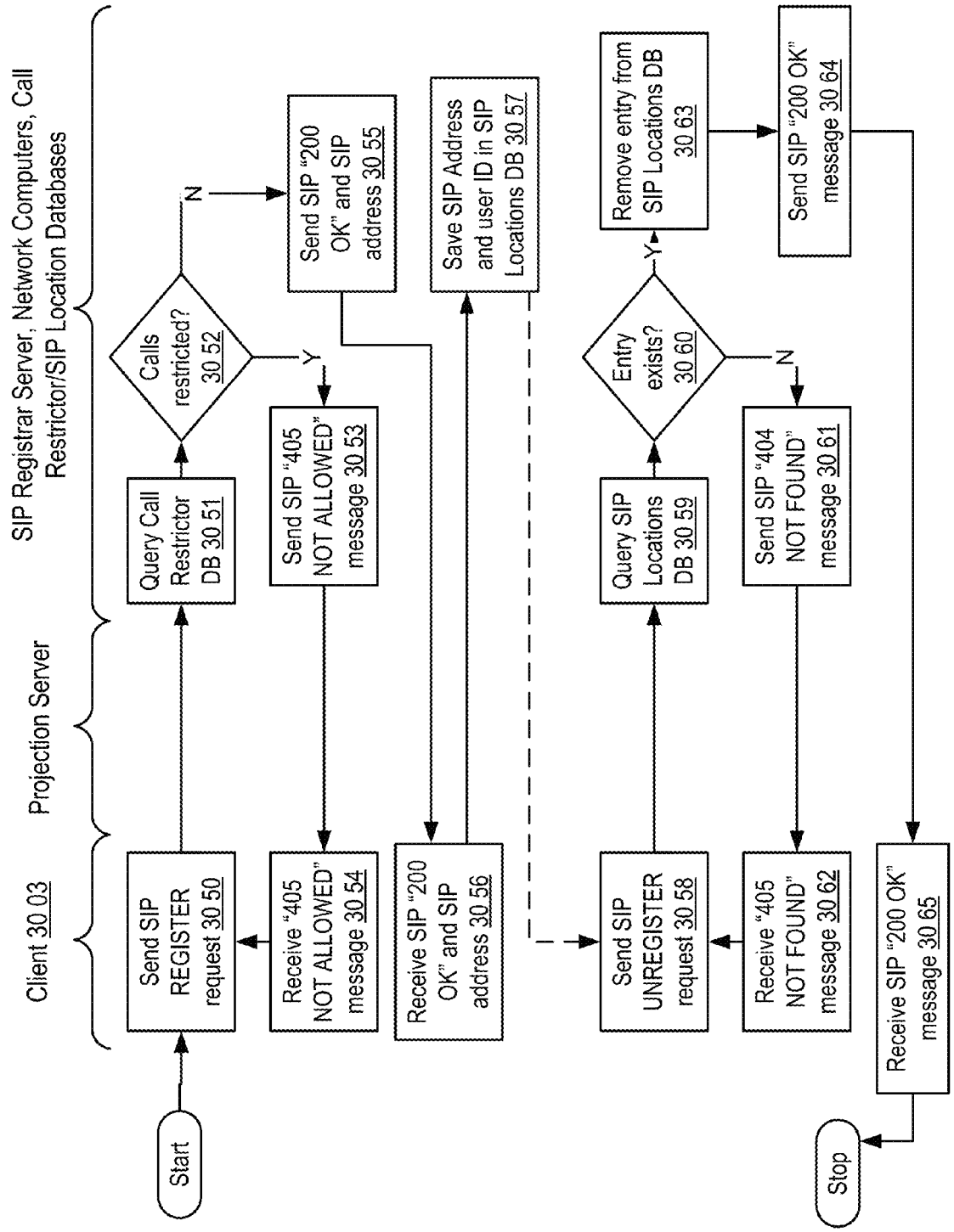
Figure 30E:
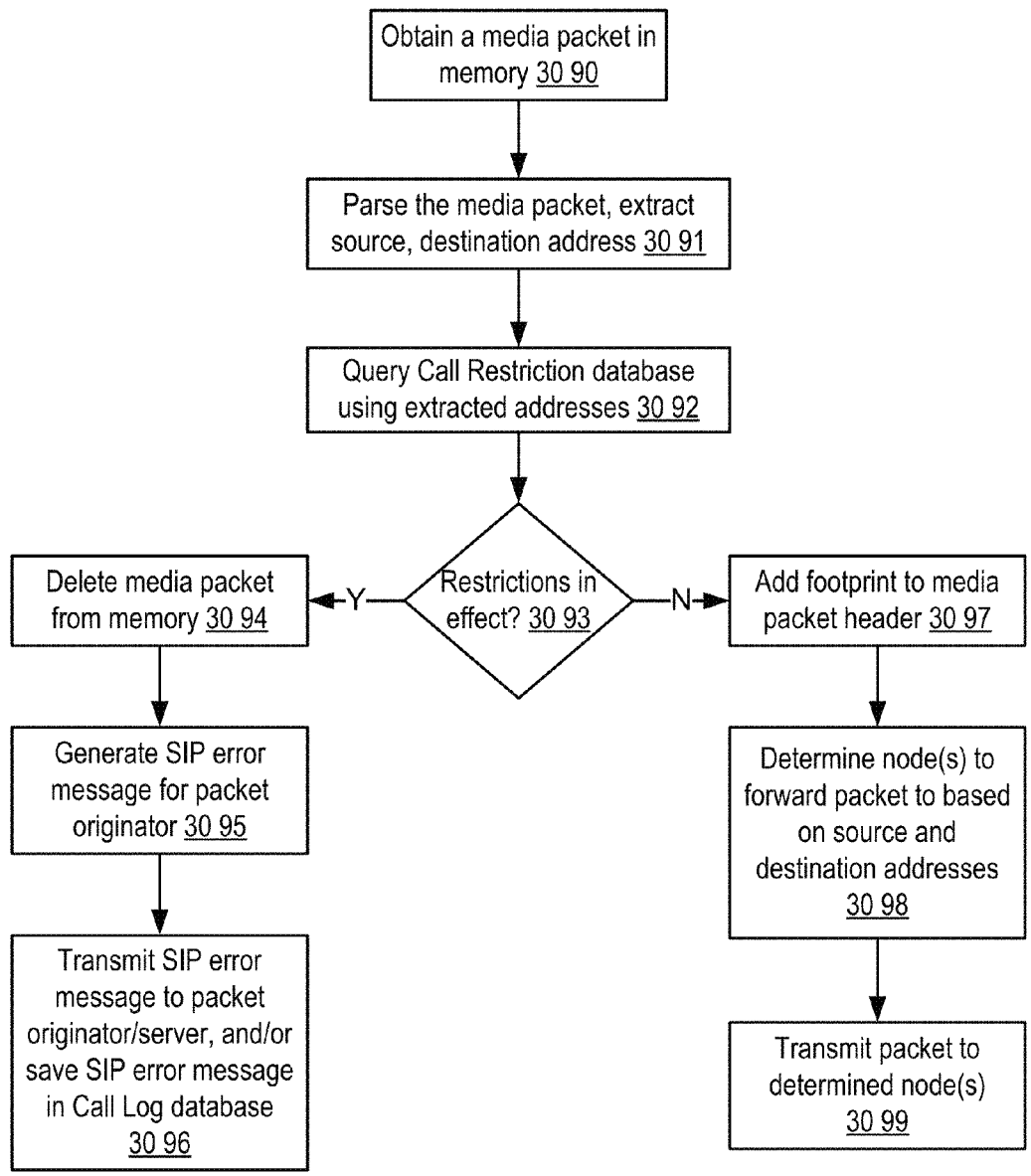

FIGS. 29A-B illustrate an implementation of data and logic flow among and between ADE-WAM components and/or affiliated entities for setting up a client terminal to operate softphone applications in one embodiment of ADE-WAM operation. In some implementations, the Golden Image 2955 supplied by the data servers 2940 may include one or more softphone applications for execution on the projection server 2915 and/or client terminals 2901 and/or data servers. In some implementations, a user 2903 of the client terminal 2905 may relay a network boot request 2910 to the projection server, which may, in response, provide elements 2920 of the Golden Image to facilitate booting the client and authenticating the user of the client terminal. Subsequent to user authentication 2925 via the projection server and/or authentication server 2935, the authentication server may query a database (e.g., the Call Restrictor database 2945) for records matching the user's profile to determine whether softphone applications should be provided to the user. In some implementations, the ADE-WAM may determine that one or more softphone applications may be installed for execution on the client terminal, projection server and/or data server. Accordingly, the authentication server may provide an instruction 2950 to the projection server to provide the authorized softphone application files to the client terminal and/or install/execute one or more authorized softphone application files on the projection server and/or data server. In turn the projection server may provide virtualized executable softphone application files 2975, including one or more softphone applications, to the client terminal at which the user is logged in. In some implementations, installation procedures on the client terminal may be required prior to the user being able to operate the softphone applications.

In some implementations, the authentication and/or data server(s) 2901 may generate and/or update a golden image, application files, data tables and/or records, and/or the like 2910 and may pass the golden image and/or other updates to the projection server 2913, which receives them at 2922. A client terminal may be booted, such as on machine startup, to initiate a network (e.g., PXE) boot 2931, passing a boot request over the network, such as to the projection server 2904. The projection server 2904, in turn, may monitor and/or determine whether a boot request has been received 2928. If not, the projection server may wait for a period of time before checking again for a boot request 2925. Once the request is received, the projection server may pass files and/or data to the client terminal 2934. The client may start the boot process and begin to copy and unpack the materials provided from the projection server. Using the received files from the projection server that have now been executed/instantiated, a user at the client terminal may login and/or otherwise generate a user ID 2937. The generated user ID may then be passed to the authentication and/or data server(s) 2940, which may access user information and/or a user profile associated with the user ID 2943. Accessed user information may then be used to determine which applications to include in a tailored application package for that user 2946. In some implementations, the user-appropriate applications may include one or more softphone applications facilitating the placement and reception of telephone calls via the user's client terminal.

Once the appropriate package of applications is determined for the user, the authentication and/or data server(s) may pass an instruction message to the projection server 2949, the message comprising, in one implementation, specification of applications to be provided to the user. The projection server may receive the instruction and select a package of tailored application files to provide to the client terminal 2952. In one implementation, the projection server may select and provide to the client terminal 2955 a plurality of virtualized application executable files corresponding to selected applications, including the softphone applications. The client terminal may, in some implementations, perform any installation procedures 2958 necessary prior to execution of the softphone applications.

FIGS. 30A-E illustrate implementations of data and logic flow among and between ADE-WAM components and/or affiliated entities for managing a telecommunications session between client terminal users and/or telephone users in an exemplary embodiment of ADE-WAM operation. In some implementations, softphone/browser/network applications and hardware at the client terminal may operate via a communication network in conjunction with the facilities at the projection servers and the authentication and/or data servers to provide telecommunications services for the client. In some implementations, the various softphone facilities operatively connected to the communication network may, to ensure interoperability, operate in accordance with one or more communication protocols (e.g., Real-time Transport Protocol (RTP), Session Initiation Protocol (SIP), H.323 protocol suite, proprietary protocols such as Skype's peer-to-peer Internet telephony protocol and/or the like) to provide telephony services to the user logged in a client terminal. For purposes of illustration only, and not limitation, the various facilities providing telephony services to the user at the client terminal may be discussed in the implementations below as operating in a client-server model utilizing, among other protocols, the Session Initiation Protocol (SIP) for call signaling, and the Real-time Transport Protocol (RTP) for data packet formatting, over a Transmission Control Protocol/Internet Protocol (TCP/IP) computer network, and utilizing Transport Layer Security (TLS) cryptographic protocol, to provide secure Voice over IP (VoIP) services. However, it is to be understood that numerous other combinations of a variety of other operating models (peer-to-peer, ad-hoc and/or the like), utilizing a variety of other hardware resources and/or other communication protocols, to provide a variety of other communication services (e.g., internet connectivity, video, interactivity, teleconference, multi-cast, chat, etc.), are contemplated.

In some implementations, a user 1 (e.g., 3003a) logged in at a client terminal (e.g., 3005a) may be authorized to place/receive telephone calls, and may wish to place a call to a user 2 (e.g., 3003b, 3003c) logged into a second client terminal (e.g., 30005b) or a user 3 (e.g., 3003c) operating a standard telephone (e.g., 3005c) operatively connected to an external network (e.g., a circuit-switching public switched telephone network (PSTN) such as 3013). In such implementations, the client terminal 3005a may be provided, along with the virtualized softphone application files, an IP address of at least one SIP Registrar server in the network 3010 to which requests for telephony services may be placed. For example, the SIP Registrar servers 3020 may be a projection server and/or the data servers. The SIP Registrar servers may be operatively connected to a Call Restrictor database 3045 and a SIP Locator database 3018.

In some implementations, after the softphone applications are installed on the client terminals, the client terminals may send requests to be registered for telephony services. For example, the client terminals may send a SIP REGISTER request 3050 with authentication credentials over the network to the server 3020 operating as one of the SIP Registrar servers within the context of providing telephony services. A non-limiting exemplary message format illustrating substantive aspects of providing a register request, written substantially in a form adapted to SIP is provided below:

REGISTER sips:server.softphone.com SIP/2.0
Via: SIP/2.0/TLS client.softphone.com:5061; branch=fv4i7pfw74gfz5
Max-Forwards: 70
From: Bob <sips:bob@client.softphone.com>; tag=kbew59fe3
To: Bob <sips: bob@client.softphone.com>
Call-ID:s3h8g7fynw9inm2b@softphone.com
CSeq: 1 REGISTER
Contact: <sips: bob@client.softphone.com>
Authorization: Digest username="bob", realm="secure.softphone.com",
nonce="89fcece786ab5632efd89210e7672f2a",
opaque=" ",
uri=sips:ss2.softphone.com,
response="cbe5a359aa9c8e1ae688df84f1cec434"
Content-Length: 0

In some implementations, the SIP Registrar may check the authentication credentials of the user and acknowledge registration after authenticating the user. A non-limiting exemplary message format illustrating substantive aspects of the SIP Registrar acknowledging authentication of the user, written substantially in a form adapted to SIP is provided below:

```
SIP/2.0 200 OK
  Via:    SIP/2.0/TLS    client.softphone.com:5061;
    branch=fv4i7pfw74gfz5;
  received=192.1.2.100
  From:    Bob    <sips:bob@client.softphone.com>;
    tag=kbew59fe3
  To:    Bob    <sips:    bob@client.softphone.com>;
    tag=1738203819
  Call-ID:s3h8g7fynw9inm2b@softphone.com
  CSeq: 1 REGISTER
  Contact: <sips: bob@client.softphone.com>
  Content-Length: 0
```

In some implementations, once the users at the client terminals are authorized to receive softphone application files for installation, the projection and/or authentication/data servers providing the installation files may automatically send the REGISTER request to the SIP Registrar on behalf of the client terminals. The REGISTER request messages may comprise additional information, including, but not limited to, an indication of where the requests originated from (e.g., IP address of the client terminal or projection server, etc.), an IP address of the client terminal for which registration is requested, any Uniform Resource Locators (URLs) to associate with the client terminal (e.g., for click-to-talk applications), an e-mail address to associate with the client terminal, types of services requested (e.g., ability to only place calls, only receive calls, both place and receive calls, voicemail capability, direct-to-voicemail, call forwarding etc.), and an expiration time for the telephony service. For example, such information may be transmitted as an XML data in a body of a message. A non-limiting exemplary message illustrating substantive aspects of transmitting data between a client and/or server within the SIP messaging framework, written substantially in a form adapted to SIP/XML, is provided below:

```
PUBLISH sips:bob@client.softphone.com SIP/2.0
  Via:    SIP/2.0/TCP    client.softphone.com:5061;
    branch=fv4i7pfw74gfz5
  Max-Forwards: 70
  From:    Bob    <sips:bob@client.softphone.com>;
    tag=kbew59fe3
  To: Bob <sips: bob@client.softphone.com>
  Call-ID:s3h8g7fynw9inm2b@softphone.com
  CSeq: 1 PUBLISH
  Expires: 36000
  Content-Type: application/pidf+xml
  Content-Length: 547
  Message Body
    "<?xml version='1.0' encoding='UTF-8'?>\n"
    "<plain_text_domain>\n"
      "<client>\n"
        "<name>Bob Public</name>\n"
        "<userid>bob</userid>\n"
        "<ip>192.168.34.67</ip>\n"
        "<email>bob@client.softphone.com</email>\n"
        "<url>http://client.softphone.com/users/
          bob<url>\n"
      "<\client>\n"
      "<services>\n"
        "<service_expiry>36000</service_expiry>\n"
        "<place_calls>TRUE</place_calls>\n"
        "<receive_calls>FALSE</receive_calls>\n"
        "<voicemail>TRUE_DIRECT</voicemail>\n"
        "<call_forwarding>\n"
          "<enabled>TRUE</enabled>\n"
          "<forwarding_address>547-823-
            1272<\forwarding_address>\n"
        "</call_forwarding>\n"
      "</services>\n"
```

Numerous other methods specified in the SIP protocol may utilize a message structure similar to the examples described above for transferring instructions, acknowledgments, data and/or the like between one or more computing systems operatively connected via the communications network. In some implementations, a projection server sending the REGISTER request on behalf of the client terminal may query the SIP Location database (e.g., for client terminal IP address, URLs to associate with the client terminal) and the Call Restrictor database (e.g., for types of service allowed, expiration time) to determine appropriate values for the attributes of the REGISTER request. The SIP Registrar may receive the REGISTER request, and determine if it needs to perform a user permissions check. If, for example, based on the REGISTER request contents (e.g., whether the originating IP address is a projection server or a client terminal), the SIP Registrar determines that user permissions need to be checked for a given request, the SIP Registrar may query the Call Restrictor database 3051 to verify that the user is permitted to place/receive telephone calls. A non-limiting exemplary program listing illustrating substantive aspects of querying a Call Restrictor database, written substantially in the form of SQL commands, is provided below:

```
function UserPermissions($DBserver, $password, $userid) {
  mysql_connect("201.408.185.132",$DBserver,$password); // access database server
  mysql_select_db("CallRestrictor.rdb"); // select database to search
  $query="SELECT place_calls receive_calls voicemail call_forwarding
    forwarding_address FROM RestrictionsTable WHERE userid LIKE '%' $userid; //
  create query for permissions of a user in the UserPermissions table with
  'userid' as the search term
  $result=mysql_query($query); // perform the search query
  mysql_close("CallRestrictor.rdb"); // close database access
  return $result; // return search result
)
```

If the user is not permitted to use any telephony services (3052, option Y), the SIP Registrar may deny the request and may respond 3053 with a "405 (Not Allowed)" message 3054 to the originating IP address and/or client terminal. If the user is permitted to have at least one type of telephony service (3052, Option N)), the SIP Registrar may accept the REGISTER request (and e.g., provide a "200 OK" message 3055) for the client terminal, at 3056. The SIP Registrar may save/update 3057 the SIP Location database with the registration details (e.g., hardware type (client terminal/projection server/authentication server), IP address, SIP address, URLs, services permitted, time of request, time of registration, expiration etc.) for the client terminal. A non-limiting exemplary program listing illustrating substantive aspects of updating the a database with details for the client terminal, written substantially in the form of SQL commands, is provided below:

```
function UpdateUserDetails($DBserver, $password, $userid) {
  mysql_connect("201.408.185.132",$DBserver,$password); // access database server
```

```
mysql_select_db("SIPLocation.rdb"); // select database to
    update
UPDATE ClientsTable
SET                              ip="192.168.34.67",
    email="bob@client.softphone.com",
    url="http://client.softphone.com/users/bob", service_ex-
    piry=36000,
place_calls="TRUE", receive_calls="FALSE", voice-
    mail=" "TRUE_DIRECT",
forwarding="TRUE",     forwarding_address="547-823-
    1272"
WHERE userid=$userid; // update the required values for
    the specified user
mysql_close("SIPLocation.rdb"); // close connection to
    database
return;
}
```

The SIP Registrar may also send 3055 a "200 (OK)" message to the originating IP address and/or client terminal to indicate that registration of the client terminal has been successfully performed, and may also list the terms of registration (e.g., SIP address, URLs, services permitted, time of request, time of registration, expiration etc.) in one or more header fields and/or message body in the "200 (OK)" message.

In some implementations, if the user wishes to unregister from the telephony services, the user may send a SIP UNREGISTER request 3058 to the SIP Registrar. The SIP Registrar may use the user details parsed from the SIP UNREGISTER request, and query the SIP Locations database 3059 using the user details. If a user entry corresponding to the user details is not found in the SIP Locations database 3060, the SIR Registrar may send a SIP "404 NOT FOUND" message 3061 to the user, as in 3062. If a user entry corresponding to the user details is found in the SIP Locations database 3060, the SIR Registrar may delete the entry 3063 from the SIP Locations database, and generate and send an acknowledgment SIP "200 OK" message 3064 to the user, as in 3065.

In some implementations, if a user 1 (e.g., client 3003a) wishes to initiate a communication (e.g., place a telephone call to user 2 3003b or user 3 3003c) from the client terminal 3005a, the user 1 may operate the softphone application via the hardware resources at the client terminal 1 to send a SIP INVITE message request 3070 via a nearest projection server (e.g., 3015a) acting as a SIP Proxy server within the context of telephony services. The INVITE request may include the user 1 ID and/or display name, the SIP and/or IP address of the client terminal 3005a, a name of the user being invited to a telephone call (e.g., user 2 or user 3), the user 2/3's ID, a URL associated with the user 2/3, a standard telephone number of the user 2/3 being invited to a telephone call, and/or a format for transfer of audio data packets once the invitation has been accepted and a telephone session has been established (e.g., RTP protocol). A non-limited exemplary INVITE message illustrating exemplary aspects of providing an invitation to initiate communications, written substantially in a form adapted to SIP, is provided below:

```
INVITE sips:bob@client.softphone.com SIP/2.0
Via:    SIP/2.0/TCP    client.softphone.com:5061;
    branch=fv4i7pfw74gfz5
Max-Forwards: 70
From:    Bob    <sips:bob@client.softphone.com>;
    tag=kbew59fe3
To: Alice <sips:alice@client.softphone.com>
Call-ID:s3h8g7fynw9inm2b@softphone.com
CSeq: 1 INVITE
Contact:           <sips:alice@client.softphone.com;
    transport=tcp>
Content-Type: application/sdp
Content-Length: 151
Message Body
v=0
o=alice 2856844739 2856844739 IN IP4 client.soft-
    phone.com
s=-
C=IN IP4 192.1.2.201
t=0 0
m=audio 49172 RTP/AVP 0
a=rtpmap:0 PCMU/8000
```

The SIP Proxy server (e.g., 3015a) may, on receiving the INVITE request, forward the request on to other SIP Proxy servers (e.g., servers within network 3010), which may in turn continue the forwarding process until the INVITE request is received at the SIP Registrar. The SIP Registrar, upon receiving the INVITE request, may parse the INVITE request to determine the particulars of the request being made. For example, the SIP Registrar may utilize XML parser methods built in to the PHP scripting language and/or most modern web browsers. The SIP Registrar may also query the Call Restrictor database 3071 to determine whether any restrictions are applicable to the INVITE request made by the user 1 at client terminal 1. The restrictions may relate to the permitted services for either user 1 and/or user 2/3. Upon receiving the results of the query to the Call Restrictor database, the SIP Registrar may compare the attributes 3072 of the INVITE request to the results of the query to the Call Restrictor database. For example, in some implementations, the SIP Registrar may execute a server-side hypertext preprocessor (PHP) script interfacing with a database using SQL commands to compare the attributes of the INVITE request to the results of the query to the Call Restrictor database. A non-limiting exemplary program listing illustrating substantive aspects of implementing such functionality, written substantially in the form of PHP/SQL commands, is provided below:

```
// User1 INVITES user2 to a telecommunication; Parse
    XML file including INVITE
request message body
$file="invite_message_body.xml";
$xml_parser=xml_parser_create( );
xml_set_element_handler($xml_parser,"startTag","end-
    Tag");
xml_set_character_data_handler($xml_parser,"con-
    tents");
$fp=fopen($file,"r");
$data=fread($fp, 80000);
xml_parser_free($xml_parser);
fclose($fp);
// Assign parsed values to variables
$user1=data(1);
$user2=data(2);
receive_calls=data(2);
voicemail=data(3);
call_forwarding=data(4);
forwarding_address=data(5);
// Determine if INVITE is permissible (e.g., whether call
    may be placed) by querying the Call Restrictor database
mysql_connect("201.408.185.132",$DBserver,$pass-
    word); // access database server
mysql_select_db("CallRestrictor.rdb"); // select database
    to search
// Check if user1 is allowed to request such a call
$query="SELECT place_calls FROM RestrictionsTable
    WHERE user1_id LIKE '%'
```

```
$user1 AND user2_id LIKE '%' $user2; // create query for
    whether user1 can call user2
$result1=mysql_query($query); // perform the search
    query
mysql_close("CallRestrictor.rdb"); // close database
    access
// Check if user2 is allowed to receive such a call
$query="SELECT receive_calls FROM RestrictionsTable
    WHERE user1_id LIKE '%'
$user2 AND user2_id LIKE '%' $user1; // create query for
    whether user2 can receive a call from user2
$result2=mysql_query($query); // perform the search
    query
mysql_close("CallRestrictor.rdb"); // close database
    access
$permit=$result1 * $result2; // determine if both permis-
    sions are TRUE
return $permit; // return permission value
```

If the SIP Registrar determines 3073 that either of user 1 and/or user 2/3 is not authorized for the services requested in the INVITE request, the SIP Registrar may return 3074 to the client terminal a "405 Method Not Allowed" message 3075, and, in some implementations, along with a list of allowed actions for user 1 and/or user 2/3 included in an <allowed_actions> tag in the message body. The SIP Registrar may also save the details of the received INVITE request to a Call Log database. The "405 Method Not Allowed" message may be routed back to user 1's client terminal via the SIP proxy servers in the network.

If, however, the SIP Registrar determines that the INVITE request is within the bounds of permitted services for the client terminal, the SIP Registrar may continue processing by querying the SIP Locator database 3076 to determine the SIP address to route the INVITE request to. Upon receiving the INVITE request, the SIP Registrar may query the SIP Locator database for an IP or SIP address of the user 2/3 based on the information provided in the INVITE request. The SIP Registrar may, barring call restrictions, forward 3077 the INVITE request to the appropriate destination (e.g., IP and/or SIP address) according to the results of the query to the SIP Locator database. If the destination lies within the TCP/IP network (e.g., such as when calling user 2), the INVITE request may be routed via the projection servers, authentication/data servers, routers, and/or other hardware elements (acting as SIP Proxy servers) operatively connected to the TCP/IP network until the INVITE request is received at a user 2 client terminal (e.g., 2 3003*b*). The user 2 client terminal may, in response to the received INVITE request 3078, send back to client terminal a SIP "180 (Ringing)" message 3079, and initiate an action to attract the other user 3003*b*'s attention via the hardware resources available at the other user's client terminal (e.g., on-screen incoming call display via a monitor installed at the other user's client terminal, and/or ringing tone via music speakers and/or headphones installed at the other user's client terminal). However, if the destination lies outside the TCP/IP network (e.g., such as user 3 using a standard telephone 3005*c* operatively connected to an external public switched telephone network (PSTN) 3013), the INVITE request may be routed to a computer and/or other device in the network acting as a Gateway server 3035 (e.g., Cisco high-speed serial interface (HSSI)). In such an example, the Gateway server may present a packet-switched interface towards the TCP/IP network 3010 and a circuit switched interface to the PSTN network 3013. The INVITE request may be converted into the appropriate dial tones according to the operating protocols of the external network 3013, and an appropriate ring tone may be initiated at the standard telephone 3005*c* of the other user.

For example, if invited user 2 accepts the INVITE request, the terminal client 3003*b* may send back a SIP "180 (RINGING)" message via the packet-switched network 3010 to user 1 indicate to acceptance of the invitation request. If, for example, invited user 3 picks up the standard telephone 3003*c*, a circuit path may be established via PSTN network 3013 between the telephone 3005*c* and the circuit switched interface of the gateway server 3035. The Gateway server then may generate a SIP "180 (RINGING)" message on behalf of the telephone 3003*c*, and transmit this message via the Gateway server's packet-switched interface and the packet-switched network 3010 back to client terminal 3003*a*. Accordingly, a telephone media transfer session may be established between the two parties of the telephone call across multiple networks of various types, regardless of the locations of the two parties.

Upon receiving the SIP "180 (RINGING)" message, the servers in the system may forward 3080 the message until it is received at the client originating the INVITE request, establishing the communications media transfer session. Once the media transfer session has been established between the participants in the session (e.g., telephone call between user 1 and user 2 3003*b*), the participants may generate media (e.g., audio only, video only, audio-video, dynamic content and/or the like) packets 3081 using the hardware resources operatively connected to the respective thin client terminals and the installed softphone applications. The media packets may be exchanged between the participants. In some implementations, the media packets may be transferred from one client terminal to the other in an asynchronous fashion (e.g., using UDP, RTP communication protocols). For example, each media packet may traverse a different route from source to destination client terminal within the packet switched network, and the media packets may be received at the receiver of the media packets in an order which may not match the order in which the media packets were generated and/or transmitted. Further, the media packets may traverse a route different from the SIP signaling messages controlling the telephone session. The media packets may be formatted in accordance with a protocol agreed upon based on the protocol specified in the initial INVITE request. For example, the exemplary INVITE message provided above illustrating exemplary aspects of providing an invitation to initiate communications specifies that audio packets may be transmitted in accordance with the RTP protocol. In some implementations, the media packets may be formatted in accordance with the Real-time Transport Protocol (RTP). Each RTP media packet may include one or more header fields and a payload. The media packet header fields may include information including a payload type (e.g., audio only, video only, audio-video, dynamic payload etc.), a sequence number providing guidance to a receiver of the media packets as to an order in which the media packets may be arranged (e.g., 3083*a-b*) in order to recreate the original transmitted signal (e.g., 3084*a-b*) and/or identify missing media packets at the receiver, a timestamp indicating a time at which the media packet was generated, which may, in conjunction with the timestamps of other media packets and the sequence, indicate to the receiver of the media packets a sampling rate of the media stream, and jitter and/or delay in transmission, a source identifier identifying an IP and/or SIP address of the source of the media packet, and a destination identifier identifying an IP and/or SIP address of the intended final destination of the media packet.

In some implementations, a participant (e.g., user 1 3003*a*) in a telephony session with user 2/3 may wish to terminate the session. The user 1's client terminal 3005*a* may send a SIP "BYE" request 3085 to the client terminal 3005*b* and/or the Gateway server 3035. If the client terminal 3005*b* encounters 3086 the "BYE" message, the client terminal 3005*b* considers the session with client terminal 3003*a* terminated, and may generate and send 3087 a SIP "200 (OK)", "481 Call/Transaction Does Not Exist," a "408 (Request Timeout)" message, or provide no response. If the client terminal 3003*a* initiates a "BYE" message directed at the telephone 3005*c*, the "BYE" message may be sent to the Gateway server 3035. The Gateway server may convert the message into an appropriate set of tones for the circuit switched network, and may transmit the tones via the PSTN network to the telephone 3005*c* indicating that user 3003*c* has terminated the communication session. Upon receiving acknowledgment from the other client that the session has terminated, the clients may delete any data structures stored in memory related to the session and relieve any other hardware and/or software resources previously being utilized in the communication session for use in other applications.

In an exemplary embodiment, user 1 may be transmitting media packets for delivery to user 2. The media packets may be routed via multiple paths (e.g., 3082*a*-d) within the packet switched network 3010. In some implementations, each node (e.g., a projection server, data server, router system client terminal, etc.) in a route traversed by a media packet may process the media packet for routing and/or call restriction and/or other purposes. For example, a media packet may be routed via projection server 3015*a*. Projection server 3015*a* may receive the media packet, and extract information from the header of the media packet. In some implementations, the projection server may extract information regarding destination identifier identifying an IP and/or SIP address of the intended final destination of the media packet. Based on the destination identifier information, the projection server may determine the most appropriate next node to transmit the media packet to (e.g., based on a Domain Name System service), and initiate transfer of the media packet. In some implementations, each node in a route may perform similar operations to determine the best next node to transmit the media packet to.

In some implementations, each node in a transmission route, including the client terminals, may extract 3091 from a media packet generated by/transmitted to it 3090, header information, including but not limited to, a source identifier identifying an IP and/or SIP address of the source of the media packet, and a destination identifier identifying an IP and/or SIP address of the intended final destination of the media packet. For example, a node may utilize the freeware open-source FFmpeg cross-platform solution, to parse RTP packets and extract, for example, file header information and media data included in the RTP packets being transmitted as part of a telecommunications session.

Upon obtaining the source and destination addresses for the media packet, the node may query the Call Restrictor database 3092 using the information extracted from the packet. The node may analyze 3093 the results of the query to the Call Restrictor database to determine if any call restriction rules are present which may restrict transmission of the media packet from the source identified by the source identifier to the destination identified by the destination identifier. If the node determines that one or more rules may require prevention of transmission of packets from the source to the destination (e.g., 3093, option Y), the node may discard 3094 the media packet from memory, generate 3095 and send 3096 a SIP "403 Forbidden" message to the previous node in the route and/or the originating IP/SIP address of the media packet to indicate that the transmission may not take place according to one or more rules present in the Call Restrictor database. If the node determines that no restrictions are in effect preventing transmission of packets from the source to the destination (e.g., 3093, option N), the node may add information to the header of the media packet 3097 to indicate the route taken by the packet, decrement the maximum number of allowable hops required to reach the intended destination, include a timestamp for retransmission, include the results of the analysis the node performed on the packet in taking the decision to transmit the packet forward towards its destination, and/or the like. The node may use the source and destination addresses, Domain Name System addressing, and transmission models such as unicasting, broadcasting and/or multicasting to determine the next node(s) to transmit the updated media packet to 3098. Upon determining the nodes to transmit the media packet to, the node may generate the necessary transmissions 3099.

In some implementations, each node of a packet switched network may perform such processing to quickly extinguish any media packets in circulation occupying transmission bandwidth within the network 3010 which may not be authorized for transmission to their respective final destinations.

In some implementations, the Call Restrictor database may be updated such that one or more ongoing transmissions and/or sessions may become unauthorized, while still in progress, on the basis of the update to the rules in the Call Restrictor database. In such implementations, each node processing media packets for compliance with call restriction rules may receive results to querying the Call Restrictor database that reflect the latest updates to the rules present in the Call Restrictor database in real-time. Accordingly, in some implementations, updates to call restriction rules present in the Call Restrictor database may be implemented dynamically within the entire packet switched network 3010 in real-time, and may be advantageously applied not only to new communications invitations, but also to existing on-going conversations and/or other media/data exchanges. In some implementations, auto-dialer programs may be executing on client terminals. The auto-dialer programs may obtain lists of phone numbers, IP addresses, etc. from servers, and may dial the appropriate phone numbers, IP addresses, etc. in the list assigned to the auto-dialer programs. In some implementations, the servers may utilize the rules present in the Call Restrictor database to generate the lists of numbers for the auto-dialers to utilize in their auto-dialing procedures. In some implementations, an auto-dialer may obtain a phone number, IP address, etc. to dial. The auto-dialer program and/or client terminal may provide the phone number, IP address, etc. to a server for checking against the Call Restriction rules. Upon obtaining a confirmation from the server that the phone number may be dialed by the auto-dialer, the auto-dialer may proceed to auto-dial the number for the user of the client terminal.

In some implementations, call restriction processing may advantageously be concentrated at specific nodes where collection and reordering of all media packets related to a telephone session are implemented. For example, in some implementations, media packets transmitted by client terminal 3005*a* intended for delivery to client terminal 3005*b* may first be aggregated at a projection server nearest the destination terminal client 3005*b* (e.g., projection server 3015*b*) and/or the source/destination client terminals themselves. The processing node may aggregate the media packets related to such transmission and process the media packets to reorder them according to the sequence numbers provided in the header fields of each of the media packets prior to transmission to the client terminal 3005*b*. For example, in some implementations, a node may utilize the freeware open-source FFmpeg cross-platform multimedia handling solution to reorder packets according to a decoding time stamp (DTS) and/or a presentation time stamp (PTS) associated with each of the packets. For example, the node may aggregate a number of media packets being transmitted in one direction as part of a telecommunications session. The node may assign a temporary identifier for each packet. The node may then extract the DTS and PTS associated with each of the packets, e.g., using the FFmpeg application. The node may associate each extracted DTS and/or PTS with the temporary identifier for the packets. The node may arrange the temporary identifiers of the packets, e.g. according to an increasing order of PTS, in order to arrange the media packets according to the order of presentation required by the generator of the media packets. The processing node may extract information from the media packets as a batch identifying, for example, an IP and/or SIP address of the source of the media packet, and the destination identifier identifying an IP and/or SIP address of the intended final destination of the media packet. The processing node may query the Call Restrictor database using the information extracted from the aggregated media packets. The node may analyze the results of the query to the Call Restrictor database to determine if any call restriction rules are present which may restrict transmission of the media packets from the source identified by the source identifier to the destination identified by the destination identifier. If the projection server determines that one or more rules may require prevention of transmission of packets from the source to the destination, the node may discard the entire set of aggregated media packets and send a SIP "403 Forbidden" message lieu of all the aggregated packets to the previous node in the route and/or the originating IP/SIP address of the media packets to indicate that the transmission may not take place according to one or more rules present in the Call Restrictor database. Accordingly, in some implementations, call restrictions rules present in the Call Restriction database may be implemented throughout the entire packet switched network with a minimal number of high-performance server systems, and a minimal number of servers requiring access to the Call Restrictor database. Also, in some implementations utilizing concentrated processing of call restriction rules, updates to call restriction rules present in the Call Restrictor database may be implemented within the entire packet switched network 3010 within a time period approaching an average packet transmission time between the most distant terminal clients within the packet switched network, and may be advantageously applied not only to new telephone conversation invitations, but also to existing on-going conversations and/or other media/data exchanges.

The attributes of the Call Restrictor database and a user interface system for entry of call restriction rules into the Call Restrictor database in one embodiment of ADE-WAM operation are described hereinafter in greater detail with reference to FIGS. 31A-D. In some implementations, the Call Restrictor database stored a number of rules according to which restriction of calls is implemented. The rules may embed within themselves legal, regulatory, corporate etc. rule compliance, and provide technological solutions to management compliance problems. The rules may regulate various softphone functionalities, including telemarketing, collections, reminders, robocalling etc. The rules in the Call Restrictor database may be structured to affect a limited subset of softphone terminals, applications and/or users, or may be structured to affect a broad spectrum of entities, via a single effective syntax and operating structure. For example, with reference to FIG. 31A, the rule prescribed in 3101 may apply to any client operating within the United States of America, who has a Business Type beginning with the letter 'F'. In another example, using a rule structure that is substantially similar to the previous example, the rule prescribed in 3102 may narrowly only affect a specific subset of entities within a client (e.g., "DTV"), wherein those entities operate in only one country (e.g., "US"), wherein the entities have a "FE" Business Type and a "FC" vertical business integration parameter, and a description "XX." Accordingly, the descriptive business grammar of the present invention may provide a flexible and powerful rules defining and implementation platform for call restriction.

With further reference to FIG. 31B, an exemplary rule 3103 may include a number of fields. In some implementations, the fields may be varied mutually exclusive to each other; in alternate implementations, these selections of values for one field may affect the values that may be chosen for other fields in the rule. In some implementations, the fields may provide a method to specify a rule level (e.g., a priority level, a classification type, etc.) of the rule, a plurality of conditions that are required to be satisfied in order for the rule to be in effect, and a plurality of results that may be the outcome of implementation of the specified rule. For example, the exemplary rule 3103 may be interpreted, in some implementations, as: "For the regulatory rule 3103, if any account holder residing in the state of MA has been called greater than two times in a period spanning the last 7 days on his/her home phone, regardless of the call result, and/or when the last letter was sent to him/her, and/or the result of sending any letter, calls may not be made to that account." A non-limiting exemplary data structure illustrating substantive aspects of specifying rules as described above, written substantially in the form of XML, is provided below:

```
<?xml version="1.0" encoding="UTF-8"?>
<rule_type>regulation</rule_type>
<conditions>
   <state>MA</state>
   <phone_type>home</phone_type>
   <period_unit>day</period_unit>
   <period_amount>7</period_amount>
   <operator>GREATER</operator>
   <number>2</number>
   <call_result>NIL</call_result>
   <last_letter_sent>FALSE</last_letter_sent>
   <last_letter_days>NIL</last_letter_days>
</conditions>

<type>account</type>
   <restriction>No Call</restriction>

```

In some implementations, a server side PHP script may be implemented on a ADE-WAM server to read in an XML data file including such a rule, parse the XML data file to determine the rule fields and associated values, and generate SQL commands to insert the rule from the XML data file into a rules database such as, for example, a Call Restrictor database. The rule 3103 may be designated, in the exemplary implementation, as a regulatory rule. In some implementations, a plurality of business rules of varying scope and effect may pertain to a specific account. The rules, in such implementations, may be prioritized according to, for example, the rule level. In some exemplary implementations, the regulatory rules may take precedence over rules created to reflect client instructions, which in turn may take precedence over rules created in order to reflect best internal business practices. In alternate implementations, the rule level may determine which rules are implemented and/or the order in which such rules are implemented.

Rules may be implemented that depend on other numerous factors than the originator of the rule, and properties of the account affected by the rule. For example, rules may be implemented that are time sensitive. For example, FIG. 31C specifies five exemplary illustrative rules that are applicable to all clients, countries, vertical/non-vertical businesses, types and descriptions (e.g., per 3107) based on the time at which the rules are evaluated for enforcement. For example, rule 3108 may be interpreted in some implementations as: "A regulatory rule that states that accounts in the state of PA may not be messaged prior to 1:30 pm on Sundays." For further detail regarding rule construction/execution based on the business grammar, see at least FIGS. 5A-7B. As another example, rule 3109 may be interpreted in some implementations as: "A regulatory rule that states that accounts in the state of TX may not be messaged prior to 9:00 am on Saturdays." As another example, rule 3110 may be interpreted in some implementations as: "A client instruction to restrict messaging of accounts in the state of TX prior to 12:00 pm on all Sundays." As another example, rule 3111 may be interpreted in some implementations as: "A regulatory rule that states that accounts in any message may not be called at any time on Sundays." As another example, rule 3112 may be interpreted in some implementations as: "A regulatory rule that states that accounts in the state of OK may not be messaged prior to 9:00 am on any day."

Rules may be advantageously developed that depend further on frequency/intensity of prior activities. For example, FIG. 31D may illustrate exemplary rules 3114-3127 as being applicable to all accounts (e.g., per 3113). As one example, rule 3114 may be interpreted in one implementation as: "A regulatory rule that states that no action need be taken for accounts in the state of NH where a work phone has been called more than once within the last 30 days, regardless of the call result, date the last letter was sent, or the result of sending the letter." As another example, rule 3115 may be interpreted in one implementation as: "A regulatory rule that states that no calls may be placed to accounts in the area of NYC where any phone has been called more than 2 times within the last 7 days, regardless of the call result(s), date the last letter was sent, or the result of sending the letter." As another example, rule 3116 may be interpreted in one implementation as: "A regulatory rule that states that no calls may be placed to accounts in the area of OR where a work phone has been called more than 1 time within the last 7 days, regardless of the call result(s), date the last letter was sent, or the result of sending the letter." Further, rule 3117, for example, may be interpreted in some implementations as: "A regulatory rule that prohibits calling accounts in WA state if the work phone has been called more than once over the past seven days." As another example, rule 3118 may be interpreted in one implementation as: "A regulatory rule states that no calls may be placed to accounts in the area of ME where any phone has been called more than 1 time within the last 1 day, regardless of the call result(s), date the last letter was sent, or the result of sending the letter." As another example, rule 3119 may be interpreted in one implementation as: "A regulatory rule that states that no calls may be placed to accounts in the area of WA where any phone has been called more than 3 times within the last 7 days, regardless of the call result(s), date the last letter was sent, or the result of sending the letter." As another example, rule 3120 may be interpreted in one implementation as: "An internal rule that states that no calls may be placed to accounts in any area where a cell phone has been called any number of times within any prior period, regardless of the call result(s), date the last letter was sent, or the result of sending the letter." As another example, rule 3121 may be interpreted in one implementation as: "An internal rule that states that no calls may be placed to accounts in any area where any phone has been called more than or equal to 3 times within the last 7 days, regardless of the call result(s), date the last letter was sent, or the result of sending the letter." As another example, rule 3122 may be interpreted in one implementation as: "A regulatory rule that states that no work may be performed for accounts in the area of AZ where a home phone has been called less than or equal to 3 times during any prior period, regardless of the call result(s), date the last letter was sent, or the result of sending the letter." As another example, rule 3123 may be interpreted in one implementation as: "A regulatory rule that states that no work may be performed for accounts in the area of AZ where a home phone has been called greater than 3 times during any prior period, resulting in an RPC call result(s), regardless of the date the last letter was sent, or the result of sending the letter." As another example, rule 3124 may be interpreted in one implementation as: "A regulatory rule that states that no work may be performed for accounts in the area of AZ where a home phone has been called greater than 3 times during any prior period, resulting in an Message call result(s), regardless of the date the last letter was sent, or the result of sending the letter." As another example, rule 3125 may be interpreted in one implementation as: "A regulatory rule that states that no work may be performed for accounts in the area of AZ where a home phone has been called greater than 3 times during any prior period, resulting in an Third Party call result(s), regardless of the date the last letter was sent, or the result of sending the letter." As another example, rule 3126 may be interpreted in one implementation as: "A regulatory rule that states that no work may be performed for accounts in the area of NH where a home phone has been called any number of times during any prior period, resulting in an RPC call result(s), regardless of the date the last letter was sent, or the result of sending the letter." As another example, rule 3127 may be interpreted in one implementation as: "A regulatory rule that states that no work may be performed for accounts in the area of NH where a home phone has been called any number of times during any prior period, resulting in a Message call result(s), regardless of the date the last letter was sent, or the result of sending the letter."

Figure 31C:
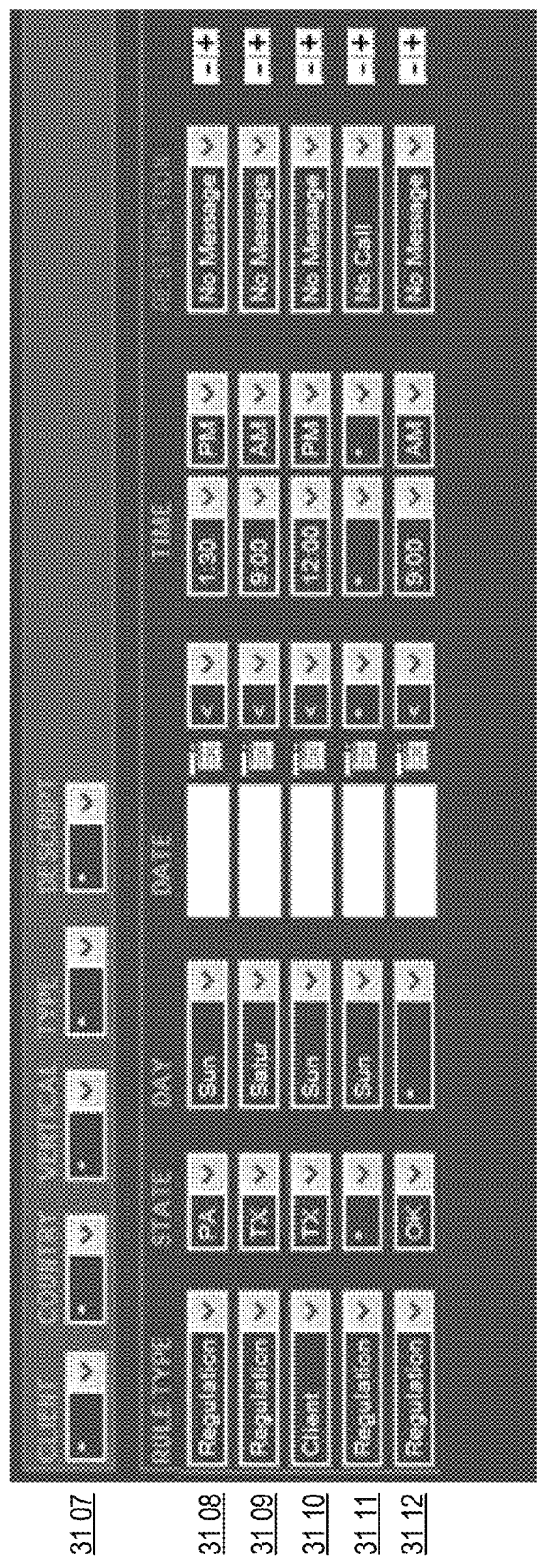
Figure 31D:
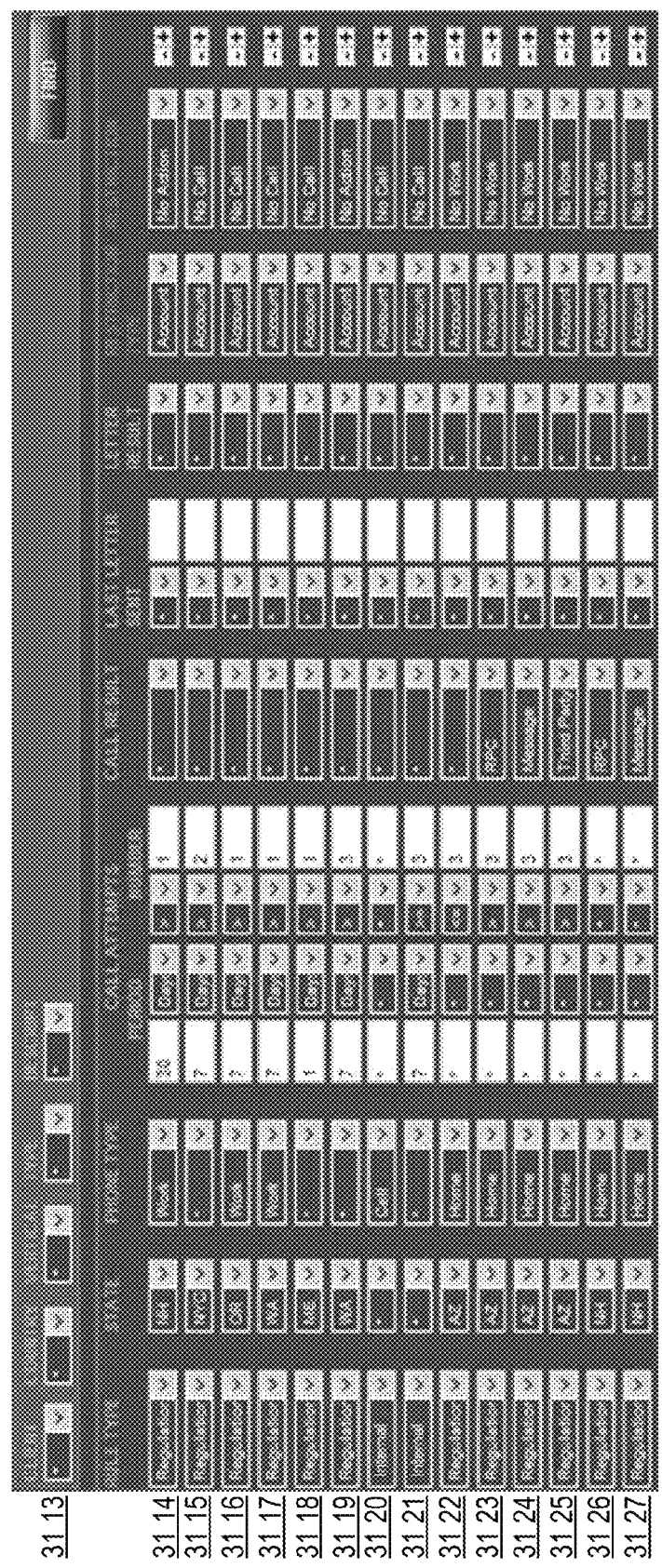
Figure 31E:
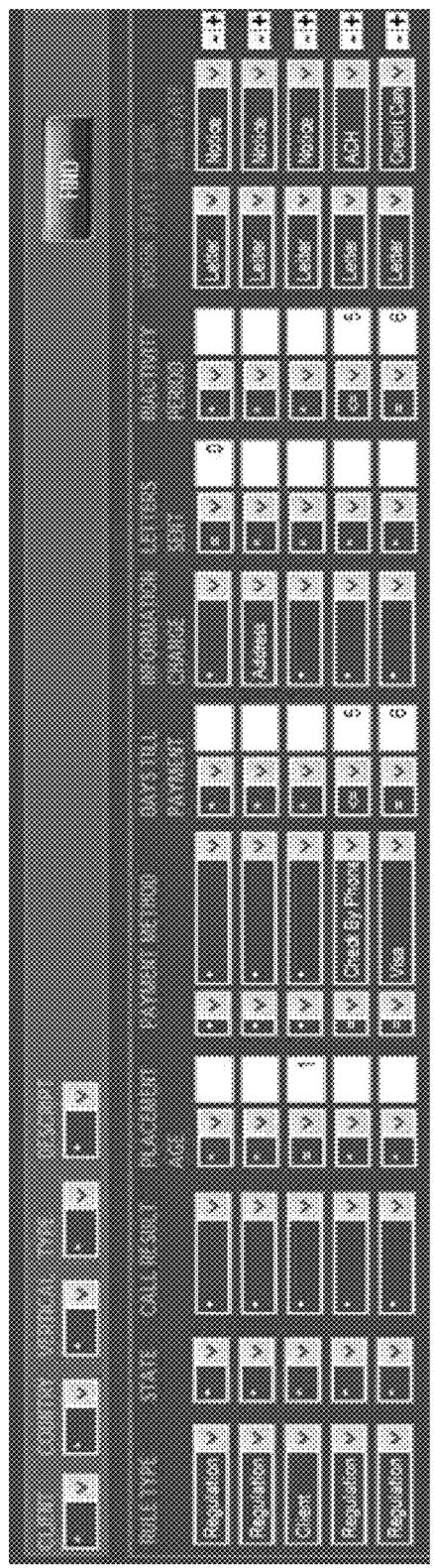

Further rules may be advantageously developed that result in the performance of additional activities. For example, FIG. 31E may illustrate exemplary rules 3129-3133 as being applicable to all accounts (e.g., per 3128) and resulting in electronic/postal letters being sent. As one example, rule 3129 may be interpreted in one implementation as: "A regulatory rule that states that a notice letter be sent for accounts in any area where no letters have been sent." Another example, rule 3130 may be interpreted in one implementation as: "A regulatory rule that states that a notice letter be sent for accounts in any area where address information has been changed." Another example, rule 3131 may be interpreted in one implementation as: "A client rule that states that a notice letter be sent for accounts in any area where the placement age equals 1." Another example, rule 3132 may be interpreted in one implementation as: "A regulatory rule that states that a ACH letter be sent for accounts in any area where payment by check by phone is required in less than or equal to 5 days and the inactivity period is less than or equal to 5 days." Another example, rule 3133 may be interpreted in one implementation as: "A regulatory rule that states that a Credit Card letter be sent for accounts in any area where payment by visa is required in 6 days and the inactivity period is 6 days."

Numerous other variations of rules depending from a variety of legal, regulatory, client-driven, internal best practices, business, time, and/or other factors, modifying the permissions for transmission of media packets between the various entities involved in the ADE-WAM are contemplated.

In some implementations, media packets may be exchanged bi-directionally between two client terminals via nodes in the communications network simultaneously in real-time. In such implementations, the direction of transmission of media packets may be determined by extracting from the media packet header fields information regarding the source identified by the source identifier and the destination identified by the destination identifier. Accordingly, in some implementations, media packets traveling in each direction may be analyzed independently of the media packets traveling in the opposite direction. In some implementations, media packets traveling in one direction may be aggregated at a concentrating node server and/or client terminal, and reordered according to the sequence numbers provided in the header fields of each of the media packets. Call analytics may be performed on the media contents of the aggregated and reordered media packets. Accordingly, in some implementations, call analytics on media transmitted from one client terminal to another may be advantageously performed independent of any transmission in the opposite direction, and/or any other transmission between any other nodes and/or terminals occurring simultaneously within a packet switched network.

Figure 32:
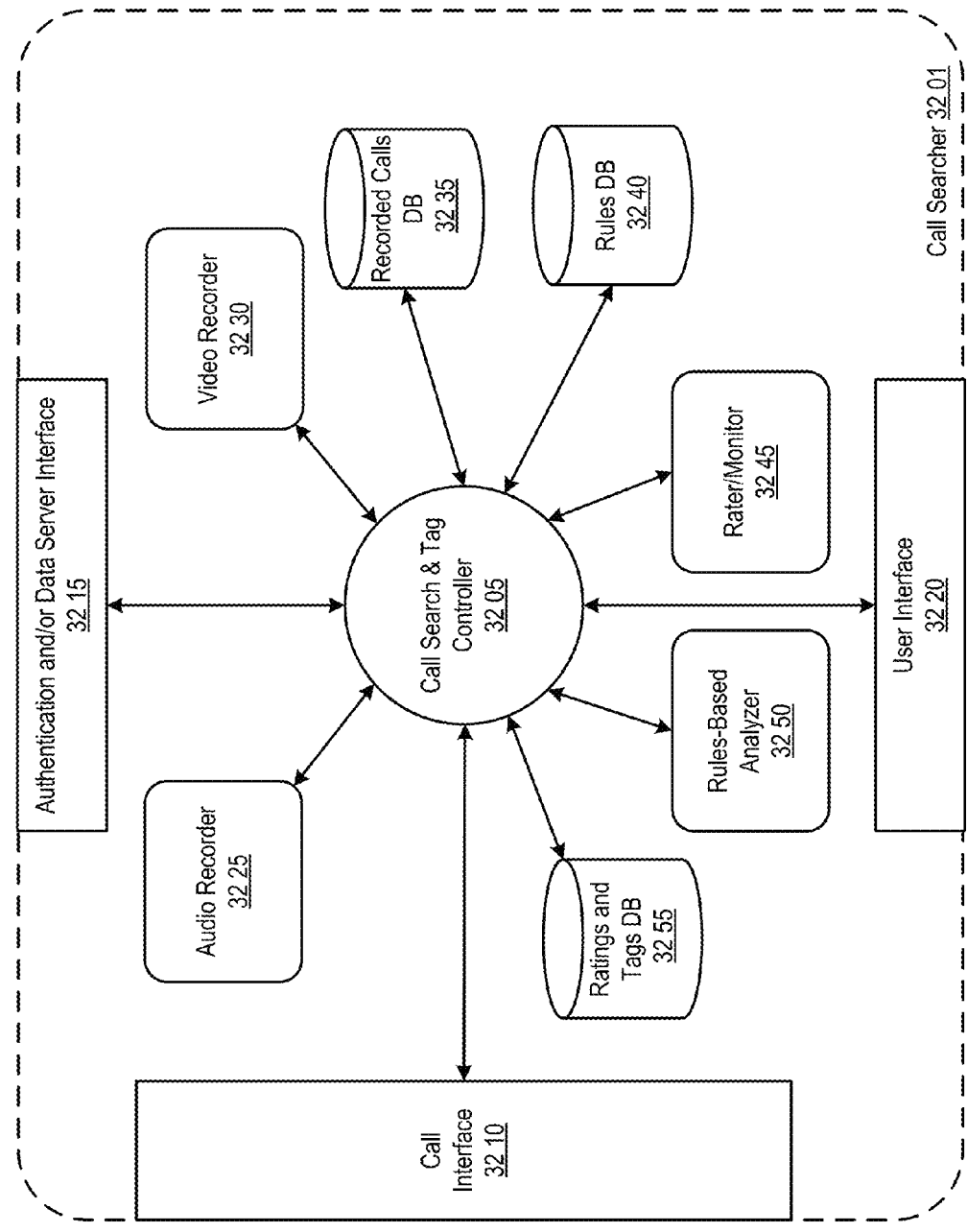
FIG. 32 illustrates aspects of providing call analysis functionality in an exemplary embodiment of ADE-WAM operation.

FIG. 32 illustrates aspects of providing call analysis abilities in an exemplary embodiment of ADE-WAM operation. In some implementations, the media packets as part of a telecommunications session may comprise media including speech. In some implementations, continuous speech contents of the aggregated and reordered media packets may be extracted. In some implementations, an audio coder-decoder, or codec (e.g., G.722 speech codec, CS-ACELP algorithm) may be implemented on a server at which media packets traveling in one direction may be aggregated and reordered. Accordingly, in some implementations, a raw uncompressed transcript of continuous speech transmitted by the media packets in one or more directions may be extracted at the server where aggregation and reordering of media packets may be performed in a manner independent of media transmission in any other direction. In some implementations, analysis of continuous media including speech traveling in a direction may both be processed in order to dynamically generate call restriction rules with which to update the Call Restriction database, or other rules with which to update the Rules database(s) of the ADE-WAM. The ADE-WAM may then be triggered to perform numerous other activities based on the rules bases on processing of the media from the call.

For example, in some implementations, a call searcher 3201 may include a call search and tag controller 3205 that may coordinate the activities of the various components of the ADE-WAM and/or affiliated entities to provide call analytics abilities. A call search and tag controller may use a call interface 3210 to interface with the entities (e.g., packet-switched computer nodes, PSTN telephone networks etc.) providing telecommunications abilities. The call search and tag controller may utilize authentication, projection and/or data servers as part of or affiliated with the ADE-WAM to provide the call analytics functionality. The call search and tag controller may connect with these servers using an authentication and/or data server interface 3215. A user interface 3220 may allow a user, supervisor or other authorized personnel to interact with the call search and tag controller, and provide inputs that affect the call analytics functionality. An audio recorder 3225 may aggregate packets corresponding to a telecommunications session and generate one or more audio files representative of the communications involved in the telecommunications session. A video recorder 3230 may aggregate packets corresponding to a telecommunications session and generate one or more video files representative of the communications involved in the telecommunications session. The generated audio and/or video files may be stored in a Recorded Calls database 3235. A Rules database 3240 may store a plurality of rules and/or parameter definitions according to which the stored audio and/or video files may be analyzed to generate call ratings and tags. A rater/monitor 3245 may obtain audio and/or video files and may analyze them according to the rules and/or parameter definitions in the rules database to generate call ratings that may represent various quality-of-service parameters of the telecommunications session represented by the audio and/or video files. The call ratings may be stored in a Ratings and Tags database 3255 for use by the call searcher. A rules-based analyzer 3250 may obtain the call ratings stored in the ratings and tags database and the rules according which to analyze the ratings from the rules database. The rules-based analyzer may assign one or more tags with a telecommunications session based on analyzing the call ratings in view of the rules from the rules database. The tags may be stored in the rules and tags database for retrieval and/or review at a later time. In some implementations, the tags may be indicative of one or more violations. The call search and tag controller may inform one or more user(s)/supervisor(s) of such violations via the user interface 3220, and/or perform one or more actions on a call in progress dynamically via the call interface 3210, and/or modify one or more rules in the rules database 3240. Other aspects of the ADE-WAM may be triggered to act on such rules to perform actions in response to violations recognized by the call searcher 3201.

Figure 33A:
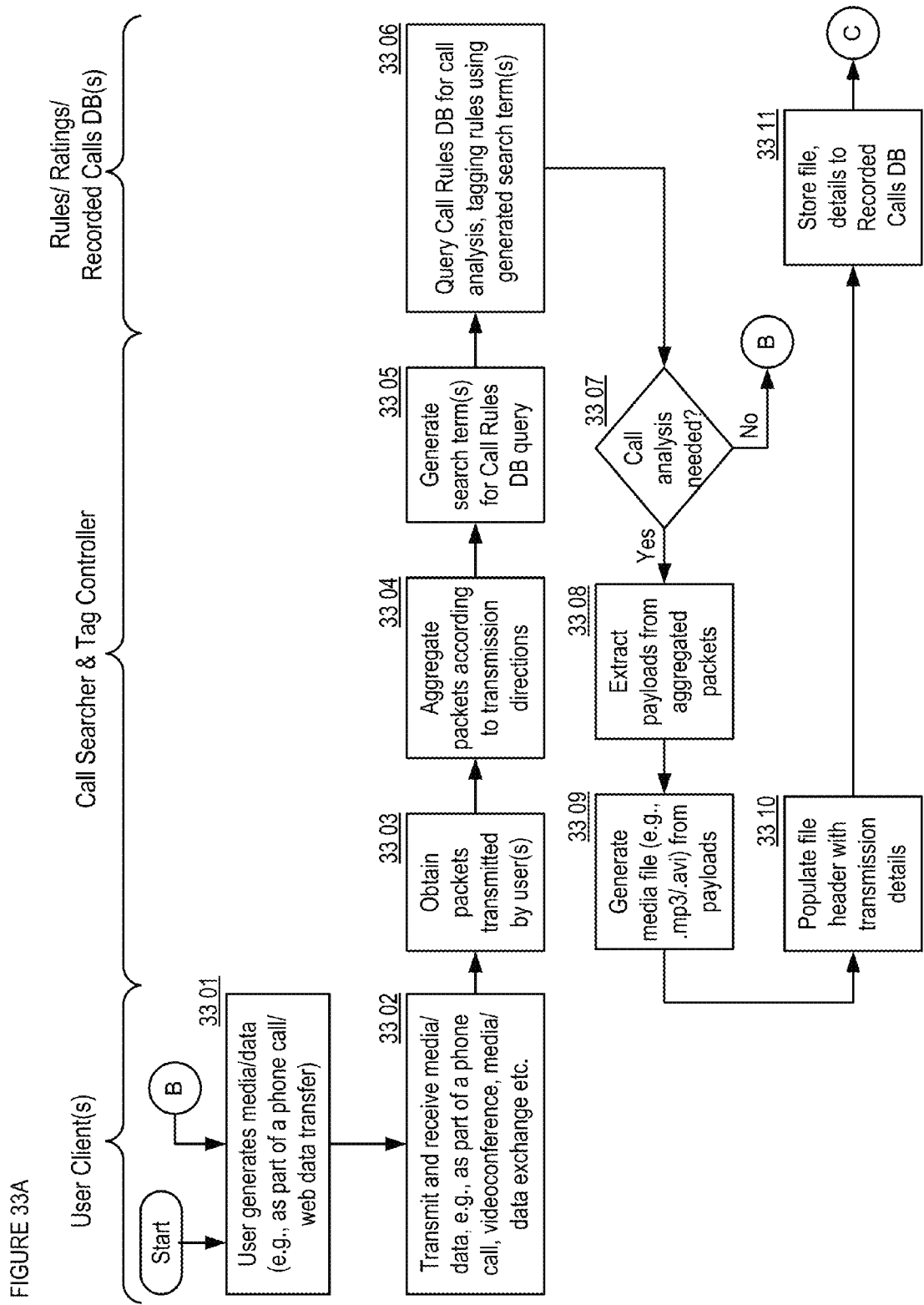
FIGS. 33A-B illustrate an implementation of data and logic flow among and between ADE-WAM components and/or affiliated entities for analyzing and tagging telecommunication sessions in an exemplary embodiment of ADE-WAM operation.
Figure 33B:
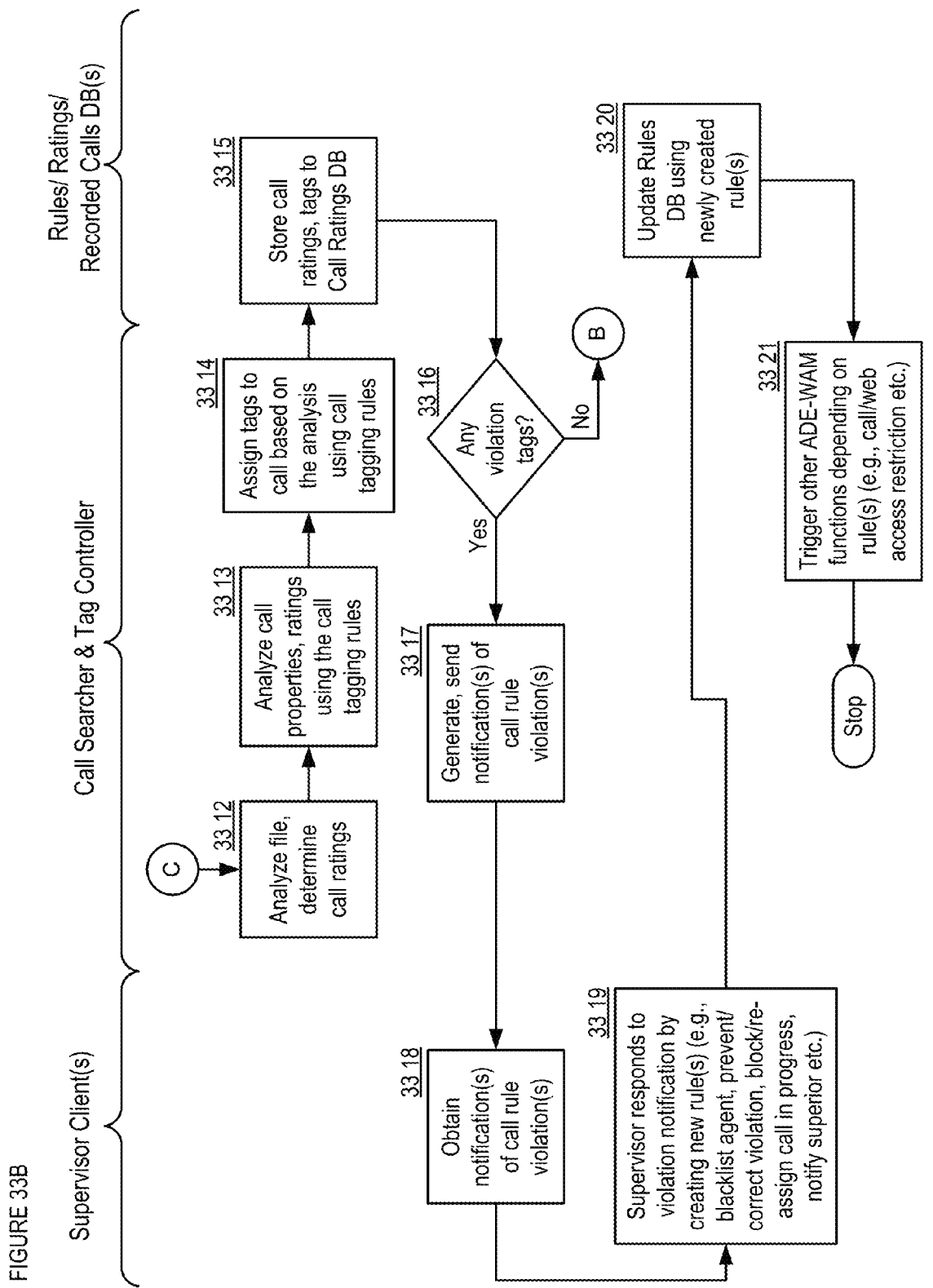
Figure 34A:
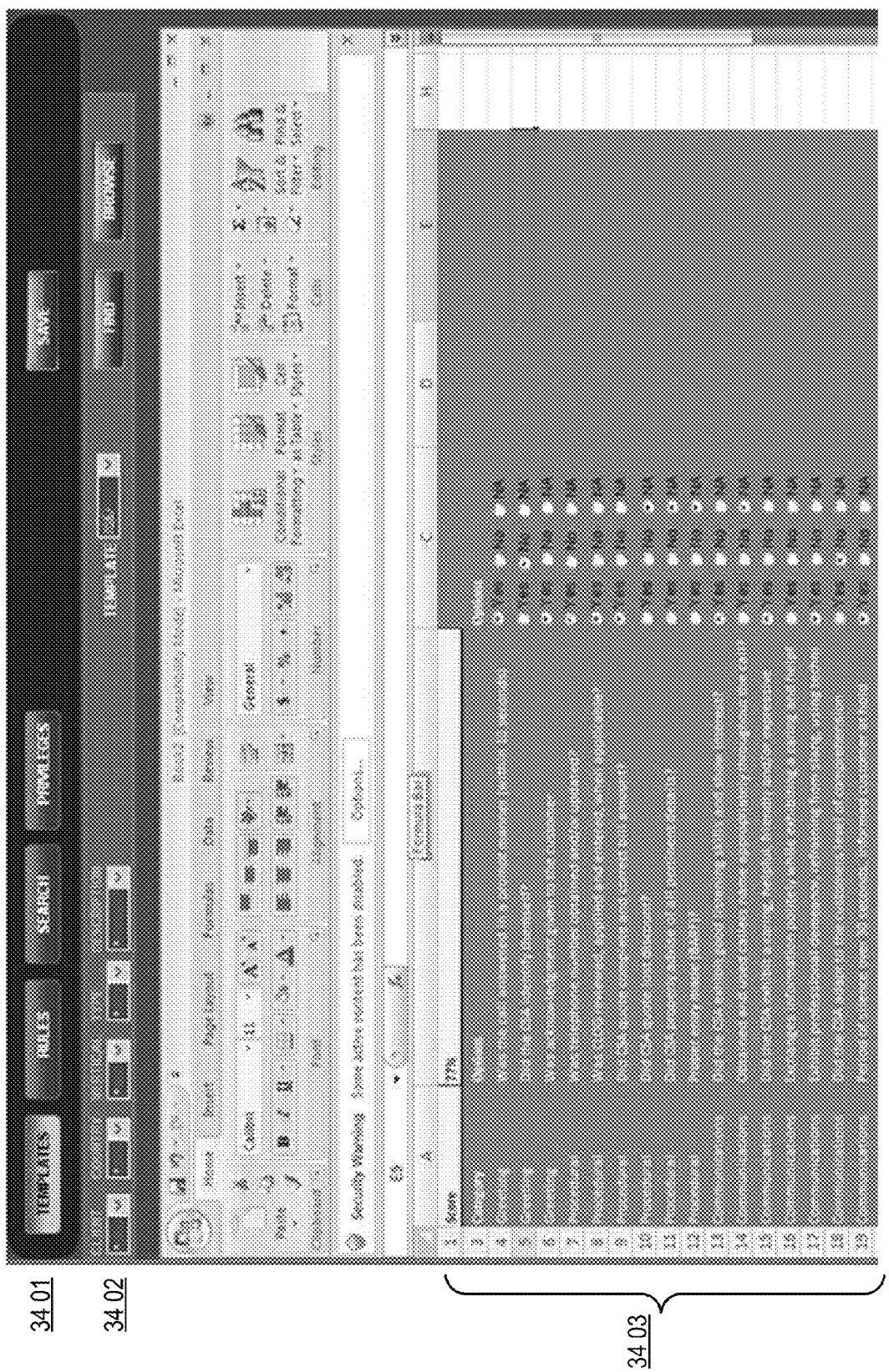
FIGS. 34A-E illustrate implementations of a user interface system for a call searcher in one embodiment of ADE-WAM operation.
Figure 34B:
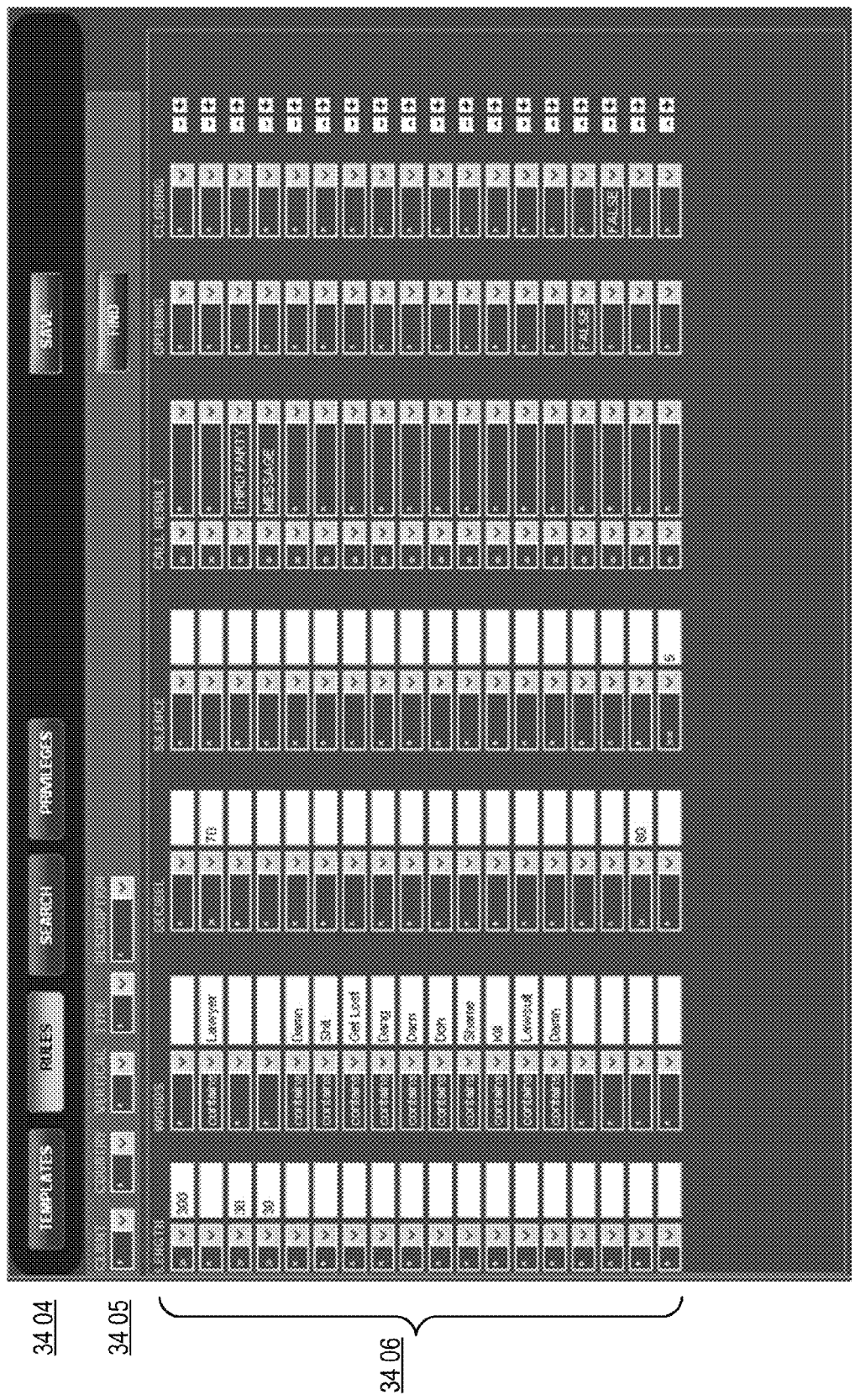
Figure 34C:
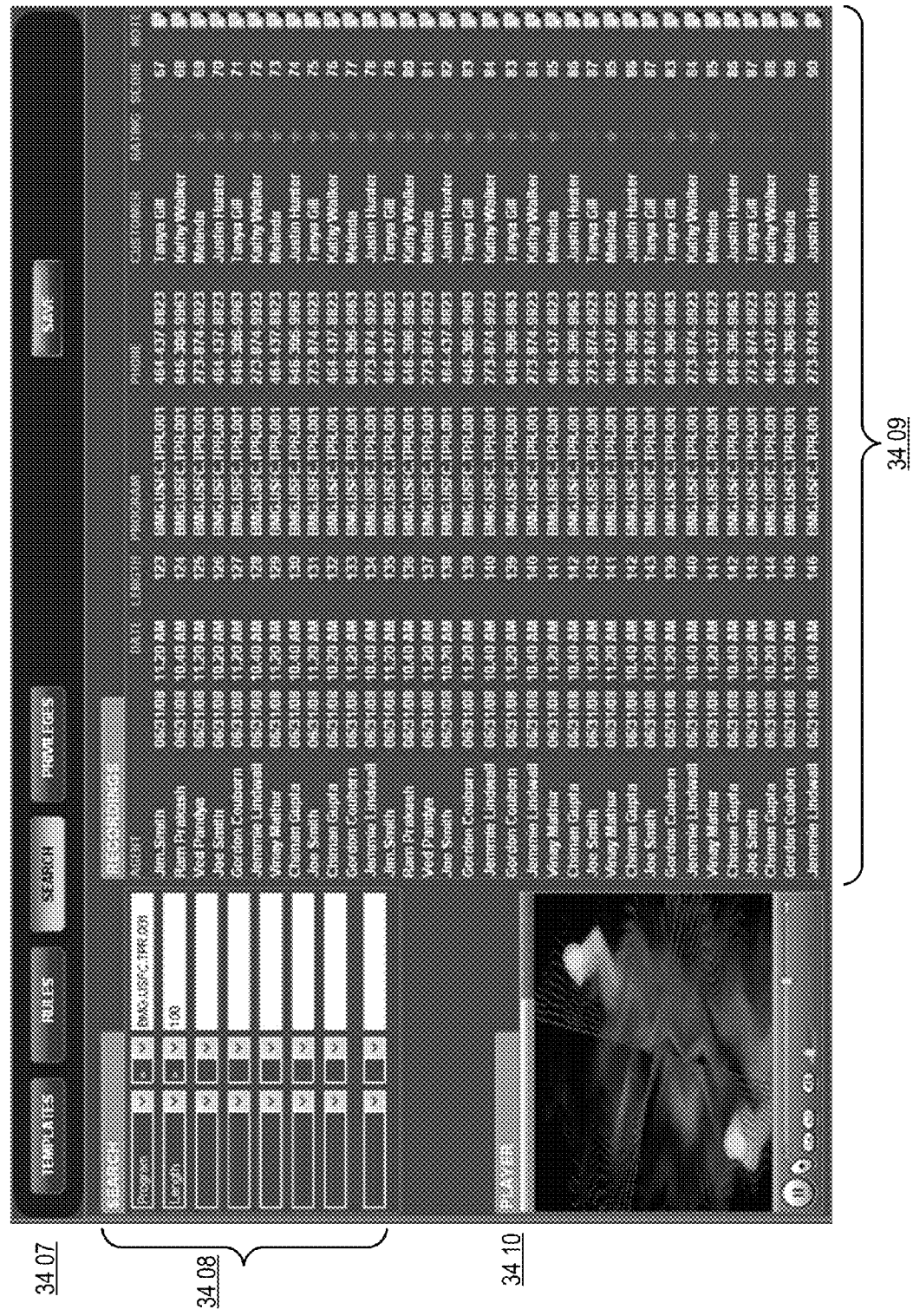
Figure 34D:
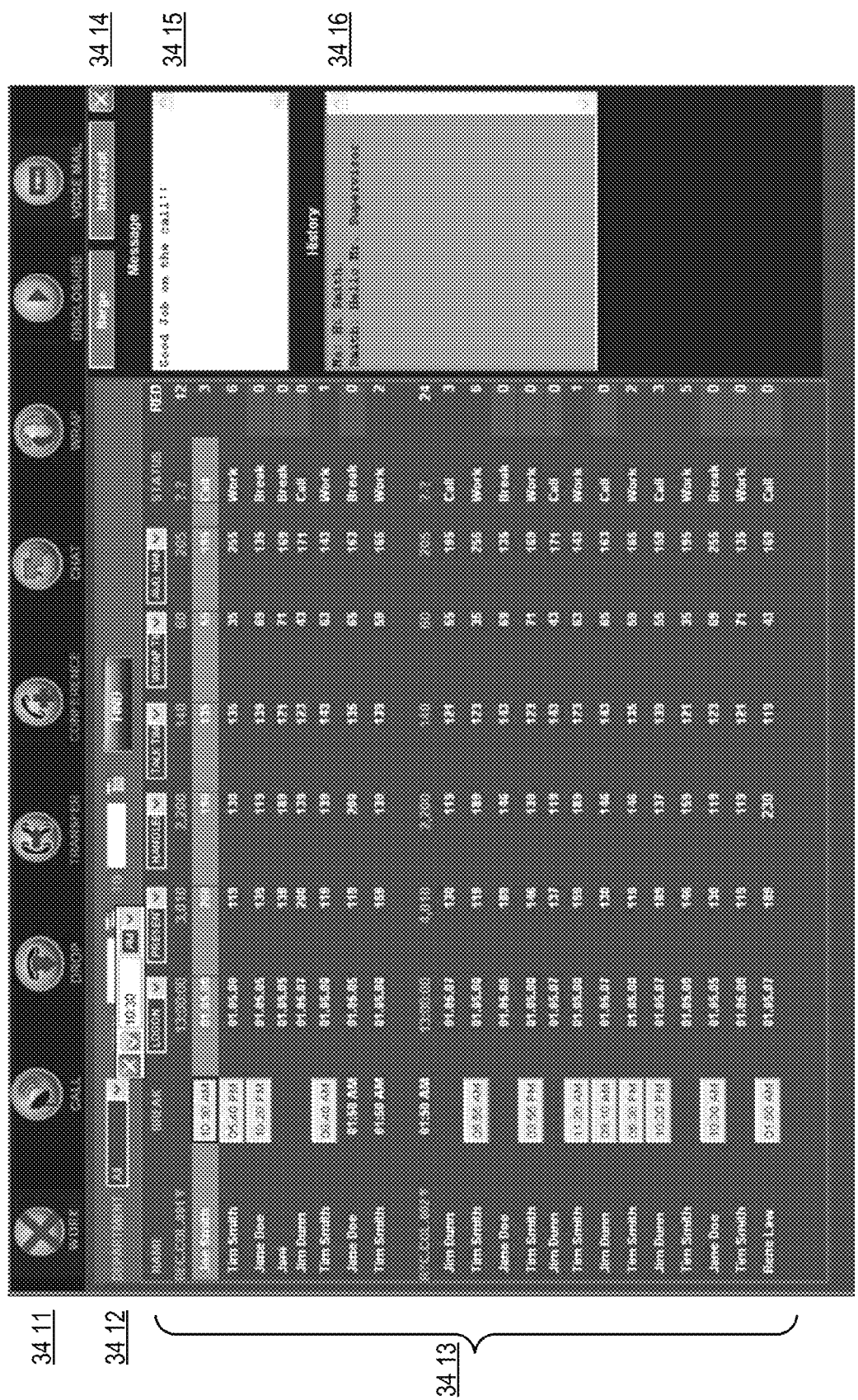
Figure 34E:
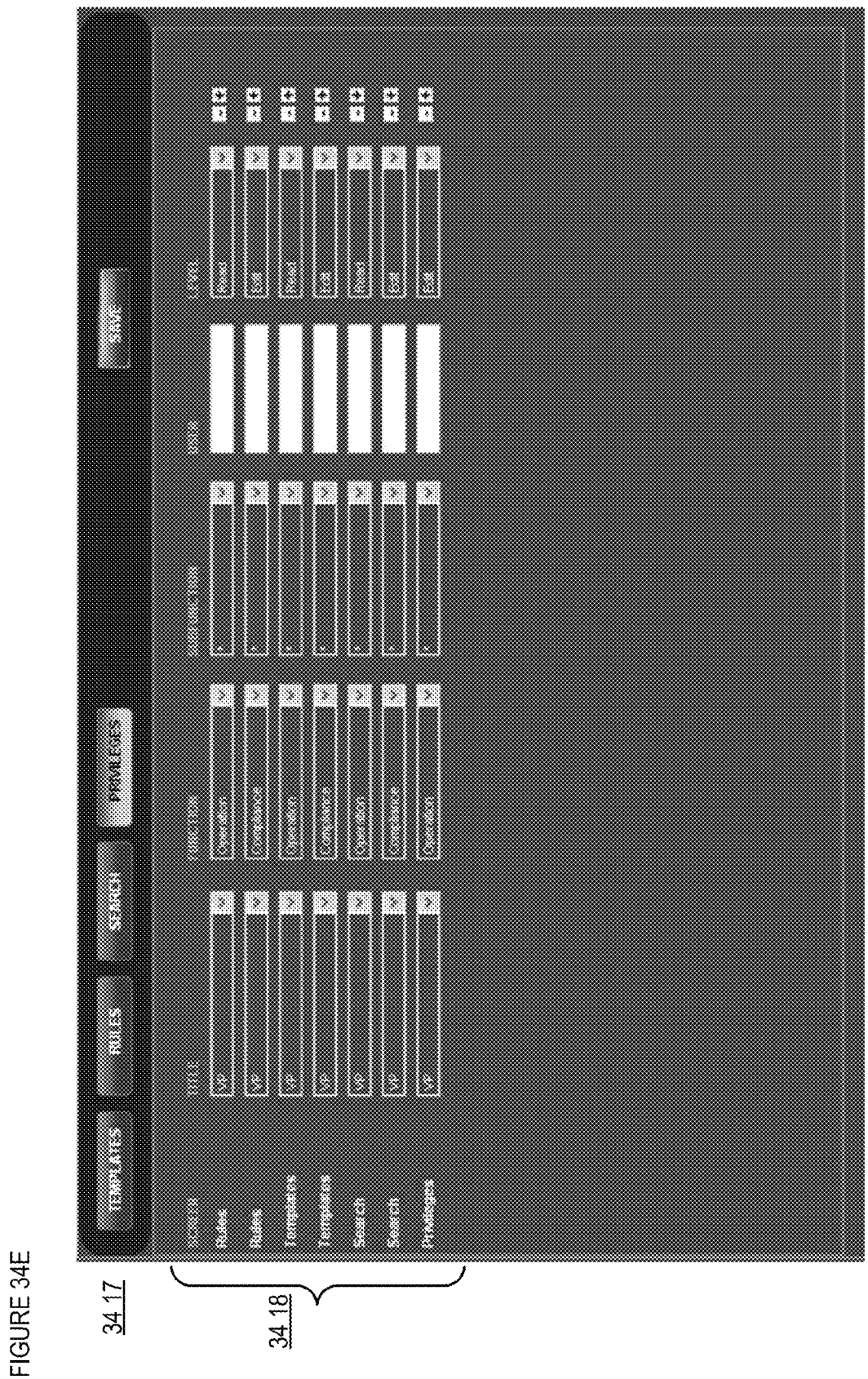

FIGS. 33A-B illustrate an implementation of data and logic flow among and between ADE-WAM components and/or affiliated entities for analyzing and tagging telecommunication sessions in an exemplary embodiment of ADE-WAM operation. In some implementations, one or more users may be participating in a telecommunications session via one or more clients. During the course of such as session, one or more users may generate 3301 media (e.g., audio/video) and/or data (e.g., files, HTTP(S) requests). In some implementations, such media and/or data may be exchanged between some or all of the users involved in the telecommunications session. Accordingly, a user in such a session may transmit and/or receive 3302 media and/or data as part of the telecommunication between the users. In some implementations, the call searcher and tag controller (hereinafter "controller") may obtain 3303 packets carrying the media and/or data transmitted by one or more of the users (e.g., via the call interface 3210). The packets may include packets transmitted to control the session (e.g., session initiation protocol packets) and/or packets carrying media information (e.g., real-time transport protocol packets). The controller may resolve the direction in which each packet is being transmitted using the source and destination addresses stored in header fields within the packets. Accordingly, in some implementations, the controller may be able to distinguish between packets transmitted by different users, and may aggregate 3304 packets transmitted by a user in a telecommunications session separately from other packets involved in the session and/or other packets being transmitted by the communications network. In some implementations, the controller may extract properties of the call from header information stored in the aggregated packets transmitted by the user. For example, the controller may identify a source address, one or more destination addresses, user ID(s), a call ID and/or the like from the header information stored in the session control and/or media transport packets. The controller may use the identified call information to generate search queries 3305 to find call rules related to the telecommunications session. The controller may query a rules database 3306 and obtain call analysis and call tagging rules related to the telecommunications session using the search queries generates in 3305. If no call analysis and tagging rules are present (e.g., 3307, option No), the controller may start monitoring a different user and/or telecommunication session. If any call analysis and/or tagging rules are present (e.g., 3307, option Yes), the controller may extract the payloads from the aggregated media/data packets. For example, the controller may utilize the FFmpeg freeware open-source project packet sniffing libraries and programs (hereinafter "FFmpeg") for dumping audio and/or video payloads from the aggregated packets into a packet capture (.PCAP) data file. The controller may also utilize FFmpeg to generate audio and/or video files (e.g., .mp3/.avi) files 3309 from the captured packet payloads. In some implementations, the controller may populate header fields 3310 within the generated media files with information on telecommunications session. The header information may be used, for example, to search for specific call recordings at a later time. The controller may then store 3311 the generate media files in the recorded calls database.

In some implementations, the controller may analyze the media files and determine call ratings according to the call analysis rule obtained from the rules database. As examples, the controller may determine a call duration, a time between an INVITE transmission to start a telephone call and an OK 200 transmission indicating acceptance of the call, time that various users joined or left the session, and/or the like. As other examples, in some implementations, a Fast Fourier Transform, Short-Time Fourier Transform, Wavelet Transform, Spectrogram and/or the like may be calculated to provide a map of the frequencies present in the speech signal. In some implementations, the results of such calculations may be used to estimate one or more parameters related to speech including, but not limited to, tone, pitch, volume, pace, gaps/silence in speech, and/or the like. For example, the calculations may be used to look for speech in the 512 Hz to 2048 Hz (and/or to 8192 Hz) part of the spectrum. As another example, the calculations may be used for amplitude measurement, e.g., to determine whether screaming is detected in the transmission. For example, the controller may utilize the freeware open-source WaveSurfer tool for comprehensive speech/sound analysis and sound (e.g., speech-to-text) annotation/transcription. The controller may then parse the transcription for specific words and/or phrases that may result in generation of a flag. In some implementations, the determined call properties may be rated 3312 compared to a set of reference values obtained from the rules database, and ratings may be assigned to call properties. As examples, a call rating may be determined based on how much it deviates from its associated reference value, or by how much it exceeds the reference value. In some implementations, the controller may analyze telecommunications sessions 3313 and assign one or more flags 3314 to a telecommunications session based on the call ratings associated with the session. For example, a flag may be set if one or more of the ratings falls below/exceeds their associated threshold values according to analysis rules obtained from the rules database. In some implementations, a violation tag may be set if one or more of the ratings indicates that notification of and/or attention by a supervisor is required. The controller may store 3315 the call properties, ratings and tags in a Call Ratings database. Further, if any violation tags and/or tags that require notification are present 3316, the controller may generate notification messages 3317 (e.g., SMS, automated phone call, electronic mail, letter etc.) to notify the appropriate personnel of the violations and/or tags and provide the notification messages to the supervisor(s) clients according to the call rules. In some implementations, upon obtaining notification 3318 of call rule violation, a supervisor and/or other appropriate personnel may respond 3319 by joining the call, and/or creating new rules to address the violation(s) and provide the for storage in the call rules and/or other databases. For example, the rule may initiate blacklisting of a user associated with the telecommunications session, prevention of further violation, correction of the violation, block the telecommunications session in real-time, re-assign the telecommunications session to a different user/agent, notify a superior, determine for how long a call should be recorded, record activities of a user committing the violation, determine how long a call recording should be retained in a database, and/or the like. The controller may update the rule(s) databases 3320 with the newly created rules by the supervisor. The newly created rues may also trigger operation 3321 of the different aspects of the ADE-WAM depending on the newly created rules. In some implementations, without supervisor intervention, a set flag may cause the controller to generate in real-time rules related to the user IDs and/or attributes of the participants in the telephone session on which analytics was performed. In general, it is contemplated that any combination of attributes of media exchanges may be analyzed, rules may be generated on-the-fly based on the analysis of any combination of parameters of calls, the rules database updated dynamically to reflect the new call restriction rule, and the updated database rules be implemented dynamically throughout the entire packet switched network in real-time.

FIGS. 34A-E illustrate implementations of a user interface system for a call searcher in one embodiment of ADE-WAM operation. In some implementations, the controller may populate answers to a template 3401 of questions related to the telecommunications session. The template may be a spreadsheet, and be customized for various 3402 clients, countries, businesses (e.g., vertical etc.), types, descriptions, and/or the like. The questions 3403 in the template may include questions relating to how the call was answered, whether the agent addressed all the issues required to be addressed, how the agent performed on the call, handled various situations, what the agent's tone, volume, pitch, speed of speech was, and/or the like. In some implementations, rules 3404 may be entered via the interface for implementation by the call searcher. For example, rule for a specific 3405 client, country, business type, description and/or the like may be entered. For example, various rule 306 may be generated combining various call aspects including the length of a call, specific words included in the call, volume level, amount of silence, result of a call, type of opening and/or closing remarks made, and/or the like. Such rules may be used to determine if a call should be tagged or if the call violates a requirement. In some implementations, a supervisor and/or other authorized personnel may be allowed to search 3407 for a specific call under their department/jurisdiction. For example, a supervisor may be able to enter search terms into a search area 3408. Search fields may include any combination of call attributes described in this disclosure. The supervisor may be able to include combinations of conditions that calls must satisfy in order to appear under the search results 3409. In some implementations, within the search results, a plurality of customizable call attributes may be displayed including, but not limited to, an agent name, a call date, length, department/program, phone number called, name of customer called, an overall call rating, an overall call score, notes associated with the call (e.g., as determined by the call searcher), and/or the like. The supervisor may be able to play 3410, for further details, any of the recordings (or a portion thereof) associated with the calls listed in the search results, thus allowing the supervisor to obtain an overview of communications in his/her department/jurisdiction, or to drill down and review in detail an individual call, based if necessary on call attributes, ratings, tags and/or violation notifications. In some implementations, the supervisor may also be able to obtain detailed information on the progress and/or work being performed by the agents in his/her division/department/jurisdiction, and may be able to perform actions 3411 from the same screen where the agents are being monitored. For example, the supervisor may be able to call an agent, drop an agent from a call, transfer a call from one agent to another, join in a conference call with one or more agents, chat with an agent, provide indications to an agent that a call is being wrapped up, activate a recital of an automated message, disclosure/policy statement, review voicemail, and/or the like. The supervisor may able to use search fields 3412 to drill down to any specific agent(s). In a list of agent results 3413, the supervisor may be able to see the agents satisfying the search criteria, and may be able to monitor their work in progress including, but not limited to, when they logged in for work, what they are doing at the present time (e.g., call, work, break etc.), how long they have been on a particular call, average call statistics, agent ratings, and/or the like. The supervisor may be able to intercept an agent and/or barge in 3413 on a specific activity that one of the agents is performing, and take over control of the task being performed, or may be able to send a message 3415 (e.g., chat, e-mail) to an agent and view messaging history 3416 with an agent. In some implementations, rules may be stored to the call searcher databases as to who may be allowed to access supervisory and/or other user interfaces (e.g., privileges 3417). In some implementations, access and access levels 3418 may be assigned according to a number of fields including, but not limited to, title, job function, sub-function, user ID, and/or the like.

ADE-WAM Controller

Figure 35:
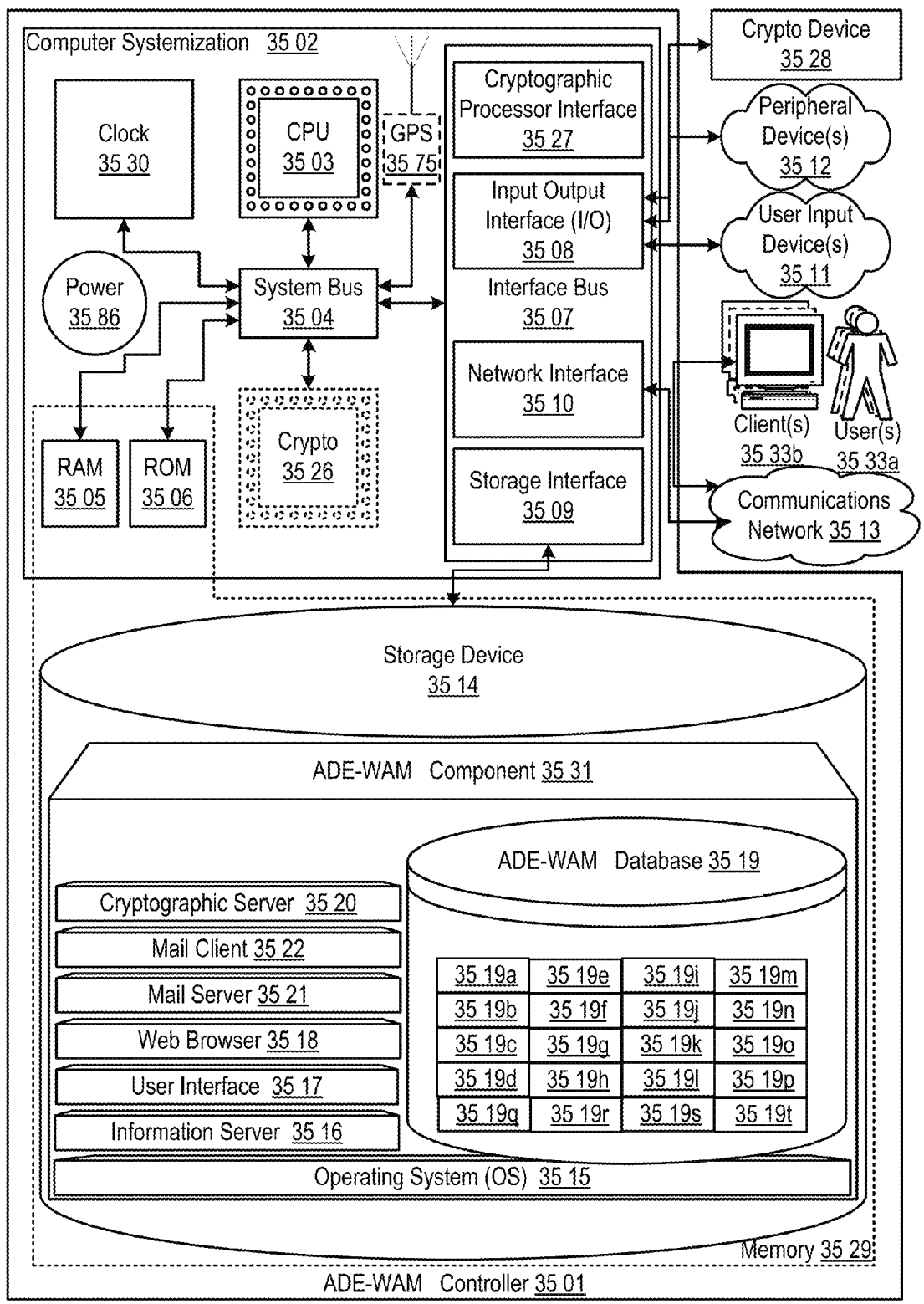
FIG. 35 is of a block diagram illustrating embodiments of the ADE-WAM controller; and Appendix A includes further details of an implementation of hierarchically arranged universal variables for a universal data library in one embodiment of ADE-WAM operation.

FIG. 35 illustrates inventive aspects of a ADE-WAM controller 3501 in a block diagram. In this embodiment, the ADE-WAM controller 3501 may serve to aggregate, process, store, search, serve, identify, instruct, generate, match, and/or facilitate interactions with a computer through enterprise and human resource management technologies, and/or other related data.

Typically, users, which may be people and/or other systems, may engage information technology systems (e.g., computers) to facilitate information processing. In turn, computers employ processors to process information; such processors 3503 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 3529 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the ADE-WAM controller 3501 may be connected to and/or communicate with entities such as, but not limited to: one or more users from user input devices 3511; peripheral devices 3512; an optional cryptographic processor device 3528; and/or a communications network 3513.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The ADE-WAM controller 3501 may be based on computer systems that may comprise, but are not limited to, components such as: a computer systemization 3502 connected to memory 3529.

Computer Systemization

A computer systemization 3502 may comprise a clock 3530, central processing unit ("CPU(s)" and/or "processor(s)" (these terms are used interchangeable throughout the disclosure unless noted to the contrary)) 3503, a memory 3529 (e.g., a read only memory (ROM) 3506, a random access memory (RAM) 3505, etc.), and/or an interface bus 3507, and most frequently, although not necessarily, are all interconnected and/or communicating through a system bus 3504 on one or more (mother)board(s) 3502 having conductive and/or otherwise transportive circuit pathways through which instructions (e.g., binary encoded signals) may travel to effect communications, operations, storage, etc. Optionally, the computer systemization may be connected to an internal power source 3586. Optionally, a cryptographic processor 3526 may be connected to the system bus. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the ADE-WAM controller and beyond through various interfaces. Should processing requirements dictate a greater amount speed and/or capacity, distributed processors (e.g., Distributed ADE-WAM), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the ADE-WAM may be achieved by implementing a microcontroller such as CAST's R8051XC2 microcontroller; Intel's MCS 51 (i.e., 8051 microcontroller); and/or the like. Also, to implement certain features of the ADE-WAM, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the ADE-WAM component collection (distributed or otherwise) and/or features may be implemented via the microprocessor and/or via embedded components; e.g., via ASIC, coprocessor, DSP, FPGA, and/or the like. Alternately, some implementations of the ADE-WAM may be implemented with embedded components that are configured and used to achieve a variety of features or signal processing.

Depending on the particular implementation, the embedded components may include software solutions, hardware solutions, and/or some combination of both hardware/software solutions. For example, ADE-WAM features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the ADE-WAM features. A hierarchy of programmable interconnects allow logic blocks to be interconnected as needed by the ADE-WAM system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the ADE-WAM may be developed on regular FPGAs and then migrated into a fixed version that more resembles ASIC implementations. Alternate or coordinating implementations may migrate ADE-WAM controller features to a final ASIC instead of or in addition to FPGAs. Depending on the implementation all of the aforementioned embedded components and microprocessors may be considered the "CPU" and/or "processor" for the ADE-WAM.

Power Source

The power source 3586 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 3586 is connected to at least one of the interconnected subsequent components of the ADE-WAM thereby providing an electric current to all subsequent components. In one example, the power source 3586 is connected to the system bus component 3504. In an alternative embodiment, an outside power source 3586 is provided through a connection across the I/O 3508 interface. For example, a USB and/or IEEE 1394 connection carries both data and power across the connection and is therefore a suitable source of power.

Interface Adapters

Interface bus(ses) 3507 may accept, connect, and/or communicate to a number of interface adapters, conventionally although not necessarily in the form of adapter cards, such as but not limited to: input output interfaces (I/O) 3508, storage interfaces 3509, network interfaces 3510, and/or the like. Optionally, cryptographic processor interfaces 3527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 3509 may accept, communicate, and/or connect to a number of storage devices such as, but not limited to: storage devices 3514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 3510 may accept, communicate, and/or connect to a communications network 3513. Through a communications network 3513, the ADE-WAM controller is accessible through remote clients 3533*b* (e.g., computers with web browsers) by users 3533*a*. Network interfaces may employ connection protocols such as, but not limited to: direct connect, Ethernet (thick, thin, twisted pair 10/100/1000 Base T, and/or the like), Token Ring, wireless connection such as IEEE 802.na-x, and/or the like. Should processing requirements dictate a greater amount speed and/or capacity, distributed network controllers (e.g., Distributed ADE-WAM), architectures may similarly be employed to pool, load balance, and/or otherwise increase the communicative bandwidth required by the ADE-WAM controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 3510 may be used to engage with various communications network types 3513. For example, multiple network interfaces may be employed to allow for the communication over broadcast, multicast, and/or unicast networks.

Input Output interfaces (I/O) 3508 may accept, communicate, and/or connect to user input devices 3511, peripheral devices 3512, cryptographic processor devices 3528, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, Bluetooth, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 3511 may be card readers, dongles, finger print readers, gloves, graphics tablets, joysticks, keyboards, mouse (mice), remote controls, retina readers, trackballs, trackpads, and/or the like.

Peripheral devices 3512 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

For example, in some implementations, one or more softphone applications executing on a client terminal may operate in conjunction with peripheral hardware resources of the client terminal to provide the user with telephony capabilities. In some implementations, the client terminal may be equipped with a 19 "line-in", "microphone" and/or other like audio input provisions, via which a microphone or other audio input devices may be operatively connected to the client terminal. In some implementations, the audio input provisions may accept analog audio input from the audio input devices. The audio input provisions may operatively connect the analog audio input device with an analog-to-digital converter. The analog-to-digital converter may employ a coder-decoder (codec). The codec may sample the analog audio input signal at a known sampling rate (e.g., G.722 speech codec, sampling at 7 kHz to produce data at a rate of 64 kbits/sec) and compress the digitized data for transmission (e.g., G.722 speech codec, CS-ACELP algorithm). In some implementations, the analog-to-digital converter may be a sound card (e.g., Creative Labs Sound Blaster X-Fi Xtreme Audio PCI Interface sound card) installed within the client terminal. The sound card may convert the analog audio input into digital format, and place the digital audio data in a memory operatively connected to the client terminal for storage or further processing. In some implementations, the client terminal may be equipped with an analog telephone adaptor (ATA). A standard analog telephone to be operatively connected to an input terminal of the ATA. The ATA may, in some implementations, convert an analog input audio signal output by the standard analog telephone into digital format for storage in memory or further processing by the client terminal, or directly into digital audio data packets that may be ready for transport across a packet-switched network. An output of the ATA may be operatively connected to a digital port of the client terminal (e.g., USB, RJ-45 Ethernet and/or the like) or a router operatively connected to a packet-switched network. The ATA may output the digital data and/or digital audio data packets via digital ports to the client terminal or router.

In some implementations, a video capture device, such as a video camera, camcorder, web camera and/or the like may be operatively connected to the client terminal via a component video, S-video, VGA, HDMI and/or other like video input provisions. The video capture device may produce video in analog or digital format, which may be provided to the client terminal via the video input provisions. In some implementations, captured video in analog format may be provided to an analog-to-digital video converter (e.g., AVerMedia AVerTV Combo PCI-E HDTV TV Tuner) operatively connected to a digital port (e.g., USB, RJ-45, FireWire, HDMI, IEEE-488/GPIB and/or the like) of the client terminal. The analog-to-digital video converter may convert the captured analog video input into a digital format (e.g., raw video, MPEG-4, H.264 and/or the like). The digitized video from the digital video capture device or digital video converter may be provided via the digital port to memory for storage or further processing.

It should be noted that although user input devices and peripheral devices may be employed, the ADE-WAM controller may be embodied as an embedded, dedicated, and/or monitor-less (i.e., headless) device, wherein access would be provided over a network interface connection.

Cryptographic units such as, but not limited to, microcontrollers, processors 3526, interfaces 3527, and/or devices 3528 may be attached, and/or communicate with the ADE-WAM controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 3529. However, memory is a fungible technology and resource, thus, any number of memory embodiments may be employed in lieu of or in concert with one another. It is to be understood that the ADE-WAM controller and/or a computer systemization may employ various forms of memory 3529. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 3529 will include ROM 3506, RAM 3505, and a storage device 3514. A storage device 3514 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 3529 may contain a collection of program and/or database components and/or data such as, but not limited to: operating system component(s) 3515 (operating system); information server component(s) 3516 (information server); user interface component(s) 3517 (user interface); Web browser component(s) 3518 (Web browser); database(s) 3519; mail server component(s) 3521; mail client component(s) 3522; cryptographic server component(s) 3520 (cryptographic server); the ADE-WAM component(s) 3535; and/or the like (i.e., collectively a component collection). These components may be stored and accessed from the storage devices and/or from storage devices accessible through an interface bus. Although non-conventional program components such as those in the component collection, typically, are stored in a local storage device 3514, they may also be loaded and/or stored in memory such as: peripheral devices, RAM, remote storage facilities through a communications network, ROM, various forms of memory, and/or the like.

Operating System

The operating system component 3515 is an executable program component facilitating the operation of the ADE-WAM controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the ADE-WAM controller to communicate with other entities through a communications network 3513. Various communication protocols may be used by the ADE-WAM controller as a subcarrier transport mechanism for interaction, such as, but not limited to: multicast, TCP/IP, UDP, unicast, and/or the like.

Information Server

An information server component 3516 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the ADE-WAM controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the ADE-WAM database 3519, operating systems, other program components, user interfaces, Web browsers, and/or the like.

Access to the ADE-WAM database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the ADE-WAM. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the ADE-WAM as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 3517 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 3518 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like.

Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the ADE-WAM enabled nodes. The combined application may be nugatory on systems employing standard Web browsers.

Mail Server

A mail server component 3521 is a stored program component that is executed by a CPU 3503. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the ADE-WAM.

Access to the ADE-WAM mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 3522 is a stored program component that is executed by a CPU 3503. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 3520 is a stored program component that is executed by a CPU 3503, cryptographic processor 3526, cryptographic processor interface 3527, cryptographic processor device 3528, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous 13 (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the ADE-WAM may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the ADE-WAM component to engage in secure transactions if so desired. The cryptographic component facilitates the secure accessing of resources on the ADE-WAM and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The ADE-WAM Database

The ADE-WAM database component 3519 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables.

Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the ADE-WAM database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the ADE-WAM database is implemented as a data-structure, the use of the ADE-WAM database 3519 may be integrated into another component such as the ADE-WAM component 3535. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 3519 includes several tables 3519a-s. A ClientProgram table 3519a may include fields such as, but not limited to: ProgramID, ProgramCode, ProgramName, Description, EndDate, CreatedBy, CreatedDate, UpdatedBy, UpdatedDate, Timestamp (TS), AutoDeductFlag, SalesID foreign key (FK), ClientID (FK), CountryID (FK), BusinessTypeID (FK), VerticalID (FK), ProgramTypeID (FK), EntityID (FK), InvoiceGroupID (FK), and/or the like. A Sales table 3519b may include fields such as, but not limited to: SalesID, SalesName, SalesCode, StartDate, EndDate, CreatedBy, CreatedDate, UpdatedBy, UpdatedDate, TS, and/or the like. A ProgramType table 3519c may include fields such as, but not limited to: ProgramTypeID, ProgramTypeName, StartDate, EndDate, CreatedBy, CreatedDate, UpdatedBy, UpdatedDate, TS, and/or the like. A BusinessType table 3519d may include fields such as, but not limited to: BusinessTypeID, BusinessTypeCode, BusinessTypeName, StartDate, EndDate, CreatedBy, CreatedDate, UpdatedBy, UpdatedDate, TS, and/or the like. A ClientProgramHistory table 3519e may include fields such as, but not limited to: ProgramHistoryID, OldProgramCode, ChangeDate, EndDate, CreatedBy, CreatedDate, UpdatedBy, UpdatedDate, TS, ProgramID (FK), and/or the like. A Country table 3519f may include fields such as, but not limited to: CountryID, CountryName, CountryCode, StartDate, EndDate, CreatedBy, CreatedDate, UpdatedBy, UpdatedDate, TS, and/or the like. A LegalEntity table 3519g may include fields such as, but not limited to: EntityID, EntityName, EntityCode, TaxID, ChairmanName, SecretaryName, DirectorName, StartDate, EndDate, CreatedBy, CreatedDate, UpdatedBy, UpdatedDate, TS, CurrencyID (FK), CountryID (FK), and/or the like. A Client table 3519h may include fields such as, but not limited to: ClientID, ClientName, StartDate, EndDate, CreatedBy, CreatedDate, UpdatedBy, UpdatedDate, TS, CountryID (FK), VerticalID (FK) and/or the like. A Vertical table 3519i may include fields such as, but not limited to: VerticalID, VerticalName, VerticalCode, StartDate, EndDate, CreatedBy, CreatedDate, UpdatedBy, UpdatedDate, TS, and/or the like. A DepartmentCode table 3519j may include fields such as, but not limited to: DepartmentCodeID, DepartmentCode, DepartmentFullName, TreeLevel, StartDate, EndDate, CreatedBy, CreatedDate, UpdatedBy, UpdatedDate, TS, DepartmentID (FK), EntityID (FK), LocationID (FK), ClassID (FK), SubClassID (FK), and/or the like. A Department table 3519k may include fields such as, but not limited to: DepartmentID, Name, Code, Type, CreatedBy, CreatedDate, TS, and/or the like. A DepartmentHistory table 3519l may include fields such as, but not limited to: DepartmentHistoryID, DepartmentFullName, DepartmentCode, DepartmentID, ParentDepartmentID, ChangedDepartmentID, ChangedDate, StartDate, EndDate, CreatedBy, CreatedDate, UpdatedBy, UpdatedDate, TS, and/or the like. A Location table 3519m may include fields such as, but not limited to: LocationID, LocationName, LocationCode, StartDate, EndDate, CreatedBy, CreatedDate, UpdatedBy, UpdatedDate, TS, CountryID (FK), and/or the like. A Class table 3519n may include fields such as, but not limited to: ClassID, ClassName, ClassCode, StartDate, EndDate, CreatedBy, CreatedDate, UpdatedBy, UpdatedDate, TS, and/or the like. A SubClass table 3519o may include fields such as, but not limited to: SubClassID, SubClassName, SubClassCode, StartDate, EndDate, CreatedBy, CreatedDate, UpdatedBy, UpdatedDate, TS, ClassID (FK), SubClassTypeID (FK), and/or the like. An Assignment table 3519p may include fields such as, but not limited to: AssignmentID, StartDate, EndDate, CreatedBy, CreatedDate, UpdatedBy, UpdatedDate, TS, ProgramID (FK), DepartmentCodeID (FK), and/or the like. An Employee table 3519q may include fields such as, but not limited to: UserID, GUID, UserName, Email, SubTitleID, SubFunctionID, ISOwner, StartDate, EndDate, CreatedBy, CreatedDate, UpdatedBy, UpdatedDate, TS, TitleID (FK), FunctionID (FK), DepartmentCodeID, and/or the like. A Universal Data Library table 3519r may include fields such as, but not limited to: variable_ID, family, subfamily, field_name, display_name, type, category, used_by, associated_database(s), associated_table(s), associated_field(s), reformatting_instruction(s), value combination_instruction(s), and/or the like. A Data Transaction table 3519s may include fields such as, but not limited to: transaction_ID, variable_ID(s), schedule and/or trigger_condition(s), data_repository_ID, data_repository_address, report_type, data_layout and/or data_configuration, file_type, file_name, file_password, program_code, department code, limiter, chooser, and/or the like. A Communications Management Table 3519t may include fields such as, but not limited to: sip_address, ip_address, place_calls, receive_calls, web_access_enable, call_ratings, call_tags, voicemail_enable, call_forwarding_enable, forwarding_address, service_expiry, messaging_protocols_list, and/or the like. One or more of the tables discussed above may support and/or track multiple entity accounts on a ADE-WAM.

In one embodiment, the ADE-WAM database may interact with other database systems. For example, employing a distributed database system, queries and data access by search ADE-WAM component may treat the combination of the ADE-WAM database, an integrated data security layer database as a single database entity.

In one embodiment, user programs may contain various user interface primitives, which may serve to update the ADE-WAM. Also, various accounts may require custom database tables depending upon the environments and the types of clients the ADE-WAM may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 3519a-s. The ADE-WAM may be configured to keep track of various settings, inputs, and parameters via database controllers.

The ADE-WAM database may communicate to and/or with other components in a component collection, including itself, and/or facilities of the like. Most frequently, the ADE-WAM database communicates with the ADE-WAM component, other program components, and/or the like. The database may contain, retain, and provide information regarding other nodes and data.

The ADE-WAMs

The ADE-WAM component 3535 is a stored program component that is executed by a CPU. In one embodiment, the ADE-WAM component incorporates any and/or all combinations of the aspects of the ADE-WAM that was discussed in the previous figures. As such, the ADE-WAM affects accessing, obtaining and the provision of information, services, transactions, and/or the like across various communications networks.

The ADE-WAM component enables the management of enterprise and human resources, the provision of tailored and/or personalized computing experiences, massively scalable monitoring and regulation of personnel, efficient collection, organization, distribution, and presentation of enterprise data, and/or the like and use of the ADE-WAM.

The ADE-WAM component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools, Prototype; script.aculo.us, Simple Object Access Protocol (SOAP); SWFObject; Yahoo! User Interface; and/or the like), WebObjects, and/or the like. In one embodiment, the ADE-WAM server employs a cryptographic server to encrypt and decrypt communications. The ADE-WAM component may communicate to and/or with other components in a component collection, including itself, and/or facilities of the like. Most frequently, the ADE-WAM component communicates with the ADE-WAM database, operating systems, other program components, and/or the like. The ADE-WAM may contain, communicate, generate, obtain, and/or provide program component, system, user, and/or data communications, requests, and/or responses.

Distributed ADE-WAMs

The structure and/or operation of any of the ADE-WAM node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the ADE-WAM controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or other wise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., the SOAP parser) that may be employed to parse communications data. Further, the parsing grammar may be used beyond message parsing, but may also be used to parse: databases, data collections, data stores, structured data, and/or the like. Again, the desired configuration will depend upon the context, environment, and requirements of system deployment.

Examples of embodiments and/or implementations of UDL apparatuses, methods and systems may include the following:

1. An automated data extracting processor-implemented method embodiment, comprising:
   receiving a data report specification including at least a limiter and a chooser;
   generating a database query statement based on the chooser;
   querying tables in a database associated with the limiter using the database query statement;
   retrieving at least one data value corresponding to the chooser based on the querying; and
   generating a report comprising the at least one data value.

2. The method of embodiment 1, wherein the data report specification is received from a user, and further comprising:
   providing the report to the user.

3. The method of embodiment 1, wherein the chooser is received via a drag-and-drop user interface.

4. An automated data extracting processor-implemented method embodiment, comprising:
   receiving an output specification comprising a plurality of universal variables, wherein the plurality of universal variables are organized according to a hierarchical schema and are linked to a plurality of table fields in at least one database;
   receiving an output target identifier;
   receiving an output trigger condition;
   retrieving a plurality of data values associated with the plurality of table fields;
   providing the plurality of data values to the output target after occurrence of the output trigger condition.

5. The method of embodiment 4, wherein the output target identifier comprises at least one e-mail address.

6. The method of embodiment 5, wherein the output target identifier comprises a distribution list including a plurality of e-mail addresses.

7. The method of embodiment 4, wherein the output target identifier comprises a printing device identifier.

8. The method of embodiment 4, wherein the output target identifier comprises a display device identifier.

9. The method of embodiment 4, wherein providing the plurality of data values further comprises:
   configuring the plurality of data values as a structured data file.

10. The method of embodiment 9, wherein the structured data file comprises a fixed length file.

11. The method of embodiment 9, wherein the structured data file comprises a delimited file.

12. The method of embodiment 9, wherein the structured data file comprises an XML file.

13. The method of embodiment 9, wherein the structured data file comprises a spreadsheet file.

14. The method of embodiment 4, wherein the output trigger condition comprises a scheduled time.

15. The method of embodiment 14, wherein the scheduled time reoccurs periodically.

16. The method of embodiment 4, wherein the output trigger condition comprises a user request.

17. The method of embodiment 4, wherein the plurality of data values associated with the plurality of table fields are retrieved after occurrence of the at least one trigger condition.

18. The method of embodiment 4, wherein the plurality of universal variables are linked to a plurality of table fields in at least two databases.

19. The method of embodiment 18, wherein at least one of the at least two databases is a local database and at least another of the at least two databases is a remote database accessible via a communications network.

20. The method of embodiment 18, further comprising:
   receiving a database identifier in association with at least one of the plurality of universal variables.

21. The method of embodiment 4, further comprising:
   receiving at least one data retrieval limitation; and
   selecting the plurality of data values consistent with the at least one data retrieval limitation.

22. The method of embodiment 21, wherein the at least one data retrieval limitation comprises at least one token value of a delimited string configured with a descriptive business grammar.

23. The method of embodiment 22, wherein the delimited string configured with a descriptive business grammar is a program code.

24. The method of embodiment 4, further comprising:
   reformatting at least one of the plurality of data values before providing the plurality of data values to the output target.

25. The method of embodiment 4, further comprising:
   combining at least two of the plurality of data values to yield a combined data value; and
   providing the combined data value with the plurality of data values to the output target.

26. The method of embodiment 4, further comprising:
   determining a linkage relationship between at least two table fields of the plurality of table fields in the at least one database;
   generating a table joining clause based on the determined linkage relationship; and
   wherein a subset of the plurality of data values associated with the plurality of table fields are retrieved using the generated table joining clause.

27. The method of embodiment 26, wherein determining a linkage relationship further comprises:
   determining a first table containing a first table field of the at least two table fields;
   querying at least one key field in the first table connecting to at least one linked table;
   determining if the at least one linked table contains a second table field of the at least two table fields;
   recording the first table, the at least one linked table, and the at least one key field as the linkage relationship if the linked table contains the second table field;
   repeating the querying, determining and recording for the at least one linked table and tables linked to it until a table containing the second table field is found or a maximum number of linking steps has been reached.

28. The method of embodiment 4, wherein the plurality of universal variables are dragged from a selectable listing and dropped in a position indicative of selection for output.

29. The method of embodiment 4, wherein the plurality of universal variables are selected from a business descriptive set of universal variables.

30. An automated data extracting processor-accessible medium embodiment, comprising:
   a plurality of processing instructions stored in the medium and issuable by a processor to:

receive a data report specification including at least a limiter and a chooser;
generate a database query statement based on the chooser;
query tables in a database associated with the limiter using the database query statement;
retrieve at least one data value corresponding to the chooser based on the querying; and
generate a report comprising the at least one data value.

31. The medium of embodiment 30, wherein the data report specification is received from a user, and further comprising:
provide the report to the user.

32. The medium of embodiment 30, wherein the chooser is received via a drag-and-drop user interface.

33. An automated data extracting processor-accessible medium embodiment, comprising:
a plurality of processing instructions stored in the medium and issuable by a processor to:
receive an output specification comprising a plurality of universal variables, wherein the plurality of universal variables are organized according to a hierarchical schema and are linked to a plurality of table fields in at least one database;
receive an output target identifier;
receive an output trigger condition;
retrieve a plurality of data values associated with the plurality of table fields;
provide the plurality of data values to the output target after occurrence of the output trigger condition.

34. The medium of embodiment 33, wherein the output target identifier comprises at least one e-mail address.

35. The medium of embodiment 34, wherein the output target identifier comprises a distribution list including a plurality of e-mail addresses.

36. The medium of embodiment 33, wherein the output target identifier comprises a printing device identifier.

37. The medium of embodiment 33, wherein the output target identifier comprises a display device identifier.

38. The medium of embodiment 33, wherein provide the plurality of data values further comprises:
configure the plurality of data values as a structured data file.

39. The medium of embodiment 38, wherein the structured data file comprises a fixed length file.

40. The medium of embodiment 38, wherein the structured data file comprises a delimited file.

41. The medium of embodiment 38, wherein the structured data file comprises an XML file.

42. The medium of embodiment 38, wherein the structured data file comprises a spreadsheet file.

43. The medium of embodiment 33, wherein the output trigger condition comprises a scheduled time.

44. The medium of embodiment 43, wherein the scheduled time reoccurs periodically.

45. The medium of embodiment 33, wherein the output trigger condition comprises a user request.

46. The medium of embodiment 33, wherein the plurality of data values associated with the plurality of table fields are retrieved after occurrence of the at least one trigger condition.

47. The medium of embodiment 33, wherein the plurality of universal variables are linked to a plurality of table fields in at least two databases.

48. The medium of embodiment 47, wherein at least one of the at least two databases is a local database and at least another of the at least two databases is a remote database accessible via a communications network.

49. The medium of embodiment 47, further comprising:
receive a database identifier in association with at least one of the plurality of universal variables.

50. The medium of embodiment 33, further comprising:
receive at least one data retrieval limitation; and
select the plurality of data values consistent with the at least one data retrieval limitation.

51. The medium of embodiment 50, wherein the at least one data retrieval limitation comprises at least one token value of a delimited string configured with a descriptive business grammar.

52. The medium of embodiment 51, wherein the delimited string configured with a descriptive business grammar is a program code.

53. The medium of embodiment 33, further comprising:
reformat at least one of the plurality of data values before providing the plurality of data values to the output target.

54. The medium of embodiment 33, further comprising:
combine at least two of the plurality of data values to yield a combined data value; and
provide the combined data value with the plurality of data values to the output target.

55. The medium of embodiment 33, further comprising:
determine a linkage relationship between at least two table fields of the plurality of table fields in the at least one database;
generate a table joining clause based on the determined linkage relationship; and
wherein a subset of the plurality of data values associated with the plurality of table fields are retrieved using the generated table joining clause.

56. The medium of embodiment 55, wherein determine a linkage relationship further comprises:
determine a first table containing a first table field of the at least two table fields;
query at least one key field in the first table connecting to at least one linked table;
determine if the at least one linked table contains a second table field of the at least two table fields;
record the first table, the at least one linked table, and the at least one key field as the linkage relationship if the linked table contains the second table field;
repeat the querying, determining and recording for the at least one linked table and tables linked to it until a table containing the second table field is found or a maximum number of linking steps has been reached.

57. The medium of embodiment 33, wherein the plurality of universal variables are dragged from a selectable listing and dropped in a position indicative of selection for output.

58. The medium of embodiment 33, wherein the plurality of universal variables are selected from a business descriptive set of universal variables.

59. An automated data extracting processor-implemented system embodiment, comprising:
means to receive a data report specification including at least a limiter and a chooser;
means to generate a database query statement based on the chooser;
means to query tables in a database associated with the limiter using the database query statement;
means to retrieve at least one data value corresponding to the chooser based on the querying; and
means to generate a report comprising the at least one data value.

60. The system of embodiment 59, wherein the data report specification is received from a user, and further comprising:
means to provide the report to the user.

61. The system of embodiment 59, wherein the chooser is received via a drag-and-drop user interface.

62. An automated data extracting processor-implemented system embodiment, comprising:
means to receive an output specification comprising a plurality of universal variables, wherein the plurality of universal variables are organized according to a hierarchical schema and are linked to a plurality of table fields in at least one database;
means to receive an output target identifier;
means to receive an output trigger condition;
means to retrieve a plurality of data values associated with the plurality of table fields;
means to provide the plurality of data values to the output target after occurrence of the output trigger condition.

63. The system of embodiment 62, wherein the output target identifier comprises at least one e-mail address.

64. The system of embodiment 63, wherein the output target identifier comprises a distribution list including a plurality of e-mail addresses.

65. The system of embodiment 62, wherein the output target identifier comprises a printing device identifier.

66. The system of embodiment 62, wherein the output target identifier comprises a display device identifier.

67. The system of embodiment 62, wherein means to provide the plurality of data values further comprises:
means to configure the plurality of data values as a structured data file.

68. The system of embodiment 67, wherein the structured data file comprises a fixed length file.

69. The system of embodiment 67, wherein the structured data file comprises a delimited file.

70. The system of embodiment 67, wherein the structured data file comprises an XML file.

71. The system of embodiment 67, wherein the structured data file comprises a spreadsheet file.

72. The system of embodiment 62, wherein the output trigger condition comprises a scheduled time.

73. The system of embodiment 72, wherein the scheduled time reoccurs periodically.

74. The system of embodiment 62, wherein the output trigger condition comprises a user request.

75. The system of embodiment 62, wherein the plurality of data values associated with the plurality of table fields are retrieved after occurrence of the at least one trigger condition.

76. The system of embodiment 62, wherein the plurality of universal variables are linked to a plurality of table fields in at least two databases.

77. The system of embodiment 76, wherein at least one of the at least two databases is a local database and at least another of the at least two databases is a remote database accessible via a communications network.

78. The system of embodiment 76, further comprising:
means to receive a database identifier in association with at least one of the plurality of universal variables.

79. The system of embodiment 62, further comprising:
means to receive at least one data retrieval limitation; and
means to select the plurality of data values consistent with the at least one data retrieval limitation.

80. The system of embodiment 79, wherein the at least one data retrieval limitation comprises at least one token value of a delimited string configured with a descriptive business grammar.

81. The system of embodiment 80, wherein the delimited string configured with a descriptive business grammar is a program code.

82. The system of embodiment 62 further comprising:
means to reformat at least one of the plurality of data values before providing the plurality of data values to the output target.

83. The system of embodiment 62, further comprising:
means to combine at least two of the plurality of data values to yield a combined data value; and
means to provide the combined data value with the plurality of data values to the output target.

84. The system of embodiment 62, further comprising:
means to determine a linkage relationship between at least two table fields of the plurality of table fields in the at least one database;
means to generate a table joining clause based on the determined linkage relationship; and
wherein a subset of the plurality of data values associated with the plurality of table fields are retrieved using the generated table joining clause.

85. The system of embodiment 84, wherein means to determine a linkage relationship further comprises:
means to determine a first table containing a first table field of the at least two table fields;
means to query at least one key field in the first table connecting to at least one linked table;
means to determine if the at least one linked table contains a second table field of the at least two table fields;
means to record the first table, the at least one linked table, and the at least one key field as the linkage relationship if the linked table contains the second table field;
means to repeat the querying, determining and recording for the at least one linked table and tables linked to it until a table containing the second table field is found or a maximum number of linking steps has been reached.

86. The system of embodiment 62, wherein the plurality of universal variables are dragged from a selectable listing and dropped in a position indicative of selection for output.

87. The system of embodiment 62, wherein the plurality of universal variables are selected from a business descriptive set of universal variables.

88. An automated data extracting apparatus embodiment, comprising:
a memory;
a processor disposed in communication with said memory and configured to issue a plurality of processing instructions stored in the memory, wherein the processor issues instructions to:
receive a data report specification including at least a limiter and a chooser;
generate a database query statement based on the chooser;
query tables in a database associated with the limiter using the database query statement;
retrieve at least one data value corresponding to the chooser based on the querying; and
generate a report comprising the at least one data value.

89. The apparatus of embodiment 88, wherein the data report specification is received from a user, and further comprising:
provide the report to the user.

90. The method of embodiment 88, wherein the chooser is received via a drag-and-drop user interface.

91. An automated data extracting apparatus embodiment, comprising:
a memory;
a processor disposed in communication with said memory and configured to issue a plurality of processing instructions stored in the memory, wherein the processor issues instructions to:

receive an output specification comprising a plurality of universal variables, wherein the plurality of universal variables are organized according to a hierarchical schema and are linked to a plurality of table fields in at least one database;

receive an output target identifier;

receive an output trigger condition;

retrieve a plurality of data values associated with the plurality of table fields;

provide the plurality of data values to the output target after occurrence of the output trigger condition.

92. The apparatus of embodiment 91, wherein the output target identifier comprises at least one e-mail address.

93. The apparatus of embodiment 92, wherein the output target identifier comprises a distribution list including a plurality of e-mail addresses.

94. The apparatus of embodiment 91, wherein the output target identifier comprises a printing device identifier.

95. The apparatus of embodiment 91, wherein the output target identifier comprises a display device identifier.

96. The apparatus of embodiment 91, wherein provide the plurality of data values further comprises:

configure the plurality of data values as a structured data file.

97. The apparatus of embodiment 96, wherein the structured data file comprises a fixed length file.

98. The apparatus of embodiment 96, wherein the structured data file comprises a delimited file.

99. The apparatus of embodiment 96, wherein the structured data file comprises an XML file.

100. The apparatus of embodiment 96, wherein the structured data file comprises a spreadsheet file.

101. The apparatus of embodiment 91, wherein the output trigger condition comprises a scheduled time.

102. The apparatus of embodiment 101, wherein the scheduled time reoccurs periodically.

103. The apparatus of embodiment 91, wherein the output trigger condition comprises a user request.

104. The apparatus of embodiment 91, wherein the plurality of data values associated with the plurality of table fields are retrieved after occurrence of the at least one trigger condition.

105. The apparatus of embodiment 91, wherein the plurality of universal variables are linked to a plurality of table fields in at least two databases.

106. The apparatus of embodiment 105, wherein at least one of the at least two databases is a local database and at least another of the at least two databases is a remote database accessible via a communications network.

107. The apparatus of embodiment 105, further comprising:

receive a database identifier in association with at least one of the plurality of universal variables.

108. The apparatus of embodiment 91, further comprising:

receive at least one data retrieval limitation; and select the plurality of data values consistent with the at least one data retrieval limitation.

109. The apparatus of embodiment 108, wherein the at least one data retrieval limitation comprises at least one token value of a delimited string configured with a descriptive business grammar.

110. The apparatus of embodiment 109, wherein the delimited string configured with a descriptive business grammar is a program code.

111. The apparatus of embodiment 91, further comprising:

reformat at least one of the plurality of data values before providing the plurality of data values to the output target.

112. The apparatus of embodiment 91, further comprising:

combine at least two of the plurality of data values to yield a combined data value; and provide the combined data value with the plurality of data values to the output target.

113. The apparatus of embodiment 91, further comprising:

determine a linkage relationship between at least two table fields of the plurality of table fields in the at least one database;

generate a table joining clause based on the determined linkage relationship; and wherein a subset of the plurality of data values associated with the plurality of table fields are retrieved using the generated table joining clause.

114. The apparatus of embodiment 113, wherein determine a linkage relationship further comprises:

determine a first table containing a first table field of the at least two table fields;

query at least one key field in the first table connecting to at least one linked table;

determine if the at least one linked table contains a second table field of the at least two table fields;

record the first table, the at least one linked table, and the at least one key field as the linkage relationship if the linked table contains the second table field;

repeat the querying, determining and recording for the at least one linked table and tables linked to it until a table containing the second table field is found or a maximum number of linking steps has been reached.

115. The apparatus of embodiment 91, wherein the plurality of universal variables are dragged from a selectable listing and dropped in a position indicative of selection for output.

116. The apparatus of embodiment 91, wherein the plurality of universal variables are selected from a business descriptive set of universal variables.

117. A call restricting processor-implemented method embodiment, comprising:

obtaining a transmission related to a call request, the transmission including a value for a call attribute;

extracting from the transmission the value for the call attribute;

querying a database using the extracted value for the call attribute;

obtaining a call rule to apply to the call request, based on querying the database;

applying the call rule to the call request; and determining via a processor whether the call is permitted based on applying the call rule to the call request.

118. The method of embodiment 117, further comprising:

determining that the call is permitted, based on applying the call rule to the call request; and forwarding the transmission to process the call request.

119. The method of embodiment 117, further comprising:

determining that the call is not permitted, based on applying the call rule to the call request; and providing an indication that the call request is not permitted.

120. The method of embodiment 117, wherein obtaining a call rule to apply to the call request includes:

obtaining a first call rule based on querying the database;

obtaining a second call rule based on querying the database;

extracting rule levels from the obtained first and second call rules;

comparing the rule levels of the first and second call rules; and determining the call rule to apply to the call request based on the comparison of the rule levels of the first and second call rules.

121. The method of embodiment 117, wherein the transmission is a media packet transmitted during an ongoing communication.

122. The method of embodiment 117, wherein the transmission is an invitation to initiate a communication session.

123. The method of embodiment 117, wherein the call rule is based on a legal regulation.

124. The method of embodiment 117, wherein the call attribute is an identifier of a call participant.

125. The method of embodiment 117, wherein the call attribute is a timestamp related to the transmission.

126. A call restricting system embodiment, comprising:
a processor; and
a memory disposed in communication with the processor and storing processor-executable instructions, the instructions comprising instructions to:
obtain a transmission related to a call request, the transmission including a value for a call attribute;
extract from the transmission the value for the call attribute;
query a database using the extracted value for the call attribute;
obtain a call rule to apply to the call request, based on querying the database;
apply the call rule to the call request; and
determine whether the call is permitted based on applying the call rule to the call request.

127. The system of embodiment 126, the instructions further comprising instructions to:
determine that the call is permitted, based on applying the call rule to the call request; and
forward the transmission to process the call request.

128. The system of embodiment 126, the instructions further comprising instructions to:
determine that the call is not permitted, based on applying the call rule to the call request; and
provide an indication that the call request is not permitted.

129. The system of embodiment 126, wherein the instructions to obtain a call rule to apply to the call request include instructions to:
obtain a first call rule based on querying the database;
obtain a second call rule based on querying the database;
extract rule levels from the obtained first and second call rules;
compare the rule levels of the first and second call rules; and
determine the call rule to apply to the call request based on the comparison of the rule levels of the first and second call rules.

130. The system of embodiment 126, wherein the transmission is a media packet transmitted during an ongoing communication.

131. The system of embodiment 126, wherein the transmission is an invitation to initiate a communication session.

132. The system of embodiment 126, wherein the call rule is based on a legal regulation.

133. The system of embodiment 126, wherein the call attribute is an identifier of a call participant.

134. The system of embodiment 126, wherein the call attribute is a timestamp related to the transmission.

135. A processor-readable medium embodiment storing processor-executable call restricting instructions, the instructions comprising instructions to:
obtain a transmission related to a call request, the transmission including a value for a call attribute;
extract from the transmission the value for the call attribute;
query a database using the extracted value for the call attribute;
obtain a call rule to apply to the call request, based on querying the database;
apply the call rule to the call request; and
determine whether the call is permitted based on applying the call rule to the call request.

136. The medium of embodiment 135, the instructions further comprising instructions to:
determine that the call is permitted, based on applying the call rule to the call request; and
forward the transmission to process the call request.

137. The medium of embodiment 135, the instructions further comprising instructions to:
determine that the call is not permitted, based on applying the call rule to the call request; and
provide an indication that the call request is not permitted.

138. The medium of embodiment 135, wherein the instructions to obtain a call rule to apply to the call request include instructions to:
obtain a first call rule based on querying the database;
obtain a second call rule based on querying the database;
extract rule levels from the obtained first and second call rules;
compare the rule levels of the first and second call rules; and
determine the call rule to apply to the call request based on the comparison of the rule levels of the first and second call rules.

139. The medium of embodiment 135, wherein the transmission is a media packet transmitted during an ongoing communication.

140. The medium of embodiment 135, wherein the transmission is an invitation to initiate a communication session.

141. The medium of embodiment 135, wherein the call rule is based on a legal regulation.

142. The medium of embodiment 135, wherein the call attribute is an identifier of a call participant.

143. The medium of embodiment 135, wherein the call attribute is a timestamp related to the transmission.

144. A call restricting processor-implemented method embodiment, comprising:
obtaining a transmission related to a call request, the transmission including a value for a call attribute;
extracting from the transmission the value for the call attribute;
querying a database using the extracted value for the call attribute;
obtaining a call rule to apply to the call request, based on querying the database;
applying the call rule to the call request; and
determining via a processor whether the call is permitted based on applying the call rule to the call request.

145. The method of embodiment 144, further comprising:
determining that the call is permitted, based on applying the call rule to the call request; and
forwarding the transmission to process the call request.

146. The method of embodiment 144, further comprising:
determining that the call is not permitted, based on applying the call rule to the call request; and
providing an indication that the call request is not permitted.

147. The method of embodiment 144, wherein obtaining a call rule to apply to the call request includes:
  obtaining a first call rule based on querying the database;
  obtaining a second call rule based on querying the database;
  extracting rule levels from the obtained first and second call rules;
  comparing the rule levels of the first and second call rules; and
  determining the call rule to apply to the call request based on the comparison of the rule levels of the first and second call rules.

148. The method of embodiment 144, wherein the transmission is a media packet transmitted during an ongoing communication.

149. The method of embodiment 144, wherein the transmission is an invitation to initiate a communication session.

150. The method of embodiment 144, wherein the call rule is based on a legal regulation.

151. The method of embodiment 144, wherein the call attribute is an identifier of a call participant.

152. The method of embodiment 144, wherein the call attribute is a timestamp related to the transmission.

153. A call restricting system embodiment, comprising:
  a processor; and
  a memory disposed in communication with the processor and storing processor-executable instructions, the instructions comprising instructions to:
    obtain a transmission related to a call request, the transmission including a value for a call attribute;
    extract from the transmission the value for the call attribute;
    query a database using the extracted value for the call attribute;
    obtain a call rule to apply to the call request, based on querying the database;
    apply the call rule to the call request; and
    determine whether the call is permitted based on applying the call rule to the call request.

154. The system of embodiment 153, the instructions further comprising instructions to:
  determine that the call is permitted, based on applying the call rule to the call request; and
  forward the transmission to process the call request.

155. The system of embodiment 153, the instructions further comprising instructions to:
  determine that the call is not permitted, based on applying the call rule to the call request; and
  provide an indication that the call request is not permitted.

156. The system of embodiment 153, wherein the instructions to obtain a call rule to apply to the call request include instructions to:
  obtain a first call rule based on querying the database;
  obtain a second call rule based on querying the database;
  extract rule levels from the obtained first and second call rules;
  compare the rule levels of the first and second call rules; and
  determine the call rule to apply to the call request based on the
  comparison of the rule levels of the first and second call rules.

157. The system of embodiment 153, wherein the transmission is a media packet transmitted during an ongoing communication.

158. The system of embodiment 153, wherein the transmission is an invitation to initiate a communication session.

159. The system of embodiment 153, wherein the call rule is based on a legal regulation.

160. The system of embodiment 153, wherein the call attribute is an identifier of a call participant.

161. The system of embodiment 153, wherein the call attribute is a timestamp related to the transmission.

162. A processor-readable medium embodiment storing processor-executable call restricting instructions, the instructions comprising instructions to:
  obtain a transmission related to a call request, the transmission including a value for a call attribute;
  extract from the transmission the value for the call attribute;
  query a database using the extracted value for the call attribute;
  obtain a call rule to apply to the call request, based on querying the database;
  apply the call rule to the call request; and
  determine whether the call is permitted based on applying the call rule to the call request.

163. The medium of embodiment 162, the instructions further comprising instructions to:
  determine that the call is permitted, based on applying the call rule to the call request; and
  forward the transmission to process the call request.

164. The medium of embodiment 162, the instructions further comprising instructions to:
  determine that the call is not permitted, based on applying the call rule to the call request; and
  provide an indication that the call request is not permitted.

165. The medium of embodiment 162, wherein the instructions to obtain a call rule to apply to the call request include instructions to:
  obtain a first call rule based on querying the database;
  obtain a second call rule based on querying the database;
  extract rule levels from the obtained first and second call rules;
  compare the rule levels of the first and second call rules; and
  determine the call rule to apply to the call request based on the comparison of the rule levels of the first and second call rules.

166. The medium of embodiment 162, wherein the transmission is a media packet transmitted during an ongoing communication.

167. The medium of embodiment 162, wherein the transmission is an invitation to initiate a communication session.

168. The medium of embodiment 162, wherein the call rule is based on a legal regulation.

169. The medium of embodiment 162, wherein the call attribute is an identifier of a call participant.

170. The medium of embodiment 162, wherein the call attribute is a timestamp related to the transmission.

171. A call searcher processor-implemented method embodiment, comprising:
  obtaining an indication to perform call analytics on a communications session;
  recording the communications session upon obtaining the indication;
  analyzing via a processor the recording to determine call ratings;
  obtaining a call tagging rule; and
  associating a call tag with the communications session based on the call ratings and the call tagging rule.

172. The method of embodiment 171, further comprising:
  obtaining a review request for the communications session; and providing a notification of the call tag and the recording of the communications session for review upon obtaining the review request.

173. The method of embodiment 172, further comprising:
obtaining an indication to modify the communications session in response to providing the notification; and
modifying the communications session according to the obtained indication.

174. The method of embodiment 171, wherein analyzing the recording includes identifying one or more words in speech included in the communications session.

175. The method of embodiment 174, wherein the call tagging rule is related to profanity in the communications session.

176. The method of embodiment 174, wherein the call tagging rule is related to a communications session participant procedure.

177. The method of embodiment 171, wherein the call tagging rule is related to a speech volume level.

178. A call searcher system embodiment, comprising:
a processor; and
a memory disposed in communication with the processor and storing processor-executable instructions, the instructions comprising instructions to:
obtain an indication to perform call analytics on a communications session;
record the communications session upon obtaining the indication;
analyze the recording to determine call ratings;
obtain a call tagging rule; and
associate a call tag with the communications session based on the call ratings and the call tagging rule.

179. The system of embodiment 178, the instructions further comprising instructions to:
obtain a review request for the communications session; and
provide a notification of the call tag and the recording of the communications session for review upon obtaining the review request.

180. The system of embodiment 179, the instructions further comprising instructions to:
obtain an indication to modify the communications session in response to providing the notification; and
modify the communications session according to the obtained indication.

181. The system of embodiment 178, wherein analyzing the recording includes identifying one or more words in speech included in the communications session.

182. The system of embodiment 181, wherein the call tagging rule is related to profanity in the communications session.

183. The system of embodiment 181, wherein the call tagging rule is related to a communications session participant procedure.

184. The system of embodiment 178, wherein the call tagging rule is related to a speech volume level.

185. A processor-readable medium embodiment storing processor-executable call searcher instructions, the instructions comprising instructions to:
obtain an indication to perform call analytics on a communications session;
record the communications session upon obtaining the indication;
analyze the recording to determine call ratings;
obtain a call tagging rule; and
associate a call tag with the communications session based on the call ratings and the call tagging rule.

186. The medium of embodiment 185, the instructions further comprising instructions to:
obtain a review request for the communications session; and
provide a notification of the call tag and the recording of the communications session for review upon obtaining the review request.

187. The medium of embodiment 186, the instructions further comprising instructions to:
obtain an indication to modify the communications session in response to providing the notification; and
modify the communications session according to the obtained indication.

188. The medium of embodiment 185, wherein analyzing the recording includes identifying one or more words in speech included in the communications session.

189. The medium of embodiment 188, wherein the call tagging rule is related to profanity in the communications session.

190. The medium of embodiment 188, wherein the call tagging rule is related to a communications session participant procedure.

191. The medium of embodiment 185, wherein the call tagging rule is related to a speech volume level.

192. A web access management processor-implemented method embodiment, comprising:
obtaining a request for network resource access;
extracting from the network resource access request a request attribute;
querying a database using the extracted request attribute;
obtaining a network access rule to apply to the network resource access request, based on querying the database;
applying the network access rule to the network resource access request; and
determining via a processor whether the network resource access is permitted based on applying the network access rule to the network resource access request.

193. The method of embodiment 1, further comprising:
determining that the network resource access is permitted, based on applying the network access rule to the network resource access request; and
forwarding the request for processing the network resource access request.

194. The method of embodiment 1, further comprising:
determining that the network resource access is not permitted, based on applying the network access rule to the network resource access request; and
providing an indication that the network resource access is not permitted.

195. The method of embodiment 192, wherein obtaining a network access rule to apply to the network resource access request includes:
obtaining a first network access rule based on querying the database;
obtaining a second network access rule based on querying the database;
extracting rule levels from the obtained first and second network access rule;
comparing the rule levels of the first and second network access rule; and
determining the network access rule to apply to the network resource access request based on the comparison of the rule levels of the first and second network access rule.

196. The method of embodiment 192, wherein the request for network resource access is an invitation to initiate a network-based communication session.

197. The method of embodiment 192, wherein the network access rule is based on a legal regulation.

198. The method of embodiment 192, wherein the request attribute is an identifier of a requesting network communications participant.

199. The method of embodiment 192, wherein the request attribute is a timestamp related to the network resource access request.

200. A web access management system embodiment, comprising:
a processor; and
a memory disposed in communication with the processor and storing processor-executable instructions, the instructions comprising instructions to:
obtain a request for network resource access;
extract from the network resource access request a request attribute;
query a database using the extracted request attribute;
obtain a network access rule to apply to the network resource access request, based on querying the database;
apply the network access rule to the network resource access request; and
determine whether the network resource access is permitted based on applying the network access rule to the network resource access request.

201. The system of embodiment 200, the instructions further comprising instructions to:
determine that the network resource access is permitted, based on applying the network access rule to the network resource access request; and
forward the request for processing the network resource access request.

202. The system of embodiment 200, the instructions further comprising instructions to:
determine that the network resource access is not permitted, based on applying the network access rule to the network resource access request; and
provide an indication that the network resource access is not permitted.

203. The system of embodiment 200, wherein the instructions to obtain a call rule to apply to the call request include instructions to:
obtain a first network access rule based on querying the database;
obtain a second network access rule based on querying the database;
extract rule levels from the obtained first and second network access rule;
compare the rule levels of the first and second network access rule; and
determine the network access rule to apply to the network resource access request based on the comparison of the rule levels of the first and second network access rule.

204. The system of embodiment 200, wherein the request for network resource access is an invitation to initiate a network-based communication session.

205. The system of embodiment 200, wherein the network access rule is based on a legal regulation.

206. The system of embodiment 200, wherein the request attribute is an identifier of a requesting network communications participant.

207. The system of embodiment 200, wherein the request attribute is a timestamp related to the network resource access request.

208. A processor-readable medium embodiment storing processor-executable web access management instructions, the instructions comprising instructions to:
obtain a request for network resource access;
extract from the network resource access request a request attribute;
query a database using the extracted request attribute;
obtain a network access rule to apply to the network resource access request, based on querying the database;
apply the network access rule to the network resource access request; and
determine whether the network resource access is permitted based on applying the network access rule to the network resource access request.

209. The medium of embodiment 208, the instructions further comprising instructions to:
determine that the network resource access is permitted, based on applying the network access rule to the network resource access request; and
forward the request for processing the network resource access request.

210. The medium of embodiment 208, the instructions further comprising instructions to:
determine that the network resource access is not permitted, based on applying the network access rule to the network resource access request; and
provide an indication that the network resource access is not permitted.

211. The medium of embodiment 208, wherein the instructions to obtain a call rule to apply to the call request include instructions to:
obtain a first network access rule based on querying the database;
obtain a second network access rule based on querying the database;
extract rule levels from the obtained first and second network access rule;
compare the rule levels of the first and second network access rule; and
determine the network access rule to apply to the network resource access request based on the comparison of the rule levels of the first and second network access rule.

212. The medium of embodiment 208, wherein the request for network resource access is an invitation to initiate a network-based communication session.

213. The medium of embodiment 208, wherein the network access rule is based on a legal regulation.

214. The medium of embodiment 208, wherein the request attribute is an identifier of a requesting network communications participant.

215. The medium of embodiment 208, wherein the request attribute is a timestamp related to the network resource access request.

In order to address various issues and improve over the prior art, the invention is directed to apparatuses, methods and systems for an automated data extractor-based call restrictor. The entirety of this application (including the Cover Page, Title, Headings, Field, Background, Summary, Brief Description of the Drawings, Detailed Description, Claims, Abstract, Figures, Appendices and otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims. It is to be understood that, depending on the particular needs and/or characteristics of a ADE-WAM individual and/or enterprise user, database configuration and/or relational model, data type, data transmission and/or network framework, syntax structure, and/or the like, various embodiments of the ADE-WAM, may be implemented that enable a great deal of flexibility and customization. The instant disclosure discusses embodiments of the ADE-WAM directed to enterprise-scale telecommunications monitoring, regulation, and resource allocation. However, it is to be understood that the systems described herein may be readily configured and/or customized for a wide variety of other applications and/or implementations. For example, aspects of the ADE-WAM may be adapted for non-enterprise and/or personal communications bandwidth management, efficient data access by mobile devices, and/or the like applications. It is to be understood that the ADE-WAM may be further adapted to other implementations or resource management applications.

What is claimed is:

1. A web access management processor-implemented method, comprising:
    obtaining a request for network resource access;
    extracting from the network resource access request a request attribute;
    querying a database using the extracted request attribute to obtain a data-structure-tracking syntax-configured string associated with the request attribute, wherein the syntax-configured string consists of a plurality of component parts, delimited by syntax separators, and wherein each part of the string tracks a separate data structure;
    utilizing the obtained data-structure tracking syntax-configured string and at least one universal variable to generate a request to at least one rule database, wherein the universal variables comprise intermediate data objects that provide access to a plurality of disparate databases and different software application systems containing data and applicable classification rules, and wherein the universal variables are organized into a business grammar hierarchy, each segment of the hierarchy following a plurality of business grammar rules for an enterprise;
    obtaining a network access rule from the at least one rule database, based on the data-structure-tracking syntax configured string and utilizing at least one universal variable,
    applying the network access rule to the network resource access request; and
    determining via a processor whether the network resource access is permitted based on applying the network access rule to the network resource access request.

2. The method of claim 1, further comprising:
    determining that the network resource access is permitted, based on applying the network access rule to the network resource access request; and
    forwarding the request for processing the network resource access request.

3. The method of claim 1, further comprising:
    determining that the network resource access is not permitted, based on applying the network access rule to the network resource access request; and
    providing an indication that the network resource access is not permitted.

4. The method of claim 1, wherein obtaining a network access rule includes:
    obtaining a first network access rule based on querying the database;
    obtaining a second network access rule based on querying the database;
    extracting rule levels from the obtained first and second network access rule;
    comparing the rule levels of the first and second network access rule; and
    determining the network access rule to apply to the network resource access request based on the comparison of the rule levels of the first and second network access rule.

5. The method of claim 1, wherein the request for network resource access is an invitation to initiate a network-based communication session.

6. The method of claim 1, wherein the network access rule is based on a legal regulation.

7. The method of claim 1, wherein the request attribute is an identifier of a requesting network communications participant.

8. The method of claim 1, wherein the request attribute is a timestamp related to the network resource access request.

9. A web access management system, comprising:
    a processor; and
    a memory disposed in communication with the processor and storing processor-executable instructions, the instructions comprising instructions to:
        obtain a request for network resource access;
        extract from the network resource access request a request attribute;

query a database using the extracted request attribute to obtain a data-structure-tracking syntax-configured string associated with the request attribute, wherein the syntax-configured string consists of a plurality of component parts, delimited by syntax separators, and wherein each part of the string tracks a separate data structure;

utilize the obtained data-structure tracking syntax-configured string and at least one universal variable to generate a request to at least one rule database, wherein the universal variables comprise intermediate data objects that provide access to a plurality of disparate databases and different software application systems containing data and applicable classification rules, and wherein the universal variables are organized into a business grammar hierarchy, each segment of the hierarchy following a plurality of business grammar rules for an enterprise;

obtain a network access rule from the at least one rule database, based on the data-structure-tracking syntax configured string and utilizing at least one universal variable, apply the network access rule to the network resource access request; and determine whether the network resource access is permitted based on applying the network access rule to the network resource access request.

10. The system of claim 9, the instructions further comprising instructions to:

determine that the network resource access is permitted, based on applying the network access rule to the network resource access request; and forward the request for processing the network resource access request.

11. The system of claim 9, the instructions further comprising instructions to:

determine that the network resource access is not permitted, based on applying the network access rule to the network resource access request; and provide an indication that the network resource access is not permitted.

12. The system of claim 9, wherein the instructions to obtain a call rule include instructions to:

obtain a first network access rule based on querying the database;

obtain a second network access rule based on querying the database;

extract rule levels from the obtained first and second network access rule;

compare the rule levels of the first and second network access rule; and determine the network access rule to apply to the network resource access request based on the comparison of the rule levels of the first and second network access rule.

13. The system of claim 9, wherein the request for network resource access is an invitation to initiate a network-based communication session.

14. The system of claim 9, wherein the network access rule is based on a legal regulation.

15. The system of claim 9, wherein the request attribute is an identifier of a requesting network communications participant.

16. The system of claim 9, wherein the request attribute is a timestamp related to the network resource access request.

17. A processor-readable medium storing processor-executable web access management instructions, the instructions comprising instructions to:

obtain a request for network resource access;

extract from the network resource access request a request attribute;

query a database using the extracted request attribute to obtain a data-structure-tracking syntax-configured string associated with the request attribute, wherein the syntax-configured string consists of a plurality of component parts, delimited by syntax separators, and wherein each part of the string tracks a separate data structure;

utilize the obtained data-structure tracking syntax-configured string and at least one universal variable to generate a request to at least one rule database, wherein the universal variables comprise intermediate data objects that provide access to a plurality of disparate databases and different software application systems containing data and applicable classification rules, and wherein the universal variables are organized into a business grammar hierarchy, each segment of the hierarchy following a plurality of business grammar rules for an enterprise;

obtain a network access rule from the at least one rule database, based on the data-structure-tracking syntax configured string and utilizing at least one universal variable, apply the network access rule to the network resource access request; and determine whether the network resource access is permitted based on applying the network access rule to the network resource access request.

18. The medium of claim 17, the instructions further comprising instructions to:

determine that the network resource access is permitted, based on applying the network access rule to the network resource access request; and forward the request for processing the network resource access request.

19. The medium of claim 17, the instructions further comprising instructions to:

determine that the network resource access is not permitted, based on applying the network access rule to the network resource access request; and provide an indication that the network resource access is not permitted.

20. The medium of claim 17, wherein the instructions to obtain a call rule include instructions to:

obtain a first network access rule based on querying the database;

obtain a second network access rule based on querying the database;

extract rule levels from the obtained first and second network access rule;

compare the rule levels of the first and second network access rule; and determine the network access rule to apply to the network resource access request based on the comparison of the rule levels of the first and second network access rule.

21. The medium of claim 17, wherein the request for network resource access is an invitation to initiate a network-based communication session.

22. The medium of claim 17, wherein the network access rule is based on a legal regulation.

23. The medium of claim 17, wherein the request attribute is an identifier of a requesting network communications participant.

24. The medium of claim 17, wherein the request attribute is a timestamp related to the network resource access request.

* * * * *